United States Patent [19]

Igarashi et al.

[11] Patent Number: 5,192,969

[45] Date of Patent: Mar. 9, 1993

[54] STEREOGRAPHIC PROJECTING AND RECORDING METHOD AND APPARATUS THEREFOR

[75] Inventors: Shunkichi Igarashi, Tokyo; Seiichi Taguchi, Kanagawa, both of Japan

[73] Assignee: Fuji Photo Film Co., Ltd., Kanagawa, Japan

[21] Appl. No.: 858,652

[22] Filed: Mar. 27, 1992

[30] Foreign Application Priority Data

| Mar. 29, 1991 | [JP] | Japan | 3-67260 |
| Apr. 19, 1991 | [JP] | Japan | 3-88037 |
| May 29, 1991 | [JP] | Japan | 3-125715 |
| Aug. 13, 1991 | [JP] | Japan | 3-203044 |

[51] Int. Cl.$^5$ .................. G03B 27/32; G03B 35/14
[52] U.S. Cl. ............................... 355/22; 352/58; 354/101; 354/115; 354/150; 355/33; 355/46; 355/66
[58] Field of Search ............... 355/22, 33, 46, 66; 354/101, 102, 115, 150; 352/58, 81

[56] References Cited

U.S. PATENT DOCUMENTS

| 3,063,334 | 11/1962 | Smith . | |
| 4,120,562 | 10/1978 | Lo et al. | 355/22 |
| 4,903,069 | 2/1990 | Lam | 355/22 |
| 5,019,855 | 5/1991 | Lam | 355/22 |
| 5,111,236 | 5/1992 | Lo | 355/22 |

*Primary Examiner*—Monroe H. Hayes
*Attorney, Agent, or Firm*—Sughrue, Mion, Zinn, Macpeak & Seas

[57] ABSTRACT

In processing a plurality of original images from different viewpoints through a lenticular sheet having a plurality of lenticular lenses to form a plurality of corresponding linear picture elements that are to be projected on a picture element recording or display medium, the following steps are taken: launching the beams of light from the respective original images into one or a corresponding number of projection lenses; separating the transmitted beams for the respective original images by means of a mirror optical assembly consisting of mirror units each composed of at least two mirrors for each original image; adjusting the optical pathlengths of the beams to the picture element recording or display medium by means of the mirror assembly; adjusting the key subject matter in the mirror assembly so that it will register among the projected views of all original images; allowing the beams to be incident on lenticular lenses at predetermined projecting angles; and imaging those beams as linear picture elements on the picture element recording or display medium so that the plurality of original images from different viewpoints are simultaneously projected on the picture element recording or display medium, either simultaneously or in at least two steps, to produce sharp images with high efficiency.

37 Claims, 26 Drawing Sheets

STEREOGRAPHIC PROJECTING AND RECORDING METHOD AND APPARATUS THEREFOR

BACKGROUND OF THE INVENTION

This invention relates to a lenticular stereographic projecting and recording method and an apparatus for implementing that method. More particularly, this invention relates to a stereographic projecting and recording method by which a plurality of images of different viewpoints are projected and recorded as linear picture elements, either simultaneously or sequentially in steps, on various light-sensitive materials, electronic photoreceptors or projection media such as screens through lenticular lenses. More specifically, the invention relates to a stereographic printing method for printing the linear picture elements on lenticular light-sensitive materials. Further, this invention relates to a lenticular stereographic projecting and recording apparatus, particularly to a stereographic printing apparatus for use in lenticular stereographic image projecting and recording, wherein a plurality of images of different viewpoints are projected either simultaneously or sequentially in steps and printed on lenticular light-sensitive materials as a number of broad linear picture elements. This invention also relates to a stereographic image projecting and recording method that is capable of achieving key subject matter matching in lenticular stereophotography, as well as a stereographic image projecting and recording apparatus. In particular the invention permits correct key subject matter matching by a simple procedure, is capable of forming an appropriate stereoscopic image (picture) and is simple in construction.

Methods are known that produce a stereoscopic view using a lenticular light-sensitive material formed of a lenticular sheet having a plurality of lenticular lenses and a light-sensitive layer. An example of the methods for producing such a stereoscopic view is shown in FIG. 31 (two-eye Process ). A lenticular sheet C composed of a number of lenticular lenses is provided on the back side with a light-sensitive layer D to form a lenticular light-sensitive material F. Image information from different viewpoints, namely, the left and right images $A_1$ and $A_2$, are projected onto the lenticular light-sensitive material F through projection lenses $B_1$ and $B_2$ so that they are separated into an array of linear picture elements for recording. When the recorded images are viewed with the left and right eyes L and R of an observer through the lenticular sheet C of the lenticular light-sensitive material F as shown in FIG. 32, they can be seen in relief (as a stereoscopic view). However, this method has the disadvantage that the positions of the observers eyes that insure the production of a stereoscopic view are very limited and if those positions are not attained, the optical density (hereunder referred to simply as "density") is reduced abruptly to impair the three-dimensional effect.

It is known that the above-described defects can be lessened by increasing in appropriate amounts the line width of linear picture elements formed in the lenticular sheet. Systems that have so far been proposed to meet this condition include: (1) an apparatus of the type described in Examined Japanese Patent Publication (kokoku) No. 607/1974, which makes a relative movement of the light-sensitive material by moving it and the projection lenses in the same direction at a predetermined speed ratio so as to increase the line width of linear picture elements; (2) an apparatus of the type described in Examined Japanese Patent Publication (kokoku) No. 33847/1978, which allows a lenticular light-sensitive material to rock about the longitudinal axis of the central lenticular lens through a predetermined range of angles; and (3) an apparatus of the type described in Examined Japanese Patent Publication (kokoku) No. 25902/1974, which adopts an additional lenticular sheet (lens) method in which recording is performed with the line width of linear picture elements being increased by means of a cover that is placed on top of the entire surface of the lenticular light-sensitive material in such a way as to modify the refractive power of the lenticular lens.

As described in Examined Japanese Patent Publication (kokoku) No. 33847/1978, the two-eye (two-frame or two-image) system which has two original images projected through a lens system to be printed on a lenticular light-sensitive material has the advantage that it permits two original images to be exposed simultaneously with a simple mechanism. However, the number of original images that can be printed is limited to two, so the distance between the two mirror images produced by an enlarging lens or lenses (projection lens or lenses) must be adjusted to be adjusted to be equal to the distance between the two eyes of the observer and so that the distance from the enlarging lens or lenses to the lenticular sheet is substantially equal to the viewing distance. Further, in the case of observing an exposed stereoscopic image, the distance that insures stereoscopic viewing is limited and even if the width of two linear picture elements included within the pitch of one lenticular lens in the lenticular sheet is increased, a gap tends to occur between images and a satisfactory three-dimensional (3D) effect cannot be achieved In addition, depending on the manner in which the viewpoints are shifted, an inverted stereoscopic image is likely to form. Another problem with the two-image system is that if one attempts to increase the line width of linear picture elements by the rocking method, the angle through which the lenticular light-sensitive material is increased so as to deteriorate the quality of the periphery of the stereoscopic image.

With a view to solving these problems, a multi-eye (multi-image or multi-frame) approach has been proposed but approach suffers from the disadvantage that the printing method is complicated and inefficient or that the printing apparatus is bulky and expensive. An example of the apparatuses that operate on multi-eye system is described in U.S. Pat. No. 3,953,869. The specification and the drawings (e.g., FIG. 4) of this patent illustrate an apparatus in which N spaced two-dimensional views are projected onto the light-sensitive layer of a lenticular light-sensitive material, of lenticule pitch W, through N spaced projecting lenses that are capable of changing the angle of projection, whereby N condensed images that are uniform and in focus are formed within the lenticular pitch of the lenticular light-sensitive material.

However, even this apparatus operating on the multi-eye system suffers from the above-mentioned disadvantage that the printing method is complicated and inefficient or that the printing apparatus is bulky and expensive. Stated more specifically, this apparatus completes the printing of original images at high speed since a multiple of original images are printed in one step by means of a multiple of projecting lenses. However, the multiple original images which are to be disposed in positions that insure predetermined angles of projection must be spaced apart by predetermined distances, so the individual films are separated from one another. Further, in order to insure that the projected views from the individual original images will be focused at desired angles of projection, it is necessary to provide a lens moving mechanism for adjusting the individual lenses and such a mechanism is complex. Another requirement is to increase the line width of linear picture elements, which adds to the complexity of the overall mechanism. In addition, printing original images as they are in a continuous form requires that those original images be prepared by means of a special camera in which the distance between lens is variable.

U.S. Pat. No. 4,101,210 discloses a stereoscopic image forming apparatus in which a plurality of original images spaced on a film carrier are illuminated with projecting light from a light source to form focused images through a lens system comprising a plurality of enlarging lenses on a lens carrier, thereby exposing the plurality of original images in a single step. However, even in this apparatus, there is a need for not only separating original stereographic images and arranging them in discrete rows on the film carrier but also arranging a plurality of lens systems in rows in correspondence with those original images. This involves cumbersome operations in preparing original images while, at the same time, the overall size of the apparatus is increased.

U.S. Pat. No. 4,650,282 describes a method of exposing a multiple of original images by which the central image within one pitch of small lenses in a lenticular light-sensitive material is made broader than the image on either end. However, this patent does not disclose any specific apparatus or means for implementing that method.

U.S. Pat. No. 4,814,826 discloses a method and an apparatus for effecting a three-dimensional print by a non-scanned exposure of a three-dimensional lenticular light-sensitive material without requiring lens movement. In the device disclosed therein a fixed periscopic lens and a periscopic optical unit including parallel mirrors that are rotatable about a first axis normal to the optical axis of the lens and a second axis intersecting said first axis, are positioned between the lenticular light-sensitive material and a film having a plurality of continuous frames thereon. The frames of the film are moved by a certain distance from the optical axis of the lens so as to create angular exposure zones, and the frames of the film corresponding to those angular exposure zones are illuminated with projecting light for delivering an image exposure of those frames of the film towards the periscopic optical unit along the center of each angular exposure zone. This apparatus, which allows the projecting lens to be fixed, obviates the need for performing the scanning process as in the prior art which involves changing the lens angle in response to the film movement and any translation offset of image from the optical axis of the lens that would otherwise develop on account of image exposure is eliminated by rotating the parallel mirrors about the two axes. However, the apparatus suffers from the disadvantage that if there are four frames to be exposed, four separate steps are necessary because the film must be moved for each frame, and the subsequent adjustment of mirrors followed by exposure must be repeated four times and the mirror unit is rotated in the same lens and mirror position in order to provide a predetermined printing angle for the image of each frame.

With reference to the images of frames obtained from different viewpoints, the images of objects at different depths are recorded in positions offset from the optical axis of each camera lens and the amount of offset is related to the change in the distance to each object. For a geometric presentation of this phenomenon, see FIG. 33. The amount of this offset is also related to the distance between taking lens and can be expressed by the following equations as disclosed in U.S. Pat. Nos. 3,953,869 and 4,120,562, supra:

$$e = kf/(k-f_t) \tag{1}$$

$$k' = se/k = sf_t/(k-f_t) \tag{2}$$

$$a' = se/a = (k/a)k' \tag{3}$$

$$b' = se/b = (k/b)k' \tag{4}$$

where:
  e is the distance from the center line 102 of the taking (lens the objective plane) 100 to the film plane 104;
  $f_t$ is the focal length of the taking lens 100;
  a, b and k are the distances from the center line 102 of the taking lens 100 to the objects A, B and K, respectively;
  a',b' and k' are the distances along the film plane 104 from the longitudinal axis 106 to the images A',B' and K', respectively.

Thus, in order to produce an appropriate stereoscopic image by a method in which a plurality of original images as obtained from different viewpoints are projected and recorded on a lenticular light-sensitive material, it is necessary that the images of the key subject matter that are recorded in the respective frames, which are slightly offset from one another, be brought into registry on the plane of image projection so that an offset-free sharp image will be formed with respect to the key subject matter. However, this matching of the key subject matter cannot be accomplished in an easy and advantageous manner with the conventional apparatus using lenticular light-sensitive materials.

See, for example, Examined Japanese Patent Publication (kokoku) Nos. 607/1974, 33847/1978 and 25902/1974, supra. These patents do not disclose a specific method of accomplishing the matching of the key subject matter and the methods and apparatuses that are described in the patent references rely upon the operator's skill for bringing the projected images of the key subject matter into registry. In other words, no satisfactory stereoscopic image can be formed unless the operator is a skilled engineer.

U.S. Pat. No. 3,953,869, supra, discloses an apparatus for forming a stereoscopic image from three or more original images. In this type of apparatus, the matching of the key subject matter bears particular importance and the patent makes a reference to the offset of the object in the individual original images. However, the application of three or more original images increases the complexity of the apparatus and makes it more difficult to accomplish the correct matching of the key subject matter. Further, the apparatus disclosed in the patent under consideration does not have any advantageous means for solving these problems.

U.S. Pat. No. 4,903,069 discloses a stereographic printing apparatus that computes the distance of the key subject matter between adjacent original images on the basis of the object distance at the time of taking original images, the distance between taking lenses and the focal length of each taking lens, sets the travel distance (feed pitch) of original images in accordance with the thus calculated distance of the key subject matter, and moves the original images frame by frame so that the projected views of a plurality of original images are recorded on a lenticular light-sensitive material. However, this apparatus requires that the data of each frame of original images be recorded when shooting the object and that printing is performed with the feed pitch being varied for each frame of original images. Accordingly, the multi-lens camera is very expensive and complicated. In addition, the process of controlling the printing operation is also complex. Further, the efficiency of printing with this apparatus is low.

BRIEF DESCRIPTION OF THE INVENTION

A first object, therefore, of the present invention is to provide a method that is improved over the conventional method of the rocking system in that it enables three or more original images to be projected simultaneously (in one step) on various projection media such as a picture element recording medium and a display medium, with the projected images being recorded to produce views that are observable by various methods.

A second object of the present invention is to provide a method that is improved over the conventional method of the rocking system in that it enables three or more original images to be printed in at least two steps. The original images are then projected on various projection media such as a picture element recording medium and a display medium and recorded to produce views that are observable stereoscopically by various methods.

A third object of the present invention is to provide a stereographic projecting method that is the result of efforts to improve the conventional stereoscopic image projecting method of the rocking system and the conventional stereographic projecting and printing apparatus and that is capable of producing a satisfactory projected image by achieving the correct matching of the key subject matter through a simple procedure in lenticular stereographic projection in which a plurality of original images, obtained from different viewpoints, are projected through a lenticular sheet to be recorded (printed) in a picture element recording medium such as a light-sensitive material or displayed on a display medium to produce views that are observable by various methods.

A fourth object of the present invention is to provide a lenticular stereographic printing apparatus that enables three or more original images to be printed simultaneously (in one step) and which is capable of producing a high-quality stereograph in a simple manner.

A fifth object of the present invention is to provide a lenticular stereographic printing apparatus that enables three or more original images to be printed in at least two steps and which is capable of producing a high quality stereograph in a simple manner.

A sixth object of the present invention is to provide a simple lenticular stereographic printing apparatus that enables a plurality of original images to be printed, yet achieves the matching of the key subject matter in an easy and correct manner to form an appropriate and high-quality stereoscopic image (picture) with the key subject matter being in sharp registry.

To achieve the above-described first object, there is provided by its first aspect of the present invention a stereographic projecting method by which a plurality of original images from at least three different viewpoints are projected as a plurality of linear picture elements onto a projection medium through a plurality of lenticular lenses of a lenticular sheet, comprising the steps of:

directing beams of light from the respective original images into a single projection lens, separating the beams of transmitted light for the respective original images in a mirror optical assembly consisting of mirror units each composed of at least two mirrors for each original image, adjusting optical pathlengths of the respective beams to said projection medium by means of the mirror optical assembly, and allowing the beams to fall incident on lenticular lenses at predetermined angles of projection so that they are imaged as linear picture elements on the projection medium, whereby the original images from at least three viewpoints are projected simultaneously onto the projection medium.

To achieve the second object, there is provided, as a second aspect of the present invention, a stereographic projecting method by which a plurality of original images from at least three different viewpoints are projected as a plurality of linear picture elements onto a projection medium through a plurality of lenticular lenses of a lenticular sheet, comprising the steps of:

masking one or more of the original images, allowing light issuing from a light source to fall incident on one or more of the unmasked original images, directing beams of transmitted light into a single projection lens, changing the optical path of convergent beams of transmitted light of projection for the respective original images in a mirror optical assembly consisting of mirror units each composed of at least two mirrors for each original image, adjusting optical pathlengths of the respective beams to the projection medium by means of the mirror optical assembly, and allowing the beams to fall incident on lenticular lenses at predetermined angles of projection so that they are imaged as linear picture elements on the projection medium, the process being repeated until a stereoscopic image is composed in entirety.

In the first and second aspects, the projection medium is preferably a picture element recording medium, on which the plurality of projected original images are recorded.

Preferably, the picture element recording medium is a light-sensitive material.

Preferably, the lenticular sheet and the light-sensitive material combine to form a lenticular light-sensitive material in which the light-sensitive layer of the light-sensitive material is integrally formed on the back of the lenticular sheet.

Preferably, the picture element recording medium is an electronic photoreceptor, by which the plurality of recorded original images are displayed.

Preferably, the projection medium is an image display medium.

To achieve the third object, there a third aspect of the present invention is a stereographic projecting method by which a plurality of original images from different viewpoints are processed through a lenticular sheet to produce a plurality of corresponding linear picture elements to be projected on a picture element recording or display medium, comprising the steps of:

directing light beams from the original images into one or more projection lenses, changing the optical paths of the transmitted beams from said the projection lens by a mirror optical assembly consisting of mirror units each composed of at least two mirrors for each original image, whereby optical pathlengths of those beams to the picture element recording or display medium are adjusted while the key subject matter in the original images is matched for the plurality of images being projected by means of the mirror optical assembly, and allowing the adjusted beams to fall incident on the lenticular sheet at predetermined angles of projection so that they are imaged as linear picture elements on the picture element recording or display medium, whereby the plurality of original images from different viewpoints are projected onto the picture element recording or display medium.

In the third aspect, preferably, the original images are preferably from three different viewpoints and projected in two or more steps onto the picture element recording or display medium, with one or more of the original images being masked.

Preferably, the matching of the key subject matter is performed by adjusting the optical paths of the respective beams by means of the mirror optical assembly in accordance with the projected view as obtained on a projection medium provided on the plane of projection of the beams or a plane that is optically equivalent to the plane of projection.

Preferably, the matching of the key subject matter is performed by calculating the shift of the key subject matter in each original image on the basis of the shooting distance of the original images and the shooting distance between original images, and adjusting the optical paths of the respective beams in accordance with the calculated shift by means of the mirror optical assembly.

To achieve the fourth object, there a fourth aspect of the present invention is a stereographic projecting and recording apparatus with which a plurality of original images from at least three different viewpoints are projected through a plurality of lenticular lenses of a lenticular sheet and are printed respectively as a plurality of linear picture elements on the light-sensitive layer of a light-sensitive material that is provided on the back side of the lenticular sheet, either separately from, or as an integral part of, said sheet, comprising:

a printing light source;

a film holding means for holding a film that has a plurality of original images;

a single projection lens by means of which the light of projection that has passed through the film and that contains information on the plurality of original images is focused to form an image on the light-sensitive layer of a lenticular light sensitive material composed of the lenticular sheet and the light-sensitive material;

a mirror optical assembly having a first mirror unit, composed of mirrors that are associated with the respective original images and with which the light of projection that has passed through the projection lens and that contains information on the plurality of original images is separated into beams for the respective original images, and a second mirror unit composed of mirrors that allow the beams of the light of projection to fall incident at predetermined angles on the lenticular light-sensitive material and that reflect those beams to be imaged as corresponding linear picture, elements on the lenticular light-sensitive material. The mirror optical assembly adjusts the angle of printing of the individual beams of light of projection on the light-sensitive layer, as well as the optical pathlengths of the beams to the light-sensitive layer; and a holding means for holding a lenticular light-sensitive material that has the light-sensitive layer on which the respective beams of light of projection are imaged and printed as a number of linear picture elements, the components mentioned above are arranged in the listed order along the path of the projection light from the light source.

To achieve the fifth object, a fifth aspect of the present invention is a stereographic printing apparatus with which a plurality of original images from at least three different viewpoints are projected through a projection lens onto a separate or integral lenticular light-sensitive material that includes a lenticular sheet comprising a plurality of lenticular lenses and a light-sensitive layer provided on the back side of the lenticular sheet, the original images being divided into linear picture elements by the lenticular sheet and printed on the light-sensitive layer, comprising:

a printing light source;

a film holding means that holds a film having a plurality of original images printed thereon and that maintains a constant distance between the film and the lenticular light-sensitive material;

a mask means for masking original images so that only the combinations of selected original images on the film will be exposed;

a single projection lens;

a mirror optical assembly having a first mirror unit composed of mirrors that are associated with the respective, original images, and with which the optical paths of the beams of projection light that from the light source that have passed through the masking means are changed for the respective original images, and a second mirror unit composed of mirrors that allow the beams of the projection light to be incident at predetermined angles on the lenticular light-sensitive material and that reflect those beams to be imaged as corresponding linear picture elements on the lenticular light-sensitive material, the mirror optical assembly the angle of printing of the individual beams of projection light on the light-sensitive layer, as well as the optical pathlengths of those beams to the light-sensitive layer; and a holding means for holding the lenticular light-sensitive material that has the light-sensitive layer on which the respective beams of projection light are imaged and printed as a number of linear picture elements.

Each of the selected combinations of original images on the film are printed on the light-sensitive material.

In the fifth aspect, the means preferably masks either even-numbered original images or odd-numbered original images as selected from among the plurality of original images on the film, and the mirror optical assembly has a mirror unit for processing the beams of projection light from the even-numbered original images in response to the masking of the odd-numbered original images by the mask means.

Preferably, either the mirror unit for processing the beams from the even-numbered original images or the mirror unit for processing the beams from the odd-numbered original images is a single mirror optical assembly that is formed as a physical separate entity from the film holding means and the mask means and which, when the mask means is moved, is inverted (rotated by 180°) to serve as a mirror unit for processing the beams from either the odd-numbered or even-numbered original images.

Preferably, the single mirror optical assembly is adapted to be capable of inversion as a whole in response to the movement of the mask means.

Preferably, the single mirror optical assembly is fixed whereas the film holding means is adapted to be capable of inversion in response to the movement of the mask means.

To achieve the sixth object, a sixth aspect of the present invention is a stereographic printing apparatus with which a plurality of original images from different viewpoints are processed through a lenticular sheet comprising a plurality of lenticular lenses to produce a plurality of linear picture elements which are printed respectively on the light-sensitive layer of a light-sensitive material that is provided on the back side of the lenticular sheet either separately from or as an integral part of the sheet, comprising:

a printing light source;

a film holding means for holding a film that carries a plurality of original images;

a projection lens by means of which the light that has passed through the film is focused to form an image on the light-sensitive layer of the light-sensitive material;

a mirror optical assembly having a first mirror unit composed of mirrors that are associated with the respective original images and with which the optical paths of the beams of light that has passed through the projection lens and that contains information on the plurality of original images are changed for the respective original images, an angular adjusting mechanism being provided for each of the mirrors in the first mirror unit for adjusting the key subject matter, and a second mirror unit composed of mirrors that allow the beams of light at predetermined angles, or the lenticular sheet and that reflect those beams to be imaged as corresponding linear picture elements on the light-sensitive material, the mirror optical assembly adjusting the angle of printing of the individual beams of projection light on the light-sensitive layer, as well as the optical pathlengths of the beams to said light-sensitive material; and a holding means for holding a lenticular light-sensitive material composed of the lenticular sheet and the light-sensitive material.

In the sixth aspect, preferably, the apparatus further preferably also includes a mask means for masking only selected combinations of original images on the film. Printing is accomplished for each of the selected combinations of original images on the film.

Preferably, the angular adjusting mechanism which is provided for the mirrors in the first mirror unit for adjusting the key subject matter comprises a plurality of actuators disposed in predetermined positions and a control unit for controlling each of said actuators.

Preferably, the apparatus further includes a projection medium which, for the purpose of adjusting the key subject matter, is freely disposable on a plane corresponding to the light sensitive material at least in the position of the key subject matter in the original images, the beams of light from the original images being focused on the projection medium before they are printed on the light-sensitive material. The angles of the mirrors in the first mirror unit are adjusted by the angular adjusting mechanism in accordance with the projected images so as to achieve registry in the key subject matter between the original images, followed by printing on the light-sensitive material through the lenticular sheet.

Preferably, the projection medium is a screen and the projected images focused on the screen are checked visually to adjust the angles of the mirrors in the first mirror unit by means of the angular adjusting mechanism.

Preferably, the projected images focused on the screen are reproduced on a display, with the angles of the mirrors in the first mirror unit being adjusted by means of the angular adjusting mechanism on the basis of the reproduced images.

Preferably, the projection medium is a contrast sensor and the angles of the mirrors in the first mirror unit are adjusted by means of the angular adjusting mechanism so that said contrast sensor will produce a maximum image contrast signal.

Preferably, the projection medium is a screen and has a display and a contrast sensor. The display reproduces the projected images focused on the screen and sets the key subject matter on the reproduced images. The contrast sensor is in operative association with the setting of the key subject matter to move to the position of the key subject matter with the angles of the mirrors in the first mirror unit being adjusted by means of the angular adjusting mechanism so that the contrast sensor will produce a maximum image contrast signal.

Preferably, the apparatus further includes a means of calculating the shift of the key subject matter in each original image on the basis of the shooting distance of the plurality of original images and the shooting distance between original images, with the calculated shift being used as a basis for adjusting the angles of the mirrors in the first mirror unit by means of the angular adjusting mechanism in such a way that the key subject matter registers between individual original images, and is then printing on the light-sensitive material through the lenticular sheet.

Preferably, the apparatus further comprises an image sensor capable of detecting the projected original image and movably provided on the projection medium or constituting the projection medium and a display which reproduces a projection image and designates the key subject matter of reference plane on the reproduced image, means for recognizing and memorizing a pattern of the key subject matter designated on the display, and means for calculating the shift of key subject matter of other original image projected. The angles of the mirrors in the first mirror unit are adjusted by means of the angular adjusting mechanism so that the key subject matter of each original image is matched depending on the calculated shift.

In the fourth, fifth and sixth aspects, the apparatus preferably further includes a rocking means which, when said original images are being printed onto the light-sensitive material, allows the lenticular sheet and the light-sensitive material held by the holding means to rock about the longitudinal axis of the central lenticular lens in the lenticular sheet through a predetermined range of angles with respect to a reference (horizontal) plane, the central lenticular lens intersecting the optical axis of the projection lens.

Preferably, the projection lens is movable along its optical axis so that the key subject matter in each original image will be brought into focus on the lenticular light-sensitive material.

Preferably, the apparatus further includes an exposure adjusting unit that is capable of adjusting the amount of exposure for the original images, taken either individually or as a whole.

DETAILED DESCRIPTION OF THE INVENTION

Figure 1:
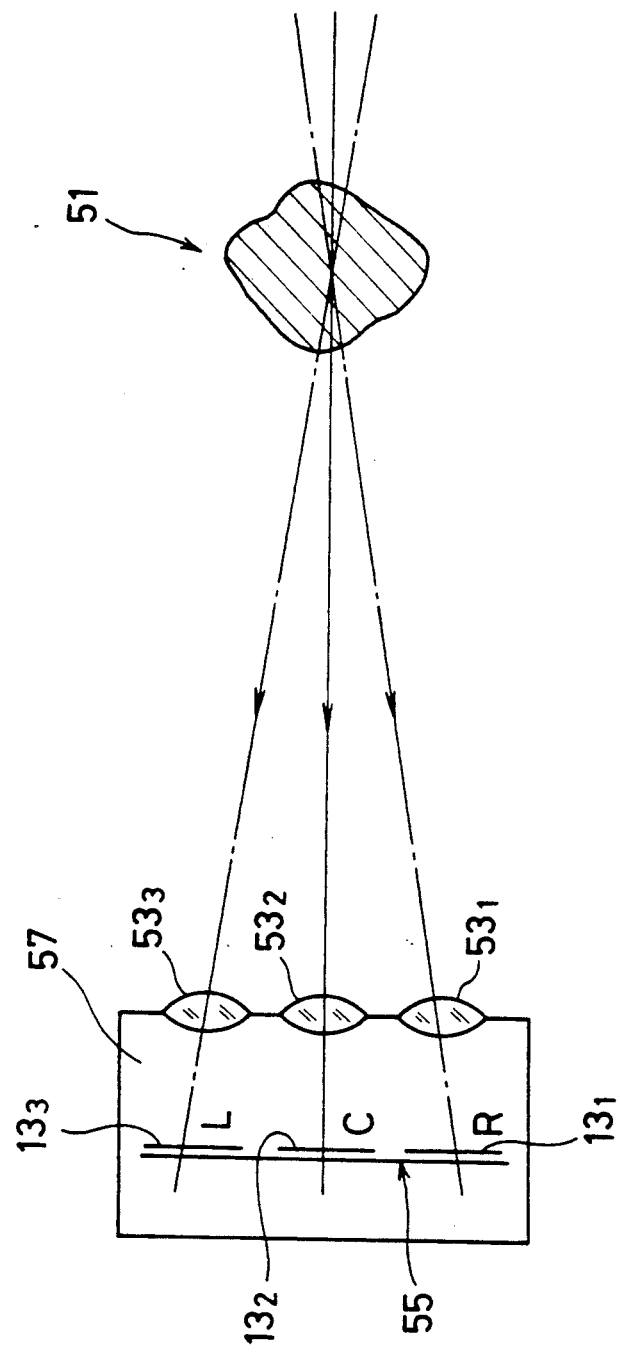
FIG. 1 is a sketch showing how three different original images are formed on a film by shooting an object with a three-lens camera.

The stereographic projecting and recording method of the present invention and the apparatus for implementing this method are described below in detail.

To begin with, the stereographic projecting and recording method according to the first aspect of the present invention, as well as the stereographic printing apparatus according to the fourth aspect of the present invention for implementing that method are described below.

In accordance with the stereographic projecting and recording method of the first aspect of the present invention, light beams carrying three or more original images are passed through a single projecting lens to produce convergent light that will form an image at a predetermined focal length, and the convergent light is split into beams for the respective original images by means of a subsequent mirror optical assembly. The beams are adjusted so that all of them have a constant optical pathlength to a lenticular lens in a lenticular sheet. Then, the beams are directed into the lenticular lens at predetermined printing angles and are imaged as linear picture elements on the back side of the lenticular sheet. In this way, a plurality of continuous original images, retained in predetermined positions are recorded, through the projecting lens, in a projection medium, such as a picture element recording medium, provided in a predetermined position on the back side of the lenticular sheet and, subsequently, they are observed as stereoscopic views either through that picture element recording medium or after being directly projected and displayed on a picture element display medium provided at a predetermined position.

Examples of the picture element recording medium that can be used in the present invention include photographic materials, electronic photoreceptors such as electrophotographic materials, electrophotographic drums electrophotoreceptors, CCDs, image sensors, photosensors, as well as magnetic recording media and optical recording media. In these media, the projected image is divided into a plurality of picture elements, through the lenticular sheet, which are recorded temporarily and the recorded image is indirectly used in various media that can provide stereoscopic views. Consider, for example, the case of using an electronic photoreceptor such as a CCD; this photoreceptor receives a linear image, which is sent as a video signal to be projected onto a CRT or a LCD, etc.; since a lenticular sheet corresponding to the image size is mounted on the CRT screen, the screen illuminated with the phosphor elements excited by the input video signal can be seen through the lenticular sheet to provide a stereoscopic view. Typical examples of the picture element optical-display medium that can be used in the present invention include those which use a diffusing plate, a screen or a Fresnel lens, as well as a reflector mirror and a dual lenticular screen combined with a lenticular sheet.

Consider the case where a light-sensitive material is provided on the back side of a lenticular sheet in the present invention; as in the case already described above, light beams carrying a plurality of original images are passed through a single projecting lens to produce convergent light that will form an image at a predetermined focal length, and the convergent light is split into beams for the respective original images by means of a subsequent mirror optical assembly. The beams are adjusted in such a way that all of them have a constant optical pathlength to a lenticular lens in the lenticular sheet; thereafter, the beams are admitted into the lenticular lens at predetermined printing angles and are imaged as linear picture elements on the light-sensitive material which is provided on the back side of the lenticular sheet. In this way, a plurality of continuous original images as they are retained in predetermined positions can be printed simultaneously on the lenticular light-sensitive material through the projecting lens.

The lenticular sheet to be used in the present invention is such that a plurality of lenticular lenses each having a convex top are juxtaposed in a row. Therefore the top surface of the sheet has a shape resembling a plurality of semicylindrical lenses and its bottom surface is flat, whereby it has a refractive power only in the direction of the width of each lenticule. The light-sensitive material be provided on the back side of the lenticular sheet may any known type of light-sensitive materials including photographic materials and electronic photoreceptors.

The lenticular light-sensitive material which has a light-sensitive material provided on the back side of a lenticular sheet composed of a number of lenticular lenses is advantageous in that lenticular sheets having various lens diameters, thicknesses, dimensions, etc can be combined with light-sensitive materials having various dimensions. Therefore the lenticular sheet and the light-sensitive material may be fabricated as separate members which are assembled prior to use. Alternatively, the two members may be preliminarily combined together in a unitary (integral) assembly that complies with a specific requirement.

Preferably, a lenticular sheet is provided on the topmost layer of a conventionally known light-sensitive material.

In the description that follows, an image-forming material comprising a lenticular sheet and a light-sensitive material will be referred to as a "lenticular light-sensitive material".

In an embodiment of the present invention, a rocking means may be provided, by which the lenticular light-sensitive material is rocked during exposure about the longitudinal axis of the central lenticular lens through a predetermined range of angles with respect to the horizontal plane. The advantage of this rocking means is that the line width of a linear picture element that is condensed by the projecting lens and which is focused through a lenticular lens can be increased over the predetermined range of rocking angles. Suppose here the case of recording linear picture elements on the lenticular light-sensitive material at a width of P/N (where P is the pitch of a lenticule in the lenticular light-sensitive material and N is the number of original images); the range of rocking angles is $2\theta = w/N$, where w is the angular aperture of each lenticular lens. If desired, the lenticular light-sensitive material may be fixed whereas the optical unit for exposing original images is allowed to rock.

Preferably, the original images are projected onto the lenticular light-sensitive material in such a way that the key subject matter in each original image will be in registry with a common reference point on the lenticular light-sensitive material. Stated more specifically, the angle of a certain mirror unit, say, a first mirror unit in the mirror optical assembly may be so adjusted that the projected views of the key subject matters in all original images will be at the coincident position on the lenticular light-sensitive material. Accordingly, the particular key subject matter in original images is allowed to be present in a reference plane of the intended stereoscopic image so as to produce a sharp image stereoscopically that has a satisfactory three-dimensional effect.

As will be described later in this specification, a light-shielding plate that can be opened or closed as required may be provided on the lenticular light-sensitive material as a means that enables the operator to check to see if the key subject matter in each original image is in registry with a common reference point on the lenticular light-sensitive material. A plurality of original images are projected, either simultaneously or individually, onto this plate and checking is made as to whether the matching of the key subject matter has been properly accomplished by the first mirror unit. As an additional device for checking for the registry between the views of the key subject matter in the respective images, a sensor for measuring image contrast may be placed in the position where the key subject matter is to be projected onto the light-shielding plate. In this case, the first mirror unit may be automatically adjusted so as to provide a maximum contrast for the projected image.

The key subject matter is typically an object at which the camera is focused but if desired, another object may be selected as the key subject matter. The term "key subject matter" as used herein means an object which, when the observer looks at the lenticular light-sensitive material carrying exposed original images, appears to lie just within the reference plane of the intended stereoscopic image.

Further, a stereoscopic image of an appropriate lightness can be produced by providing an exposure adjusting unit that is capable of adjusting the amount of printing (exposure) of the original images taken either individually or as a whole.

Hence, the stereographic printing apparatus according to the fourth aspect of the present invention has the advantage that it yields a smaller number of missing pixels in the printed stereoscopic image than when the conventional two-frame printing method is adopted. In addition, this apparatus is capable of dealing with three or more frames or original images since the optical paths in the apparatus are such that in the exposing process, the projecting light is reflected by mirrors while utilizing not only the light along the optical axis of the projecting lens but also the peripheral light. A further advantage of the apparatus is that by scanning over the lenticular light-sensitive material as it is rocked during exposure or printing, the line width of linear picture elements under the lenticular sheet can be increased to produce a stereoscopic image which does not appear to flicker.

The present invention has another advantage in that it needs only one projecting lens whereas the conventional multi-frame printing system uses plurality of lenses It also has the advantage that it does not require a means of transporting the frame-carrying film or the lenticular light-sensitive material although such a means is necessary in the conventional system that moves the light-sensitive material relative to the projecting lens. Also, the invention does not require the need to adjust the angle of the projecting lens unit. Hence, one of the outstanding features of the apparatus of the present invention is its simple mechanism. Further, a plurality of original images are exposed simultaneously, so in the case of processing N original images, the efficiency is increased by about N times. All of the original images are scanned as they are rocked during exposure and this permits the linear picture elements to be enlarged by a simple mechanism and with high efficiency. The absence of the need to move negative films or light-sensitive materials during exposure contributes to size reduction.

The apparatus for implementing the lenticular stereographic projecting method of the present invention is described below in detail with reference to the preferred embodiments shown in the accompanying drawings.

Several embodiments of the present invention are described below with reference to the case where it is applied to indirect stereography in which a third-dimensional object is photographed as a number of, for example, three frames of two-dimensional views from different vantage points and the resulting two-dimensional views are projected through a lenticular light-sensitive material as a composing lenticular screen so as to compose a three-dimensional image.

As shown in FIG. 1, an object 51 is photographed with a three-lens camera 57 that is capable of creating images on a film (light-sensitive material) 55 through three lenses $53_1$, $53_2$ and $53_3$ from different viewpoints, whereby a plurality of stereographic original images are produced (in the case under consideration, three original images $13_1$, $13_2$ and $13_3$ are produced in correspondence with the right image, center image and the left image, respectively).

Described below is the optical system for use in the Case where the film having the three original images taken from different viewpoints is exposed onto the stereographic lenticular light-sensitive material having the light-sensitive layer on the back side. The film having the three original images printed thereon may be exposed in such a way that the three original images $13_1$, $13_2$ and $13_3$ are separate from one another. However, it should be noted that in the case under consideration, the three original images are not separate but are arranged continuously on the film. This is advantageous from a practical viewpoint since films that have been photographed by ordinary users can be printed without requiring any preliminary processing.

An embodiment of the present invention is described below with reference to FIGS. 2-4. The stereographic printing apparatus according to the fourth aspect of the present invention is chiefly composed of a light source 11, a condenser lens 12, a holder 30 that retains a plurality of original images 13, formed on film 55, in predetermined positions for example three original images $13_1$, $13_2$ and $13_3$, that have been a single projecting lens 14 that is common to the three original images, a mirror optical assembly 15 that can be adjusted in such a way that light will pass through different optical paths for different original images to be incident on a lenticular light-sensitive material 18 at predetermined angles, and a plate 31 that holds the lenticular light-sensitive material 18, consisting of a light-sensitive layer 20 on the back side of a lenticular sheet 19, of a predetermined position.

The light source 11 is a source of white light and may be a halogen lamp. The condenser lens 12 condenses the divergent rays of light from the light source 11 to produce substantially parallel rays that will illuminate the original images. It has the advantage of providing high contrast This condenser lens may be replaced by a mirror box in order to produce diffusing light that illuminates the original images in such a way that pinholes and other defects in the original images will not be projected and exposed onto the light-sensitive material.

The film holder 30 holds a negative- or positive-acting film that carries original images (e.g. in a continuous form) that have been produced in the manner described above. The film on this holder is kept a predetermined distance away from the optical system and the lenticular light-sensitive material. The film holder 30 may be adapted to be transportable by a known feed mechanism such as reels, the combination of a motor and a cam, the combination of a solenoid and a rod, or the combination of a spring and a hook that is to be activated in the film feed step.

The projecting lens 14 is typically a convex lens that has a predetermined focal length or a combined lens that will eliminate predetermined aberrations. The projecting lens 14 insures that the projecting light of each original image will effectively focus in the lenticular light-sensitive material. The projecting light is preferably adapted to be movable in the direction of its optical axis so that the original images, taken as a whole, can be brought into focus. A diaphragm stop (not shown) may be provided behind or in front of the projecting lens 14 or between the lenslets if the projecting lens 14 is a combined lens; this is desirable since it is effective in preventing the occurrence of flare in the image to be projected, whereby a sharp image can be projected onto the light-sensitive material. A suitable diaphragm stop has a brightness of approximately F 16–22 and this is preferred since it will not cause a substantial decrease in the amount of exposure while maintaining high image quality.

The mirror optical assembly 15 is capable of adjusting the projecting light in such a way that it will travel through different optical paths for different original films and that yet all the optical pathlengths to the lenticular light-sensitive material 18 will be the same. The assembly 15 also adjusts the projecting light so that the respective light beams will be incident on the lenticular light-sensitive material 18 at predetermined angles. This mirror optical assembly 15 comprises a first mirror unit 16 composed of mirrors $16_1$, $16_2$ and $16_3$ and a second mirror unit 17 composed of mirrors $17_1$, $17_2$ and $17_3$. The first mirror unit insures that the light beam that has passed through the original images formed on a negative or positive film and that contains the associated image information is split into beamlets containing the image information for the respective original images. The second mirror unit insures that the beamlets corresponding to the associated original images are incident on the lenticular light-sensitive material 18 at predetermined angles while adjusting optical pathlengths in such a way that all the beamlets will travel the same distance to the light-sensitive layer 20 of the lenticular light-sensitive material 18 In FIG. 2, mirror $16_2$ in the first mirror unit 16 and mirror $17_2$ in the second mirror unit 17 which are associated with the central beam or beamlet corresponding to the projecting light from the central original image $13_2$ are omitted for the sake of clarity since they are disposed in the direction normal to the paper. Those mirrors will be described later in this specification with reference to FIG. 4 as a discussion is made with respect to the central original image $13_2$.

In FIGS. 2–5, an angle adjusting means 41 for adjusting the key subject matter is shown to be mounted on the first mirror unit 16 (composed of mirrors $16_1$, $16_2$ and $16_3$); however, in the embodiment under discussion, this angular adjusting means 41 is not absolutely necessary, so the adjustment of the key subject matter using this means will be described hereinafter and will not be the topic of the discussion that immediately follows.

In the embodiment under consideration the adjustment of the key subject matter as a stereoscopic image can be effected using primarily the first mirror unit 16 (composed of mirrors $16_1$, $16_2$ and $16_3$). If one wants to obtain a sharp stereoscopic image, it is necessary that the projected images of the key subject matter be aligned in registry with a common point on the light sensitive material 18.

Figure 2:
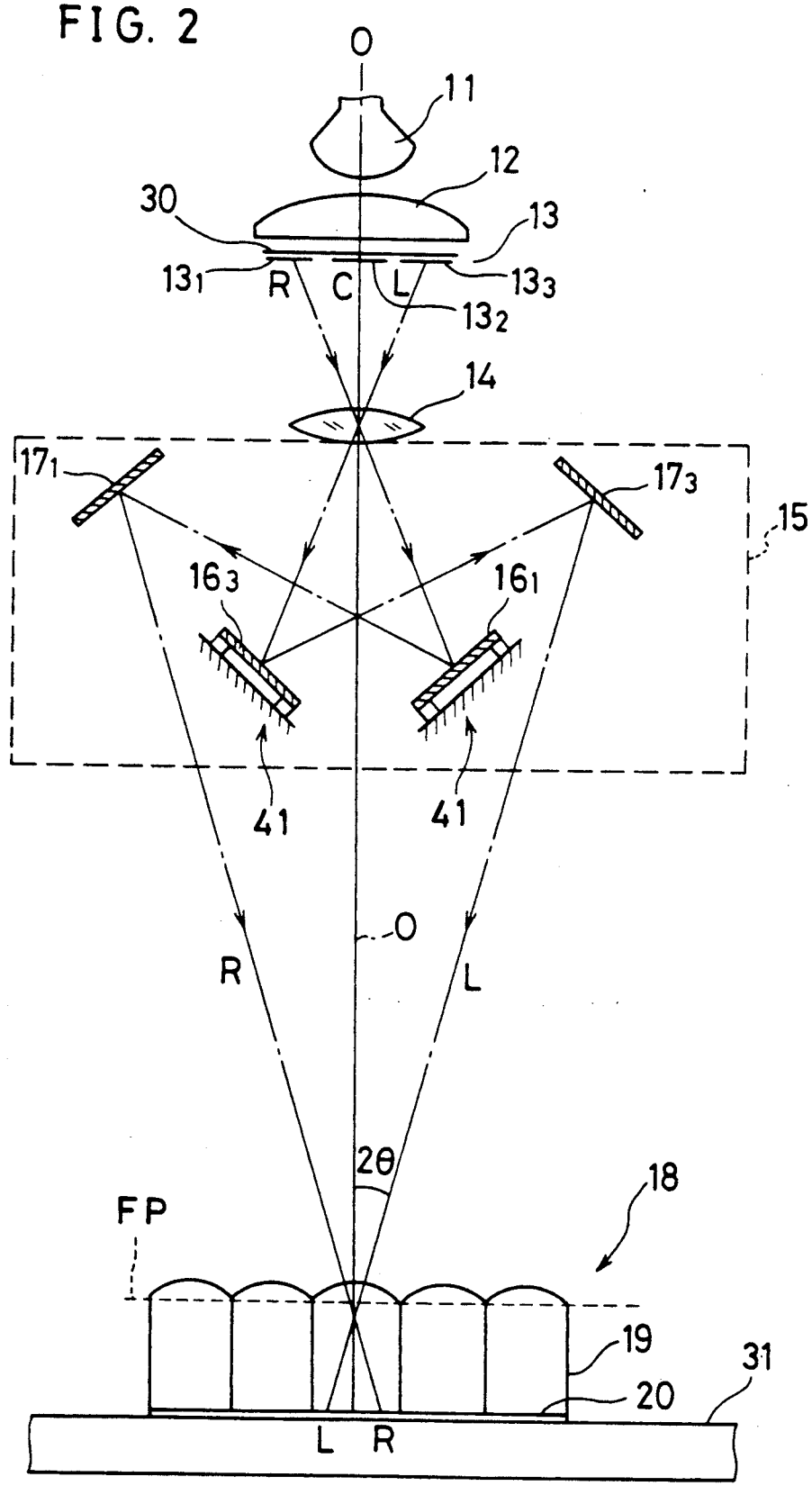
FIG. 2 is a diagram showing an optical arrangement in a perpendicular direction with respect to the image plane of a lenticular light-sensitive material with reference to the case where three original images are printed on the lenticular light-sensitive material by means of the stereographic printing apparatus of the present invention.

Considering limited space, the layout for the mirror optical assembly 15 as related to the optical paths in the horizontal direction along the film surface may be as shown in FIG. 2, in which mirror 16, in the first mirror unit and mirror $17_1$ in the second mirror unit, which are associated with the original image $13_1$, and mirror $16_3$ in the first unit and mirror $17_3$ in the second unit, which are associated with the original image $13_3$, are arranged symmetrically with respect to the optical axis O of the overall optical system (i.e., the optical axis normal to the central original image) which is perpendicular to the generatrix of the lenticular light-sensitive material 18. Alternatively, those mirrors may be staggered along the optical axis O as shown in FIG. 3. Whichever method is adopted, the limited space can be efficiently used.

Changing the optical paths by means of the mirror optical assembly as in the printing apparatus shown in FIG. 2 will contribute to extended optical pathlengths. This is clear from FIG. 3, in which the mirror images of the original images $13_1$ and $13_3$ are designated by $13_1'$ and $13_3'$, respectively.

In the mirror optical assembly shown, the beams containing image information from the first and third original images $13_1$ and $13_3$ are reflected by mirrors 161 and $16_3$ in the first unit as well as mirrors $17_1$ and $17_3$ in the second unit, so that they are projected onto the lenticular light-sensitive material 18 at an angle of $2\theta$ with respect to the optical axis of the projecting lens 14 and in a manner symmetrical with respect to that optical axis. In FIG. 3, the lenticular sheet 19 of the lenticular light-sensitive material 18 is omitted and the light-sensitive layer 20 is represented by a simplified line.

Figure 4:
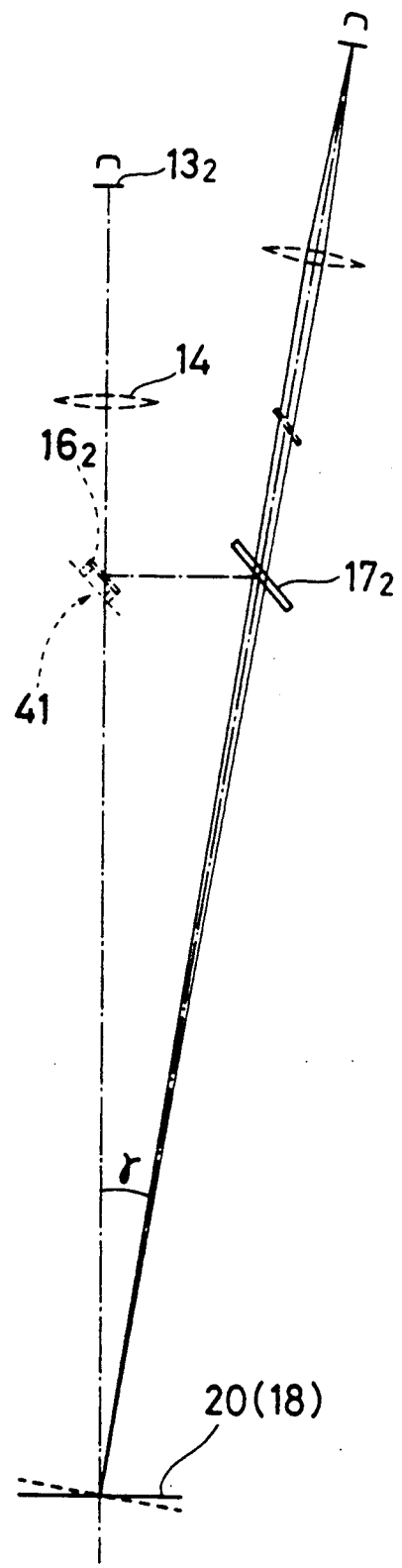
FIG. 4 is a diagram showing an optical arrangement of the stereographic printing apparatus of the present invention in a longitudinal direction with respect to the image plane of a lenticular light-sensitive material.

We now describe the beam from the central original image $13_2$ with reference to FIG. 4. In the case shown, the focal positions of the beams for all of the original images are to be adjusted with the single projecting lens 14, so in order to adjust the optical pathlength of the beam from the central original image $13_2$ to be equal to the optical pathlengths of the beams from the other original images, the optical path of the central beam is changed by means of the two optical path adjusting mirrors $16_2$ and $17_2$ in a substantially normal direction with respect to the plane defined by the centers of the beams from the other original images $13_1$ and $13_3$ and, thereafter, the same central beam is directed towards the lenticular light-sensitive material 18 so that it will be incident on the latter. Thus, in the case shown, the optical path of the central beam can be extended by an amount that is substantially equal to the pathlength between the two mirrors $16_2$ and $17_2$ in the mirror optical assembly 15. In this case, the central beam of the projecting light will fall on the light-sensitive layer 20 of the lenticular light-sensitive material 18 at a predetermined incident angle $\gamma$ with respect to the line normal to that layer. This produces a vertical offset in the image plane but it can be eliminated by mirror adjustments. Nevertheless, a trapezoidal distortion will remain on account of the tilting image plane. In practice, this distortion will not affect the final stereoscopic image if the incident angle $\gamma$ is adequately small. On the other hand, if the incident angle $\gamma$ is not negligibly small, a wedge-shaped prism may be provided just behind the original image $13_2$ so as to correct the image plane for the tilting due to the oblique incidence on the lenticular light-sensitive material 18.

Figure 5:
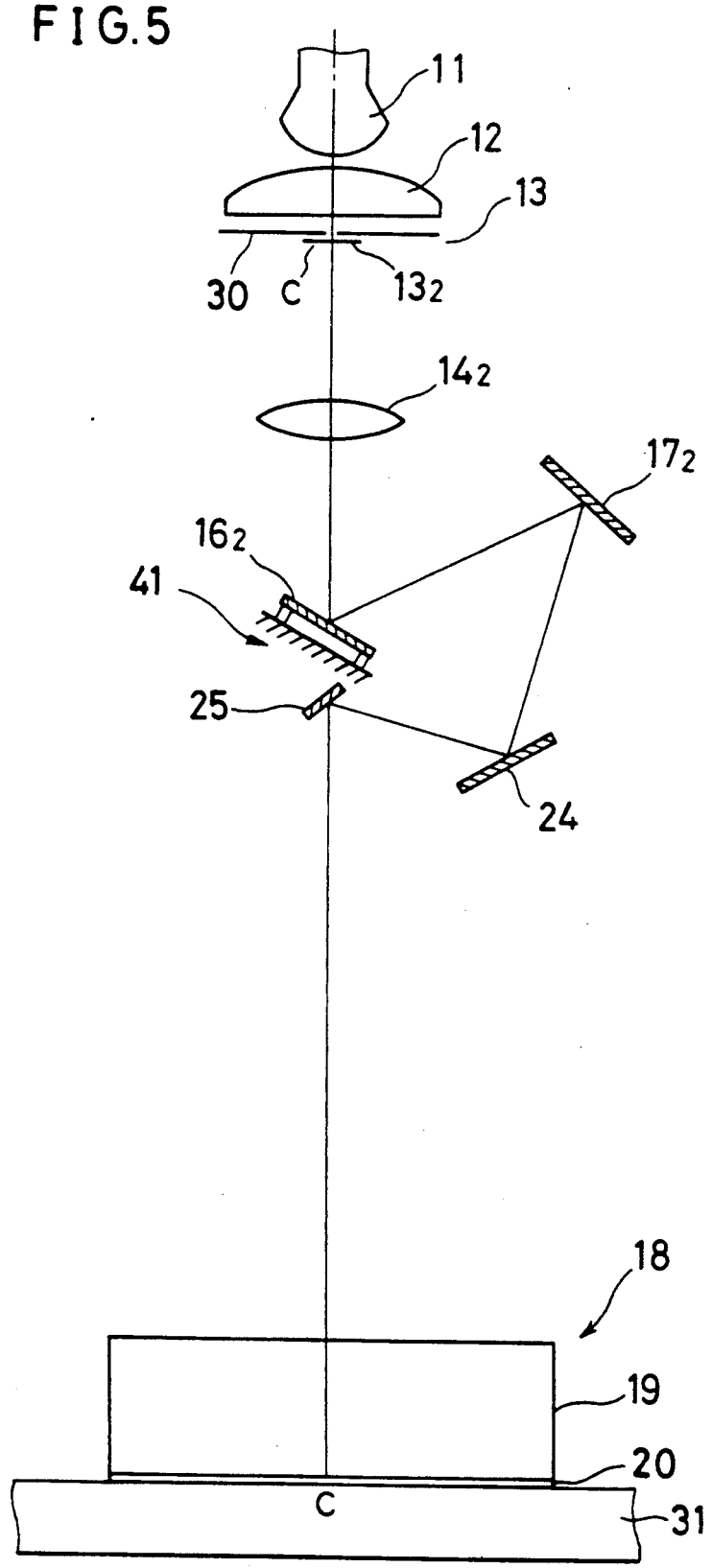
FIG. 5 is a diagram showing another optical arrangement of the stereographic printing apparatus of the present invention.

Alternatively, the mirror optical assembly 15 shown in FIG. 4 may be so modified that it is composed of four mirrors $16_2$, $17_2$, 24 and 25 as shown in FIG. 5, whereby the projecting light from the original image $13_2$ is bent to travel in a roughly U-shaped optical path. In this way, the optical pathlength of the beam from the central original image can be extended to become equal to the optical pathlengths of the beams of the projecting light from the other original images and, at the same time, the angle at which the central beam is incident on the lenticular light-sensitive material 18 can be reduced to zero.

In the optical system shown in FIG. 4, the beam containing the image information for the second original image $13_2$ is reflected by mirror $16_2$ in a direction perpendicular to the plane including the optical unit associated with the original images $13_1$ and $13_3$ and this beam is further reflected by mirror $17_2$ which adjusts it to travel by the same optical pathlength as the beams containing the image information for the first and third original images $13_1$ and $13_3$. The thus reflected beam is then projected onto the light-sensitive layer 20 of the lenticular light-sensitive material 18 either in a direction perpendicular to the light-sensitive layer 20 or at angle $\gamma$ as it is slightly inclined towards the generatrix of the lenticular sheet. In the lenticular light-sensitive material 18, the beamlets from the original images $13_1$, $13_2$ and $13_3$ are crossed at the center of curvature of a lenticular lens 19 so that they will illuminate the light-sensitive layer 20 (see FIG. 2).

In the embodiment under consideration, mirrors are used for beam splitting but similar results can be attained even if prisms are substituted for mirrors. If the amount of exposure to be applied to the light-sensitive layer is large, an ND filter and some other suitable means may be provided in collectively intensity of the beams either individually or in entirety. Further, in order to adjust the light intensity of the beams for the respective original images, a suitable light intensity adjuster such as the combination of a polarizing filter and a liquid-crystal shutter may be provided between the light source unit and each of the original images.

The central area and the periphery of the light-sensitive layer in the lenticular light-sensitive material 18 will usually be illuminated with uneven quantities of light on account of various factors such as the light source and the projection lens. To correct this phenomenon (i.e., the drop in the brightness of the edge of image field) by the cosine-fourth-power ($\cos^4\theta$) law, a correcting mask that operates on the cosine-fourth-power law may be provided either in front of or behind the projecting lens (or within the projecting lens if it is a combined lens) or a light source may be employed that is enhanced in the brightness of the edge of image field according to the cosine-fourth-power law.

Figure 6:
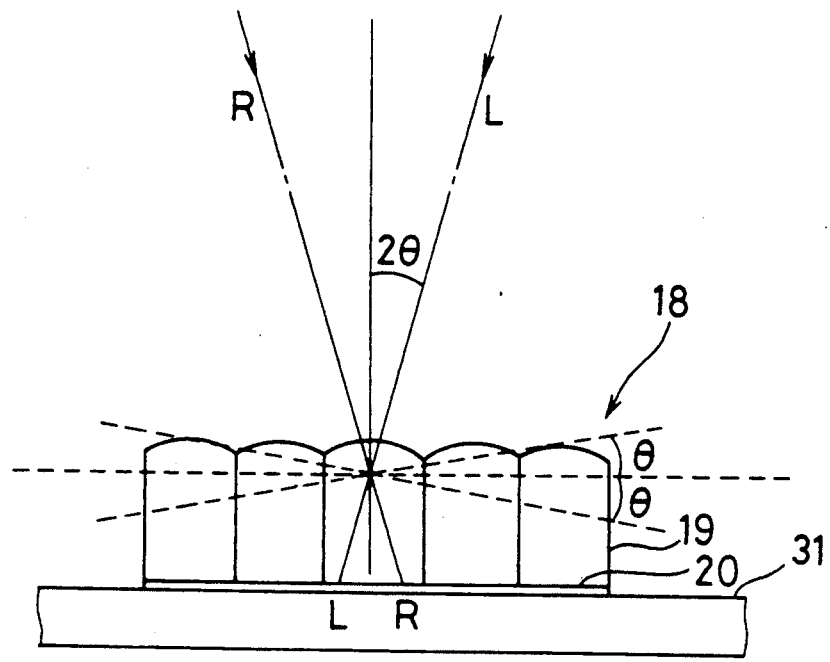
FIG. 6 is a sketch illustrating the range of angles through which a lenticular light-sensitive material is to be rocked.

As shown in FIG. 6, the lenticular sheet 19 has such a profile that the side where incident beams are admitted has a plurality of continuous cylindrical lens portions having a predetermined curvature (as of a cylindrical surface or a parabolic surface) whereas the side where the light-sensitive layer 20 is provided is flat. The lenticular sheet has a refractive power only in the direction of the width of the lenticular cylindrical lens portions. The cylindrical lens portions are composed of a transparent material having a refractive index of ca. 1.4–1.6.

The lenticular sheet 19 characterized above may be ideally rocked about each of the linear picture elements on the light-sensitive layer where the individual original images are focused but this condition is difficult to meet. In practice, the sheet is rendered to be freely rockable through angles of $\pm 0$ about the center of curvature of the lenticular cylindrical lens on top of the central part of the lenticular light-sensitive material 18 (see FIG. 6) or, alternatively, the sheet may be adapted to be freely rockable about its generatrix (the line on the cylindrical curved surface) that intersects with the optical axis of the projecting lens (not shown).

Figure 7:
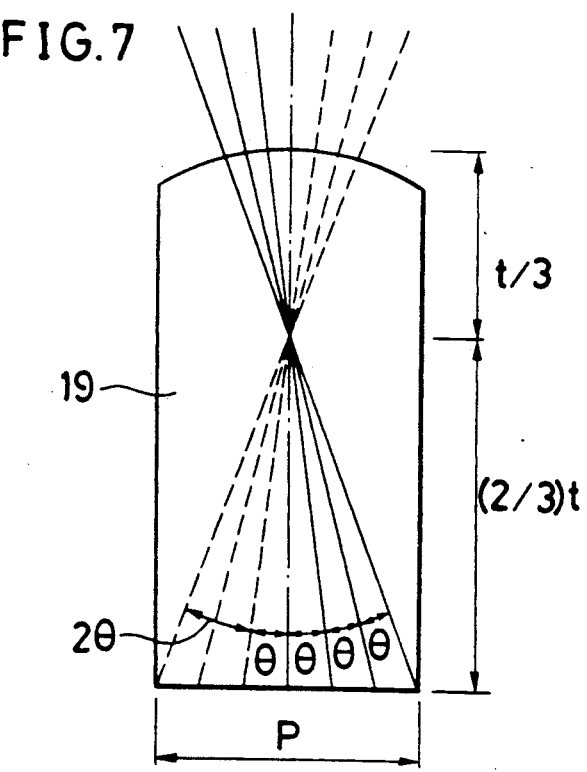
FIG. 7 is a sketch showing in detail the range of angles through which a lenticular light-sensitive material is to be rocked.

The lenticular sheet is allowed to rock, during exposure, about the support axis by means of a drive unit (not shown) through angles of $\pm \theta$ with respect to the reference plane. By so doing, each of the linear picture elements will spread for the angular range of $2\theta$ over the surface of the light-sensitive layer 20 under the lenticular sheet 19 and the linear picture elements corresponding to the respective original images will spread evenly within the pitch of one lenticule. Consider, for example, the case like the embodiment under discussion where one attempts to form three spread linear picture elements within the pitch of one lenticule using three original images; as shown in FIG. 7, the respective linear picture elements can be recorded on the lenticular light-sensitive material in such a way that their line width is increased within the three regions into which the pitch of one lenticule is divided.

When rocking the lenticular light-sensitive material, vacuum may be used to fix the back side of that material, which is permitted to rock about the support axis as it is held under vacuum. Alternatively, the lenticular light-sensitive material may be fixed whereas the film holder unit, the projection lens unit and the mirror optical assembly may be rocked as an integral assembly.

The rocking angle $\theta$ is described below with reference to FIG. 7. Consider the case where the lenticular sheet 19 has pitch P of one lenticule and a thickness of t, with the lenticular lenses having a refractive index (n) of 1.5. Let assume that the center of curvature of a lenticule is located in the position of $(\frac{2}{3})t$ from the bottom of the sheet, where all incident beams are supposed to intersect one another. Then, the following equations will hold:

$$\tan 3\theta = (\tfrac{1}{2})P/(\tfrac{2}{3})t,$$

hence, $$3\theta = \tan^{-1}(\tfrac{1}{2})P/(\tfrac{2}{3})t,$$

hence, $$\theta = (\tfrac{1}{3})\tan^{-1}(3P)/(4t) \tag{1}$$

If the radius of curvature is written as r and if it is assumed that the rocking angle is small whereas the line width corresponding to $\theta$ is equal within the pitch of a lenticule, the rocking angle $\theta$ can be calculated as follows:

$$t = [n/(n-1)]r$$

$$\tan\theta \approx (P/6)/(t-r)$$

Substituting n=1.5 in the first equation, t=3r and the following equations will hold:

$$\tan\theta = (P/6)/(2r)$$

$$\theta = \tan^{-1} P/12t = \tan^{-1}(P/4t)$$

By properly adjusting the angles of mirrors $17_1$ and $17_3$, as well as the rocking angle of the lenticular light-sensitive material, the line width of the linear picture elements under the central part of the lenticular sheet can be made different from that of the linear picture elements on either the right or the left side of the lenticular sheet. To this end, one may set a rocking angle greater than is necessary to print image bands of a uniform line width that are to be formed on the light-sensitive layer of the lenticular light-sensitive material. Then the shutter can be turned on or off for each beam at different time intervals during exposure with the rocking lenticular sheet. In this way, the line width of the image bands under the lenticular sheet can be increased or reduced without causing them to overlap one another. Thus, the technique described in Examined Japanese Patent Publication (kokoku) No. 31577/1981 can be accomplished.

The apparatus of the present invention has the advantage that it is applicable to the following generalized case: N original images are photographed through a single projecting lens and processed by means of a mirror optical assembly comprising N mirrors in the first unit and N mirrors in the second unit in such a way that N linear picture elements are formed uniformly within the pitch of a lenticule on the surface of the light-sensitive layer in the lenticular sheet. Even in this generalized case, the line width of linear picture elements can be increased to one-Nth (1/N) of the pitch of a lenticule. If the pitch of a lenticule in the lenticular light-sensitive material is written as P and the number of original images as N, the range of angles through which the lenticular light-sensitive material can be rocked is $2\theta = w/N$ (where w is the angular aperture of each lenticular lens) for the case where linear picture elements are recorded on the lenticular light-sensitive material over the width P/N.

Using the stereographic printing apparatus of the present invention described above, N original images photographed from different viewpoints can be printed or recorded on a lenticular sheet in such a way that the stereoscopic pixel images on the sheet are readily expanded to a line width about one-Nth of the pitch of a lenticular lens. Hence, the observer can have the correct stereoscopic view even if the positions of his two eyes move over a considerably wide range and this contributes to great convenience in observation. The apparatus of the present invention has another advantage in that there is no need to divide the film into individual frames and the original images formed on it can be exposed with a single projecting lens. Further, one need only to provide a freely adjustable mirror optical assembly. Hence, the present invention can be easily implemented with a model adapted from common photographic printers.

An embodiment of the present invention has been described above with reference to the case where three original images of the object are projected onto a lenticular light sensitive material to compose a three-dimensional view. It should, however, be noted that the concept of the present invention is also applicable to the case of printing two original images. Even in the case of printing four or more original images formed from different viewpoints, only one projecting lens need be used and the original images can be exposed simultaneously by arranging mirror optical units in a three-dimensional space in such a way that they will not physically interfere with one another.

Figure 8:
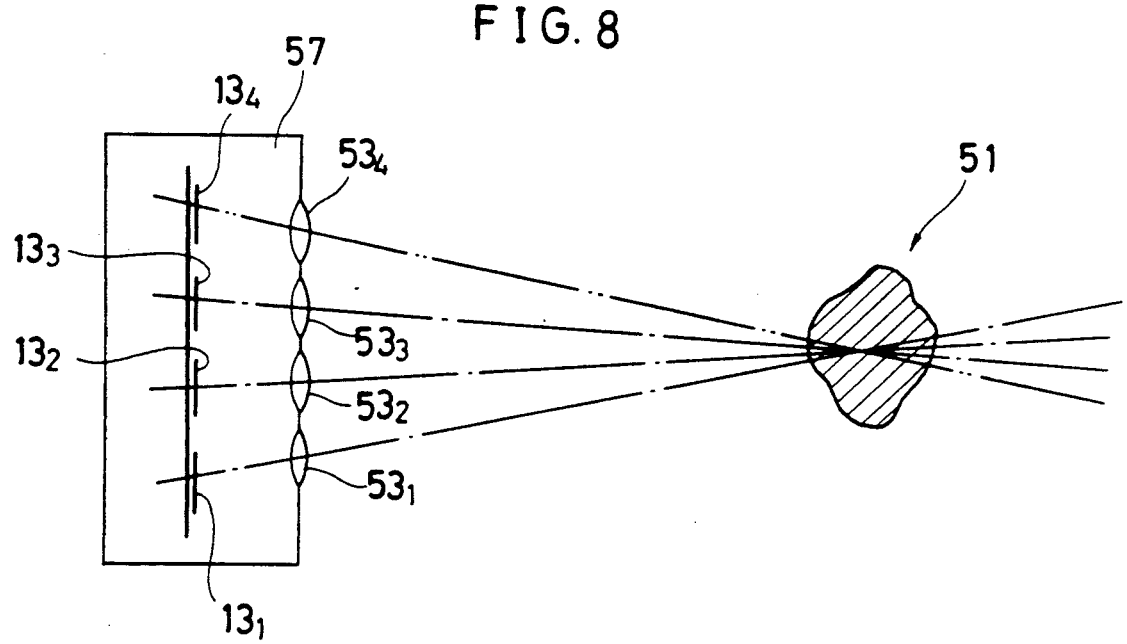
FIG. 8 is a sketch showing how four different original images are formed on a film by shooting an object with a four-lens camera.

First, as shown in FIG. 8, an object 51 is photographed with a stereographic camera 57 having four lenses $53_1$, $53_2$, $53_3$ and $53_4$, and original images $13_1$, $13_2$, $13_3$ and $13_4$ from different viewpoints are formed on a film 55 to prepare a stereographic film. The stereographic film 55 may be printed with a stereographic printing apparatus of the type shown in FIG. 9.

Figure 9:
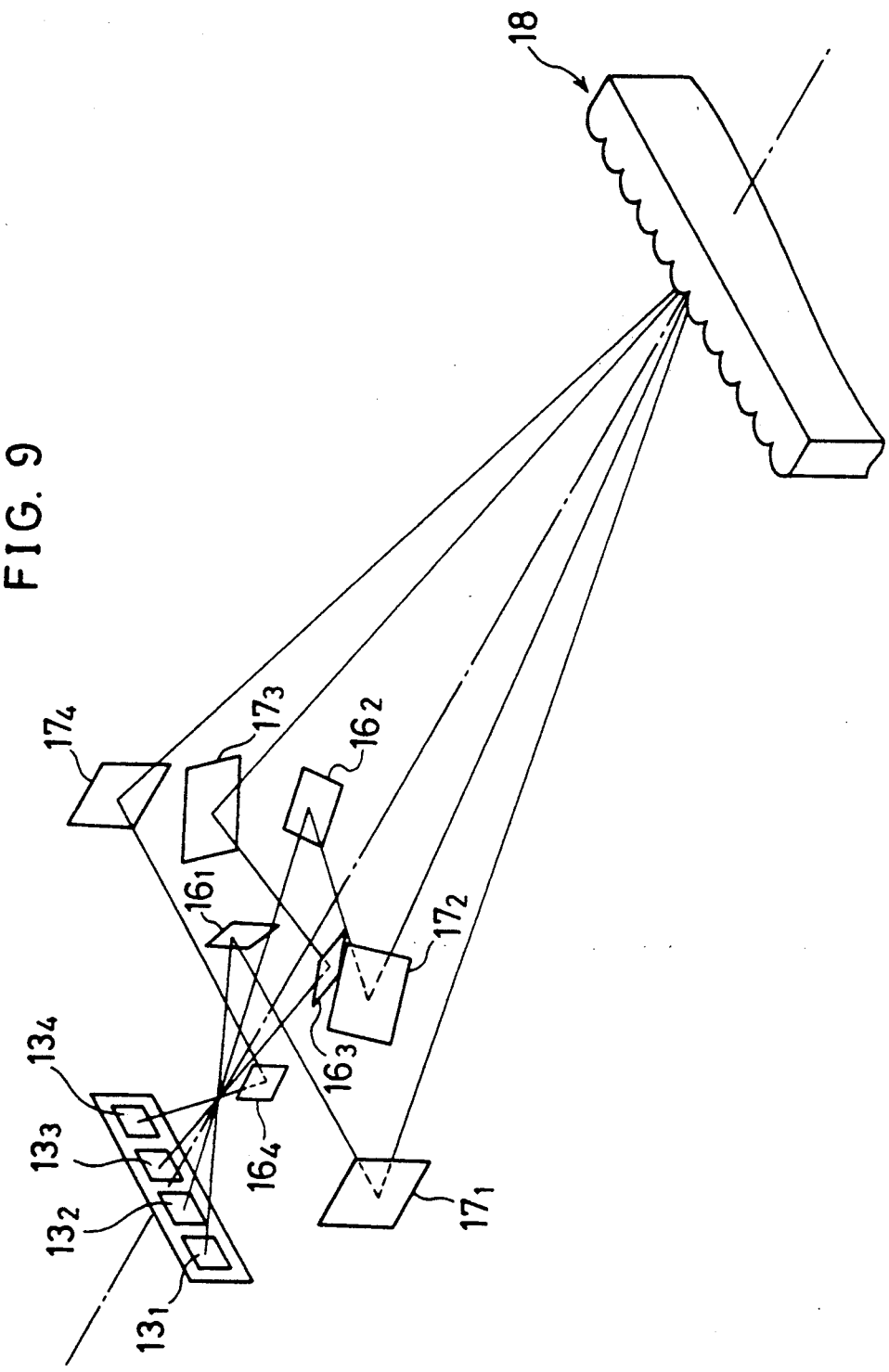
FIG. 9 is a diagram showing an optical arrangement in longitudinal direction with respect to the image plane of a lenticular light-sensitive material with reference to the case where the present invention is applied to the printing of four original images.

Here, the mirror optical units may be arranged in the following manner if one wants to achieve simultaneous exposure of four original images in accordance with the present invention. First, as for two original images, the optical layout shown in FIG. 2 may be adopted as described in connection with the embodiment for three original images. The mirror optical units for the other original images may be arranged in an optically symmetric fashion with respect to planes other than the horizontal, for example, with respect to a plane perpendicular to the optical axis of the projecting lens as shown in FIG. 9. In the case shown, one set of two mirror optical units are provided symmetrically in the perpendicular (horizontal) direction of the image plane with respect to the central axis of the lenticular light-sensitive material (i.e., the optical axis of the projecting lens) whereas another set of two mirror optical units are provided symmetrically in the longitudinal (vertical) direction of the image plane with respect to the same central axis. In FIG. 9, the beams of the projecting light passing through four original images $13_1$, $13_2$, $13_3$ and $13_4$ are reflected by mirrors $16_1$, $16_2$, $16_3$ and $16_4$, respectively, and are subsequently reflected by mirrors $17_1$, $17_2$, $17_3$ and $17_4$ in such a way that they will be incident on the lenticular light-sensitive material 18 at predetermined angles of projection.

When printing the four original images, the lenticular sheet may be allowed to rock, during exposure, about the support axis by means of a drive unit (not shown) through angles of $\pm\theta$ with respect to the horizontal plane as in the foregoing case of printing three original images. By so doing, the linear picture elements corresponding to the respective original images will spread evenly within the pitch of one lenticule. In the case under consideration, the respective linear picture elements can be recorded on the lenticular light-sensitive material in such a way that their line width is increased within the four regions into which the pitch of one lenticule is divided (see FIG. 10).

Figure 10:
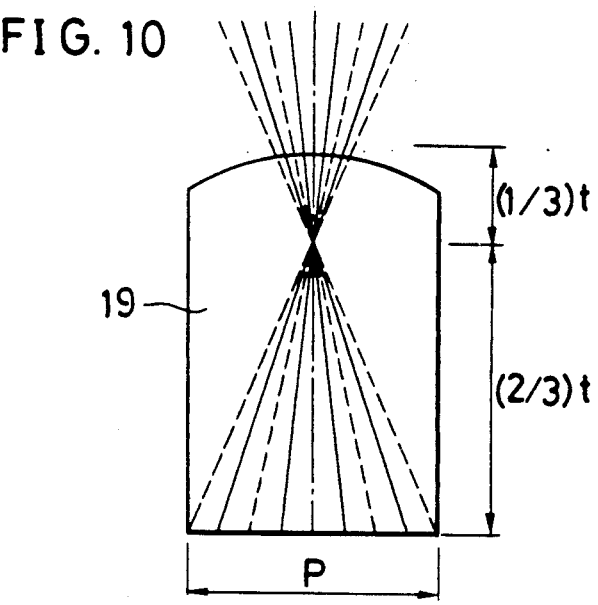
FIG. 10 is a sketch illustrating the range of angles through which a lenticular light-sensitive material is rocked when printing four original images on the lenticular light-sensitive material.

The rocking angle $\theta$ is described below with reference to FIG. 10. Consider the case where the lenticular sheet 19 has pitch P of one lenticule and a thickness of t, with the lenticular lenses having a refractive index (n) of 1.5. Let assume that the center of curvature of a lenticule is located in the position of $(\frac{1}{3})t$ from the bottom of the sheet, where all incident beams are supposed to intersect one another. Then, the following equations will hold:

$$\tan 4\theta = (\tfrac{3}{8})P/(\tfrac{2}{3})t,$$

hence, $$4\theta = \tan^{-1}(\tfrac{3}{8})P/(\tfrac{2}{3})t,$$

hence, $$\theta = (\tfrac{1}{4})\tan^{-1}(3P)/(4t) \qquad (2)$$

As will be understood from the foregoing detailed description, according to the first aspect of the present invention which relates to a stereographic projecting and recording apparatus, a plurality of continuous original images as they are retained in predetermined positions are recorded in a projection medium, such as a picture element recording medium, provided in a predetermined position on the back side of the lenticular sheet and, subsequently, they are observed as stereoscopic views either through that picture element recording medium or after being directly projected and displayed on a picture element display medium provided in a predetermined position.

According to the fourth aspect of the present invention which relates to a stereographic printing apparatus, light beams carrying a plurality of original images are passed through a single projecting lens to produce convergent light, which is then split into beams for the respective original images by means of a subsequent mirror optical assembly, with the respective beams being focused on the light-sensitive material of the lenticular light-sensitive material. In this way, a plurality of continuous original images as they are retained in predetermined positions can be printed simultaneously on the lenticular light-sensitive material through the projecting lens.

The angle of a certain mirror unit, say, a first mirror unit in the mirror optical assembly may be so adjusted that the projected views of the key subject matter in all original images will coincide on the lenticular light-sensitive material; in this way, the particular key subject matters in original images are allowed to be present in a reference plane of the intended stereoscopic image so as to produce a sharp image in relief that has a satisfactory three-dimensional effect.

The present invention has another advantage in that it requires only one projecting lens whereas the conventional multi-frame printing system requires a plurality of lenses. It also has the advantage that it does not require a means of transporting the frame-carrying film or the lenticular light-sensitive material although such a means is necessary in the conventional system, that moves the light-sensitive material relative to the projecting lens nor does it have the need to adjust the angle of the projecting lens unit. Hence, one of the outstanding features of the apparatus of the present invention is its simple mechanism. Further, a plurality of original images are exposed simultaneously, so in the case of processing N original images, the efficiency is increased by about N times. All of the original images are scanned as they are rocked during exposure and this permits the linear picture elements to be enlarged by a simple mechanism and with high efficiency. The absence of the need to move negative films or light-sensitive materials during exposure contributes to size reduction.

The stereographic projecting and recording method of the present invention described on the foregoing pages, as well as the stereographic printing apparatus used to implement that method are intended to print three or more original images with a single projecting lens through one exposure cycle ("one shot" exposure). It should, however, be noted that this is not the sole case of the present invention and it may be adapted in such a way that printing is done through more than one cycle of exposure with the combinations of selected original images being masked. A stereographic projecting and recording method that performs printing through more than one cycle of exposure and a stereographic printing apparatus that may be used to implement this method are described below.

In the next place, the stereographic projecting and recording method according to the second aspect of the present invention, as well as the stereographic printing apparatus according to the fifth aspect for implementing that method are described.

In accordance with the stereographic projecting method of the second aspect of the present invention, light beams carrying selected combinations of original images as obtained by masking are passed through a single projecting lens to produce convergent light that will form an image at a predetermined focal length, and the convergent light is split into beams for the respective original images by means of a subsequent mirror optical assembly. The beams are adjusted in such a way that all of them have a constant optical pathlength to a lenticular lens in a lenticular sheet. Thereafter the beams are directed into the lenticular lens at predetermined printing angles and are imaged as linear picture elements on the back side of the lenticular sheet. In this way, a plurality of continuous original images, retained in predetermined positions, are recorded, through the projecting lens, in a projection medium, such as a picture element recording medium, provided in a predetermined position on the back side of the lenticular sheet and, subsequently, they are observed as stereoscopic views through that recording medium. In this method, the printing operation is carried out through at least two stages by masking.

In accordance with the fifth aspect of the present invention which relates to a stereographic printing apparatus for implementing the above-described method, the rays of light issuing from a printing light source are transmitted through three or more original images carried on a film to contain the associated image information. This projecting light is processed by a mask means in such a way that only the beams from the combination of selected original images will be transmitted through the mask. The transmitted beams are then passed through a single projecting lens to produce convergent light that will form an image at a predetermined focal length, and the convergent light is split into beams for the respective original images by means of a subsequent mirror optical assembly, in which the beamlets obtained by splitting with a first mirror unit are adjusted by a second mirror unit in such a way that all of them have a constant optical pathlength to a lenticular lens in a lenticular sheet. Thereafter the beams are directed into the lenticular lens at predetermined printing angles and are imaged as linear picture elements on the light-sensitive layer of the lenticular light-sensitive material.

Hence, three or more original images can be printed repeating the process of printing the combination of selected original images. Further, the number of mirrors in the mirror optical assembly used to split beams for the respective original images can be reduced and the overall size of the optical system can accordingly be reduced to provide ease in making efficient use of a limited space. As a further advantage, by using the masking means in such a way that suitable combinations of original images as selected from a total of at least three images are masked, all of the original images can be printed in a minimum number of two steps.

For example, a set of even-numbered original images and a set of odd-numbered original images are masked alternately, with mirror optical units being provided in two groups, one for processing beams associated with the even-numbered original images and the other for processing beams associated with the odd numbered original images. In this way, all of the original images can be printed on the lenticular light-sensitive material in two steps.

If desired, the two mirror optical units, one for processing the even-numbered original images and the other for processing the odd-numbered original images, may be replaced by a single optical unit. Consider, for example, the case where those two mirror optical units are arranged symmetrically with respect to the optical axis of the projecting lens. Either one of those mirror units may be eliminated and the remaining single mirror unit is inverted (rotated by 180°), depending upon which original images are to be masked, in a manner relative to a film holding means that is fixed along the optical axis of the projecting lens. In this way, the two mirror optical units can be replaced by a single mirror unit and a simple mirror layout can be realized. A typical method of masking original images in this simplified layout is to mask the even-numbered original images alternately with the odd-numbered original images. Similar results can be attained even if the single mirror unit is fixed whereas the film holding means is inverted each time the original images to be masked are changed.

As in the first and fourth aspects of the present invention, the second and fifth aspects also have the following features:

i) the line width of linear picture elements can be increased by rocking the projection medium (e.g. the lenticular light-sensitive material) during exposure, relative to the exposing optical unit;

ii) a sharp image in relief can be formed by effecting the matching of the key subject matter with a mirror optical assembly; and iii) a stereoscopic image having appropriate lightness can be formed by properly adjusting the amount of exposure with an exposure adjusting unit.

Consequently, the stereographic printing apparatus according to the fifth aspect of the present invention has the advantage that it yields a smaller number of missing pixels in the printed stereoscopic image than when the conventional two-frame printing method is adopted. In addition, this apparatus is capable of dealing with three or more frames or original images since the optical paths in the apparatus are such that in the exposing process, the projecting light is reflected by mirrors while utilizing not only the light along the optical axis of the projecting or enlarging lens but also the peripheral light. A further advantage of the apparatus is that by scanning over the lenticular light-sensitive material as it is rocked during exposure or printing, the line width of linear picture elements under the lenticular sheet can be increased to produce a stereoscopic image containing few flickers.

The present invention has another advantage in that it requires only one projecting lens whereas the conventional multi-frame printing system requires a plurality of lenses. It also has the advantage that it does not require a means of transporting the frame-carrying film or the lenticular light sensitive material although such a means is necessary in the conventional system that moves the light-sensitive material relative to the projecting nor does it have the need to adjust the angle of the projecting lens unit. Hence, one of the outstanding features of the apparatus of the present invention is its simple mechanism. Further, a plurality of original images are exposed sequentially in at least two steps, so in the case of processing N original images, the efficiency is increased by a maximum of about N/2 times. All of the original images are scanned as they are rocked during exposure and this permits the linear picture elements to be enlarged by a simple mechanism and with high efficiency. The absence of the need to move negative films or light-sensitive materials during exposure contributes to size reduction.

Preferred embodiments of the stereographic printing apparatus according to the fifth aspect of the present invention for implementing the lenticular stereographic projecting method according to the second aspect of the invention are described below in detail with reference to accompanying drawings.

On the pages that follow, several embodiments of the fifth aspect of the present invention are described with reference to a stereographic printing apparatus that is to implement indirect stereography. As shown in FIG. 1, an object 51 is photographed on a frame-carrying film 55 through three lenses $53_1$, $53_2$ and $53_3$ from different viewpoints, whereby a plurality of three original images $13_1$, $13_2$ and $13_3$ are produced and subsequently printed on the light-sensitive layer of a lenticular light-sensitive material as a projection medium. The following description should be read in conjunction with FIGS. 11-13.

An embodiment of the present invention is described below with reference to FIGS. 11-13. The stereographic printing apparatus according to the fifth aspect of the present invention is chiefly composed of a light source 11, a condenser lens 12, a film transport unit 21 for transporting a film that carries a plurality of original images 13, say, three original images $13_1$, $13_2$ and $13_3$ that have been photographed with the camera 57 (see FIG. 1) from different viewpoints, a mask 23 for masking the combination of selected original images, a mask drive unit 22 for driving the mask 23, a single projecting lens 14 that is common to the three original images, a mirror optical assembly 15 that can be adjusted in such a way that light will pass through different optical paths for different original images to be incident on a lenticular light sensitive material 18 at predetermined angles, and a plate 31 that holds in a predetermined position the lenticular light-sensitive material 18 having a light-sensitive layer 20 on the back side of a lenticular sheet 19.

Figure 3:
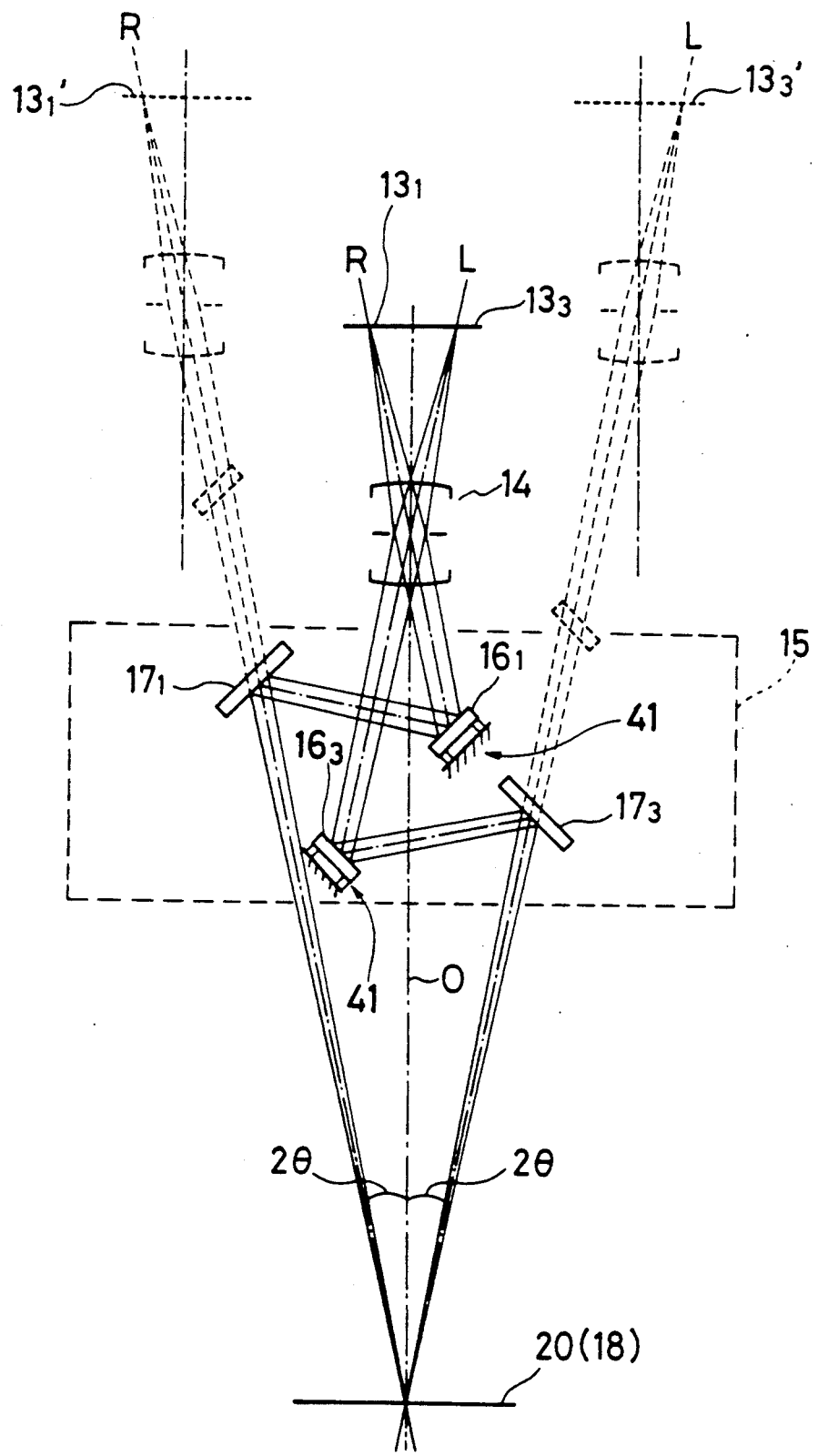
FIG. 3 is a diagram showing another optical arrangement of the stereographic printing apparatus of the present invention.
Figure 11:
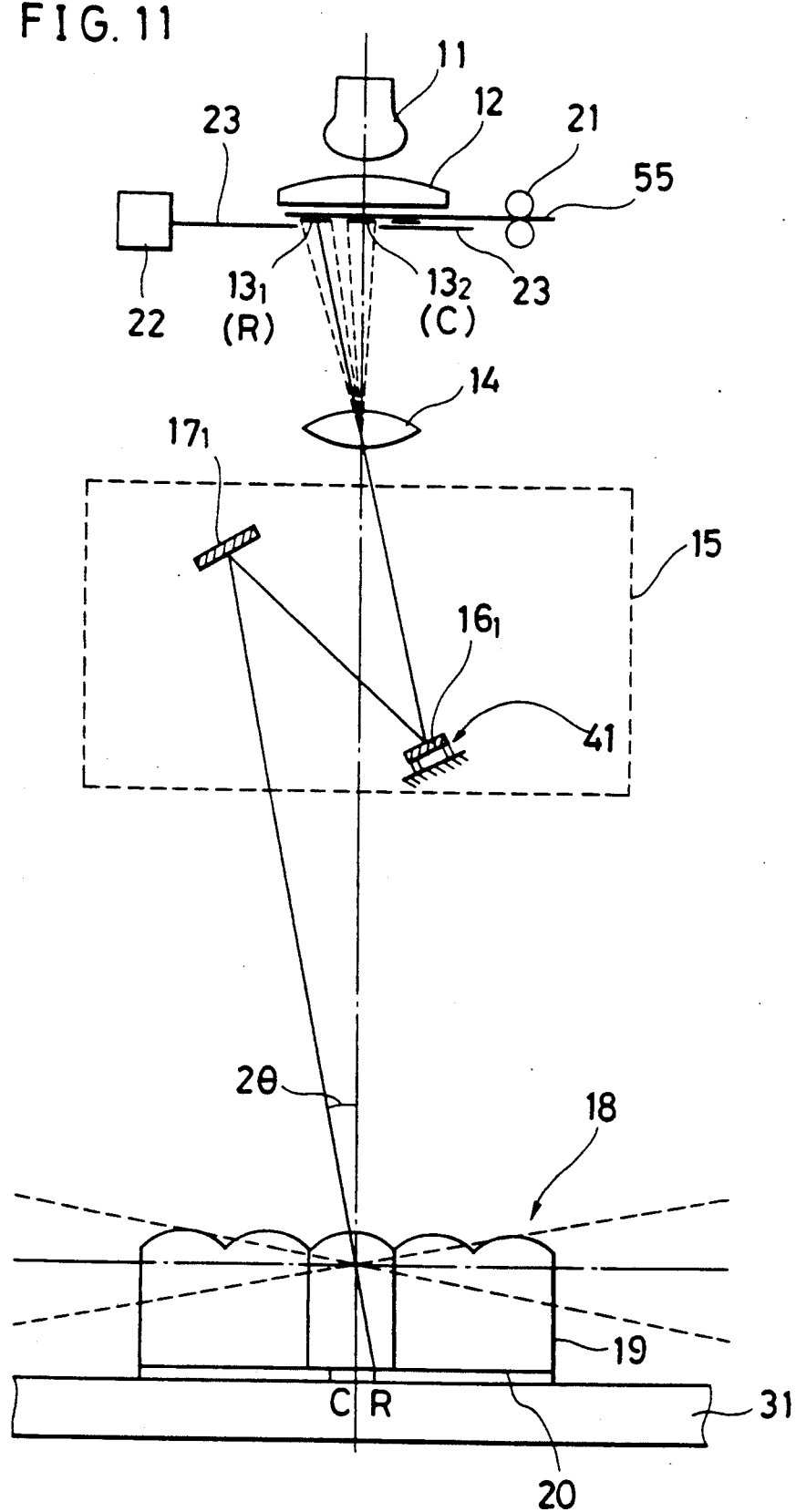
FIG. 11 is a diagram showing an optical arrangement in a perpendicular direction with respect to the image plane of a lenticular light-sensitive material with reference to the case where three original images are printed on the lenticular light-sensitive material by means of the stereographic printing apparatus of the present invention.
Figure 12:
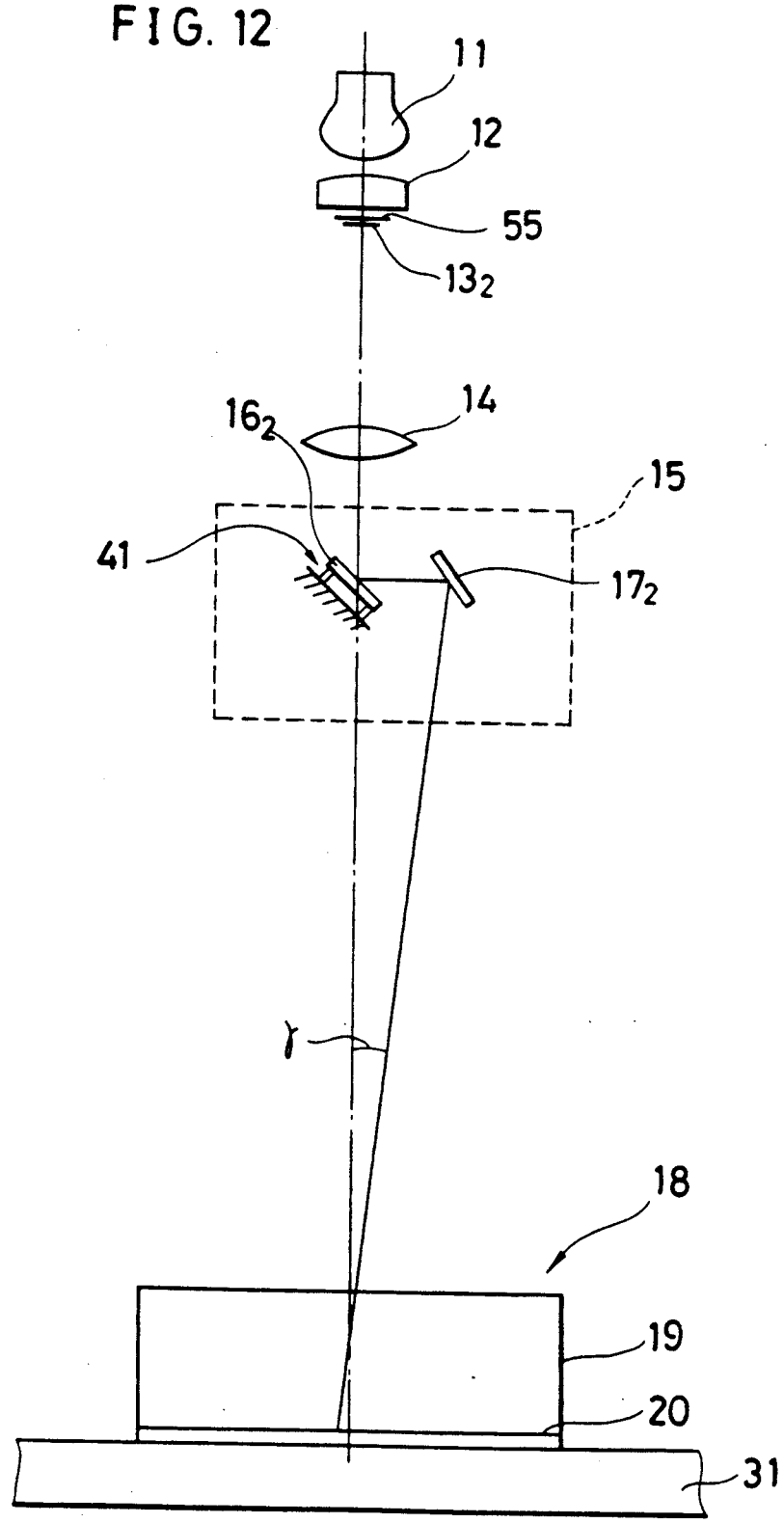
FIG. 12 is a diagram showing an optical arrangement in longitudinal direction with respect to the image plane of a lenticular light-sensitive material.
Figure 13:
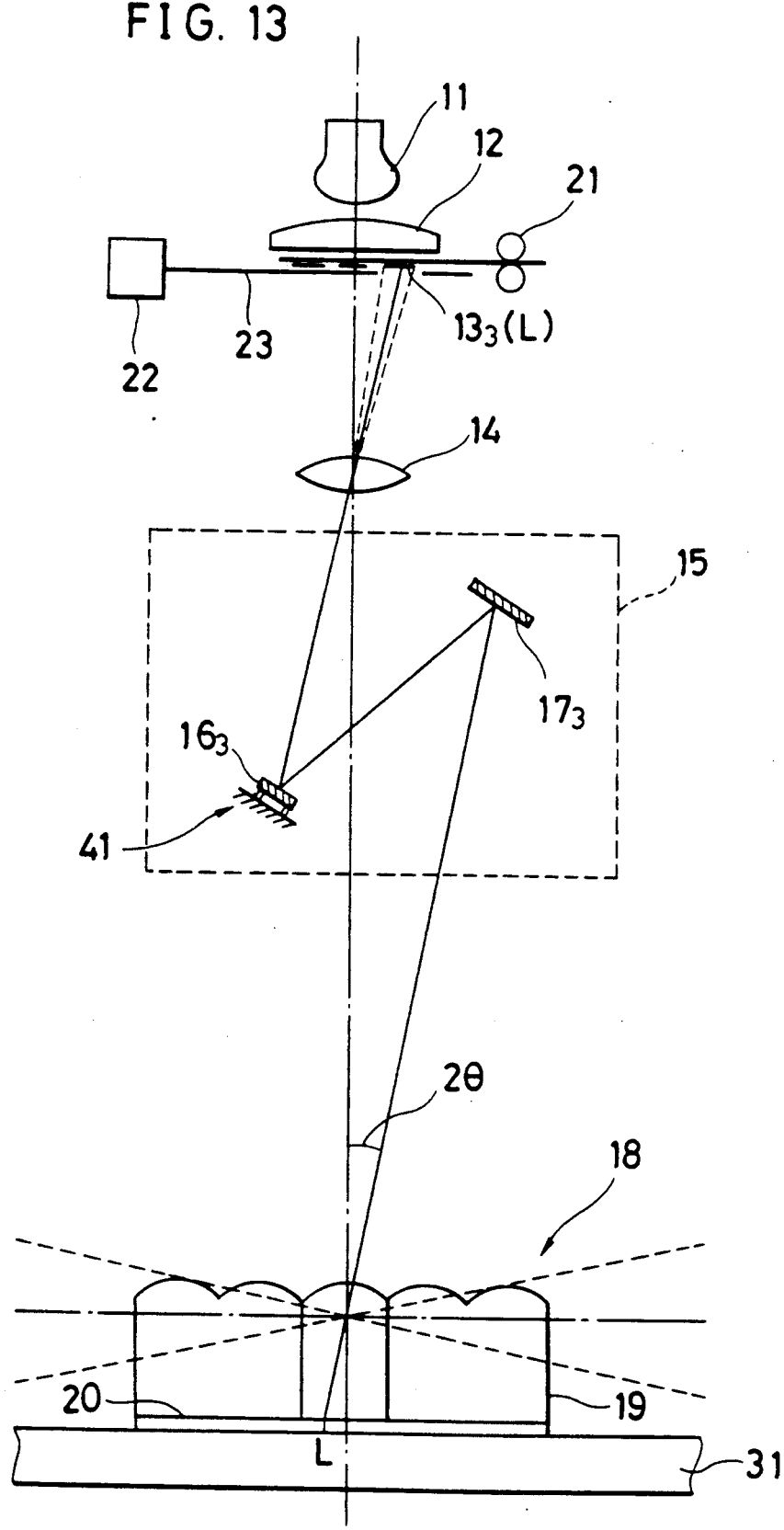
FIG. 13 is a diagram showing another optical arrangement in a perpendicular direction with respect to the image plane of a lenticular light-sensitive material.

The stereographic printing apparatus shown in FIGS. 11-13 has essentially the same construction as the stereographic printing apparatus shown in FIGS. 2-4 except that the former has the mask 23 for masking the combination of certain original images and the mask drive unit 22 for driving the mask 23 and that a plurality of original images are printed in a plurality of steps (i.e., three original images are printed in two exposure steps). Hence, the parts or components that are similar to those shown in FIGS. 2-4 are identified by like numerals and will not be described in detail. It should also be noted that for the sake of clarity, FIGS. 11-13 do not illustrate mirrors and other optical units that do not relate to the printing operation.

In FIGS. 11-13, an angle adjusting means 41 for adjusting the key subject matter is shown to be mounted on the first mirror unit 16 (composed of mirrors $16_1$, $16_2$ and $16_3$); however, in the embodiment under discussion, this angular adjusting means 41 is not absolutely necessary, so the adjustment of the key subject matter using this means will be described hereinafter and will not be the topic of the discussion that immediately follows.

In the apparatus shown, the film transport unit 21 supplies the film 55 to a predetermined position before stereographic printing, holds the film 55 during stereographic printing in such a way as to keep a constant distance to the lenticular light-sensitive material 18, and removes the film 55 after printing. The film transport unit 21 may typically be composed of a supply reel, a takeup reel, guides, a frame, etc.

The mask 23 is a plate that is made of a rigid material selected from among metals and plastics and that has openings in a predetermined mask pattern that comply with frames of original images. An end of this mask 23 is supported in such a way that it can be freely moved by means of the mask drive unit 22. The mask 23 is moved over and parallel to a plane which is an extension of the mask 23. The mask drive unit 22 may be composed of a known feed mechanism such as the combination of a motor and a cam, the combination of a solenoid and a rod or the combination of a spring and a hook that is activated in the film feed step.

In the stereographic printing apparatus described above, image printing is accomplished in two steps, one for printing the original images $13_1$ and $13_2$ which are on the left side and center of FIG. 11, and the other for printing the original image $13_2$ which is on the right side.

FIG. 11 shows the case where the original image $13_3$ is masked by the mask 23. In this case, the projection light from the original image $13_1$ passes through the projecting lens 14 and is reflected by mirror $16_1$ (in the first unit) and mirror $17_1$ (in the second unit) in the mirror optical assembly 15 to be projected onto the light-sensitive layer of the lenticular light-sensitive material 18. On the other hand, the projection light from the original image $13_2$ passes through the projecting lens 14 and is reflected by mirror $16_2$ and mirror $17_2$ in the mirror assembly 15 (see FIG. 12) to be projected onto the light-sensitive layer of the lenticular light-sensitive material 18. In this way, the two original images $13_1$ and $13_2$ are projected (and printed) simultaneously onto the lenticular light-sensitive material 18.

Subsequently (or prior to the printing of the original images $13_1$ and $13_2$), the mask drive unit 22 is actuated to move the mask 23 in such a way that it will mask the original images $13_1$ and $13_2$, and the original image $13_3$ is exposed by projection onto the lenticular light-sensitive material 18 through the projecting lens 14 and via mirror $16_3$ and mirror $17_3$ in the mirror assembly 15 (see FIG. 13).

In the fifth embodiment, too, it is necessary that the projected images of the key subject matter be aligned in registry with a common point on the light-sensitive layer if one wants to obtain a sharp stereoscopic image. In this case, the adjustment of the key subject matter in the final stereoscopic image can be effected using primarily the first mirror unit 16 (composed of mirrors $16_1$, $16_2$ and $16_3$).

In the mirror optical assembly shown in FIG. 11, the light beam containing the image information from the right original image $13_1$ is reflected by mirror $16_1$ in the first unit and mirror $17_1$ in the second unit to be projected onto the lenticular light-sensitive material 18 at an angle of $2\theta$ with respect to the optical axis of the projecting lens 14.

We now describe the projecting light from the central original image $13_2$ with reference to FIG. 12. In the case under discussion, two optical path adjusting mirrors $16_2$ and $17_2$ are used in order to insure that the optical pathlength of the beam from the central original image $13_2$ is equal to the optical pathlengths of the beams from the other original images. Because of this mirror assembly, the optical path of the central beam can be extended by an amount that is substantially equal to the pathlength between the two mirrors $16_2$ and $17_2$. In this case, the central beam of the projecting light will fall on the light-sensitive layer 20 of the lenticular light-sensitive material 18 at a predetermined incident angle $\gamma$ with respect to the line normal to that layer. For the vertical offset that will occur in the image plane, as well as the correction of the trapezoidal distortion that will remain if that offset is to be eliminated, see the explanation already given in connection with the embodiment shown in FIG. 4.

The projecting light from the left original image $13_3$ is then described with reference to FIG. 13. In the mirror optical assembly shown, the light beam carrying the image information from the third original image $13_3$ is reflected by mirrors $16_3$ and $17_3$ so that it is projected onto the lenticular light-sensitive material 18 at an angle of $2\theta$ with respect to the optical axis of the projection lens 14.

The mirrors shown in FIGS. 11 and 13 in association with the original images $13_1$ and $13_3$ are arranged substantially symmetric with respect to the optical axis of the projecting lens 14. Hence, if desired, one may select either the arrangement shown in FIG. 13 or 12 as the mirror assembly 15 in association with the original image $13_1$ or $13_3$ and the selected mirror assembly may be adapted to be rotatable about the optical axis of the projecting lens 14 so that it can be used for processing the beams from both original images $13_1$ and $13_3$. By adopting this layout, the number of the required mirrors can be reduced and, at the same time, the mirror assembly and, hence, the overall equipment can be greatly simplified in construction. In this simplified case, too, the mirror units for the original image $13_2$ which has the optical path in a direction perpendicular to the optical path (i.e., the vertical direction) in the plane occupied by the original images $13_1$ and $13_3$ as shown in FIG. 12 will maintain the layout of mirrors that is used in the basic case where the mirror arrangements shown in FIGS. 12 and 13 are both used.

As discussed above, the mirror optical assembly 15 shown in FIG. 12 may be so modified that it is composed of four mirrors similar to the arrangement shown in FIG. 5, whereby all the beams of projecting light are permitted to have the same optical pathlength and, at the same time, the angle at which the central beam is incident on the lenticular light-sensitive material can be reduced to zero.

Another method that can be employed is to divide the original images of interest into two groups, one being of odd-numbered images and the other being of even-numbered images, and to expose (or print) either one of the two groups on the lenticular light-sensitive material, followed by exposure of the other group. In this case, a mask pattern is formed in such a way that projecting light will be transmitted through every other frame for the original images formed consecutively on the film. The mask 23 with this pattern is such that it has openings in areas corresponding to every other frame for the original images and using this mask, the odd-numbered original images are first printed; then, the mask drive unit 22 is activated to move the mask 23 by one frame of original image and the even-numbered images are printed.

The foregoing description concerns an apparatus for printing three original images using a masking means.

Needless to say, two or four or more than four original images can be printed using the same masking means in the manner described above. Even in the case of printing four or more original images formed from different viewpoints, only one projecting lens need be used and the original images can be exposed simultaneously by arranging mirror optical units in a three-dimensional space in such a way that they will not physically interfere with one another.

On the pages that follow, a case in accordance with the present invention is described, in which the original images to be exposed (or printed) are divided into two sets, one being of odd-numbered images and the other of even-numbered images, and those two sets of original images are printed in two steps.

Figure 14:
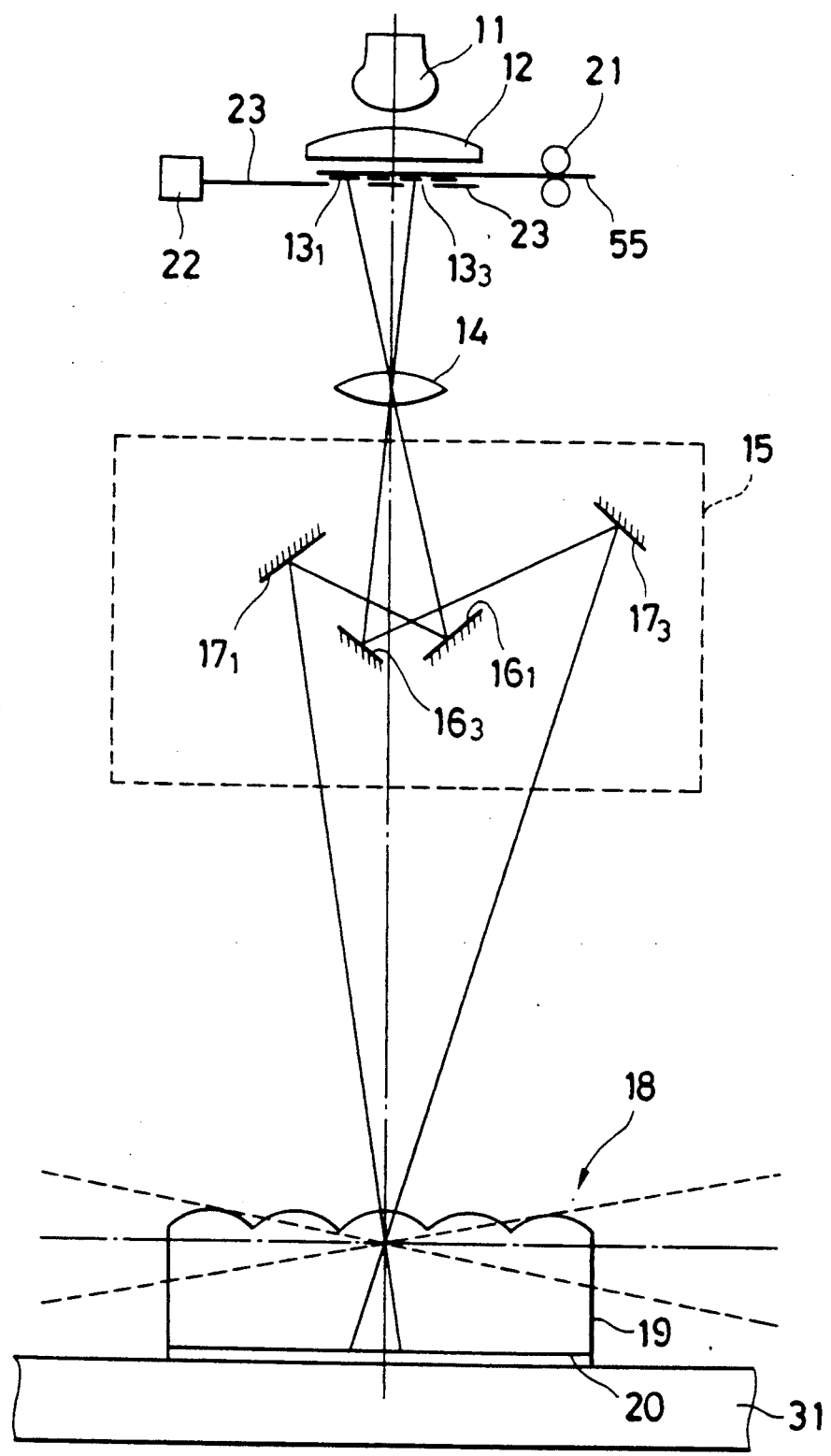
FIG. 14 is a diagram showing an optical arrangement in a perpendicular direction with respect to the image plane of a lenticular light-sensitive material with reference to the case of printing odd-numbered original images out of the four original images to be printed on the lenticular light-sensitive material by means of the stereographic printing apparatus of the present invention.

Consider the case in which a stereographic film 55 carrying four original images $13_1$, $13_2$, $13_3$ and $13_4$ that have been photographed as shown in FIG. 8 and which are printed from different viewpoints is printed with the stereographic printing apparatus shown in FIG. 14. The following description is directed to this apparatus for effecting the stereographic printing of four original images. The apparatus shown in FIG. 14 has essentially the same construction as the apparatus for stereographic printing of three original images which is shown in FIG. 11 and, hence, the following description concerns only those parts which are different between the two apparatuses. The differences relate to the mask 23 and the mirror optical assembly 15. The mask 23 forms a mask pattern that permits light transmission through every other frame for continuous original images on the film. The mask drive unit 22 having this mask pattern is actuated so that the mask 23 is shifted by one frame of original images to have the lenticular light-sensitive material exposed alternately to the projected beams of light from the odd- and even-numbered original images. The mirror optical assembly 15 has one set of mirror units for processing the light projected from odd-numbered original images (see FIG. 14) and another set of mirror units that are used to process the light projected from even-numbered original images (see FIG. 15).

Figure 16:
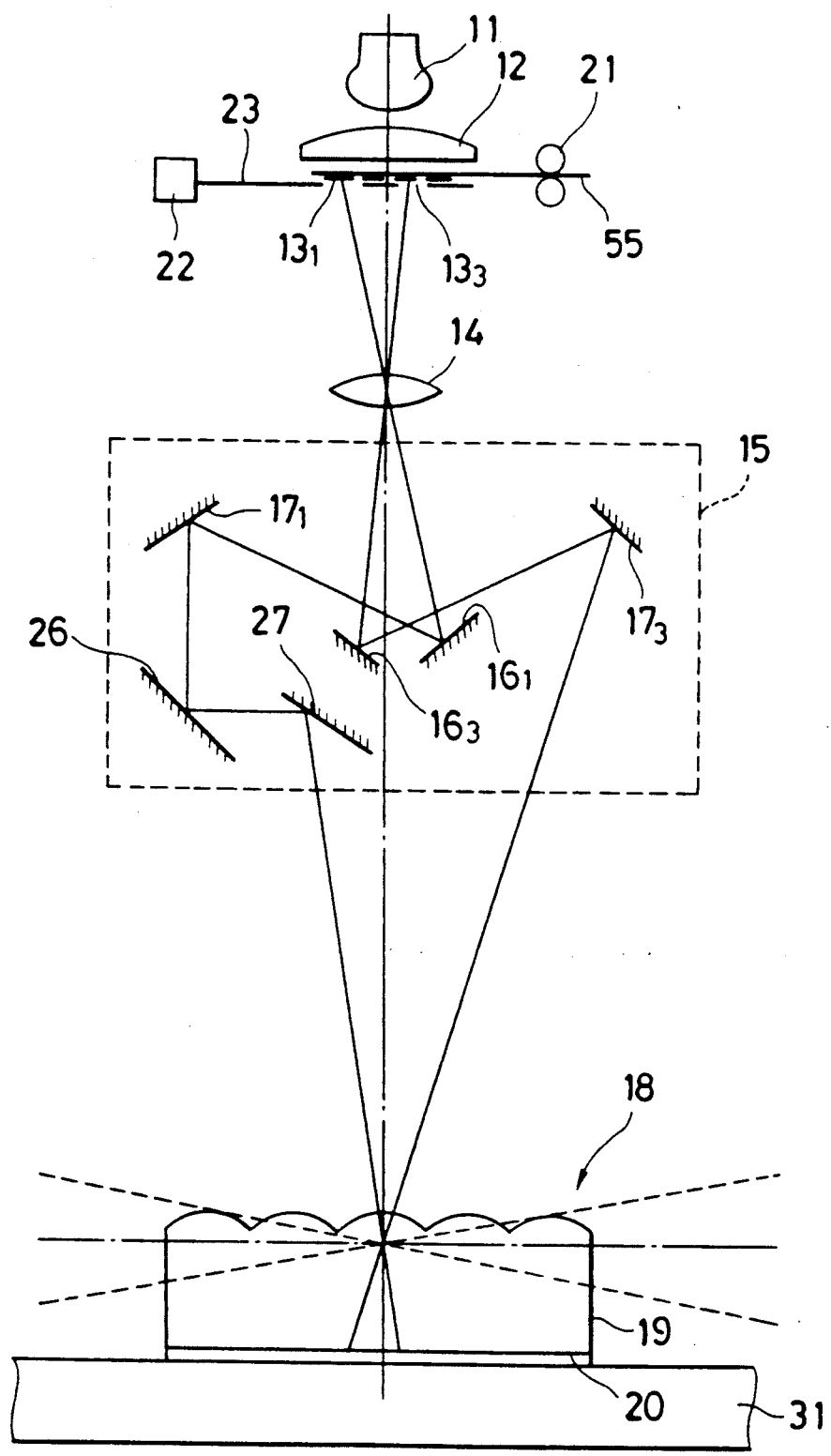
FIG. 16 is a diagram showing another arrangement of mirrors in the mirror optical assembly shown in FIG. 14.

As shown in FIG. 14, the set of mirror units for processing the light projected from odd-numbered original images has mirrors $16_1$ and $16_3$ with which the projecting light from the odd-numbered original images $13_1$ and $13_3$ is split into beams associated with the respective original images, as well as mirrors $17_1$ and $17_3$ that serve to adjust not only the optical paths of the split beams but also the angle at which they are incident on the lenticular light-sensitive material 18. Further, as shown in FIG. 16, mirrors $16_1$ and $17_1$ for processing the beam split from the projection light from the original image $13_1$ are combined with additional mirrors 26 and 27 that adjust not only the optical path of that beam but also the angle at which it is incident on the lenticular light-sensitive material 18. In the case of exposing (or printing) the odd-numbered original images, the mask drive unit 22 is actuated to move the mask 23 having openings in such a way that it permits selective light transmission through every other frame for the original images $13_1$ and $13_3$.

Figure 15:
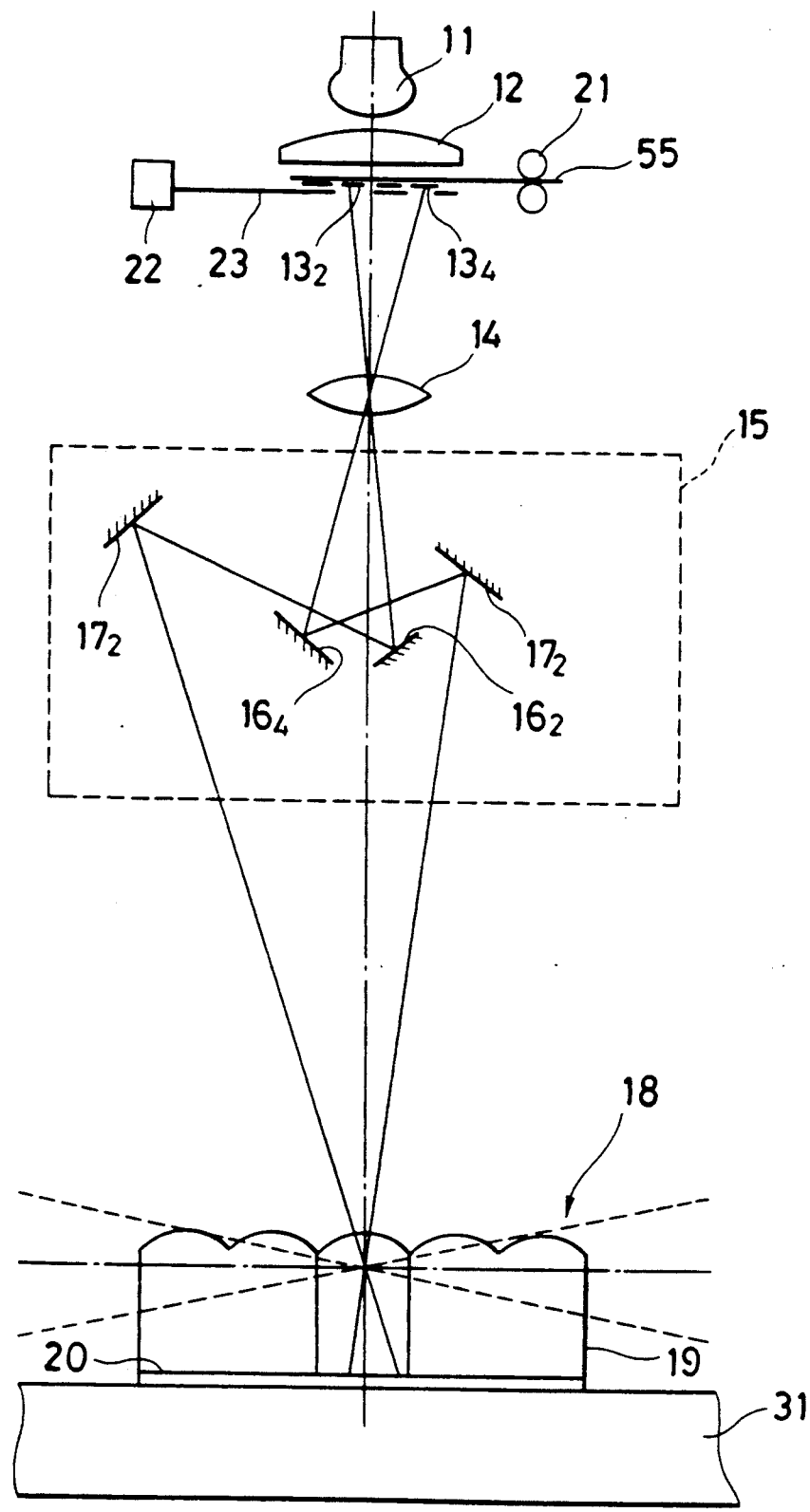
FIG. 15 is a diagram showing an optical arrangement in a perpendicular direction with respect to the image plane of the same lenticular light-sensitive material with reference to the case of printing even-numbered original images out of the four original images to be printed.
Figure 17:
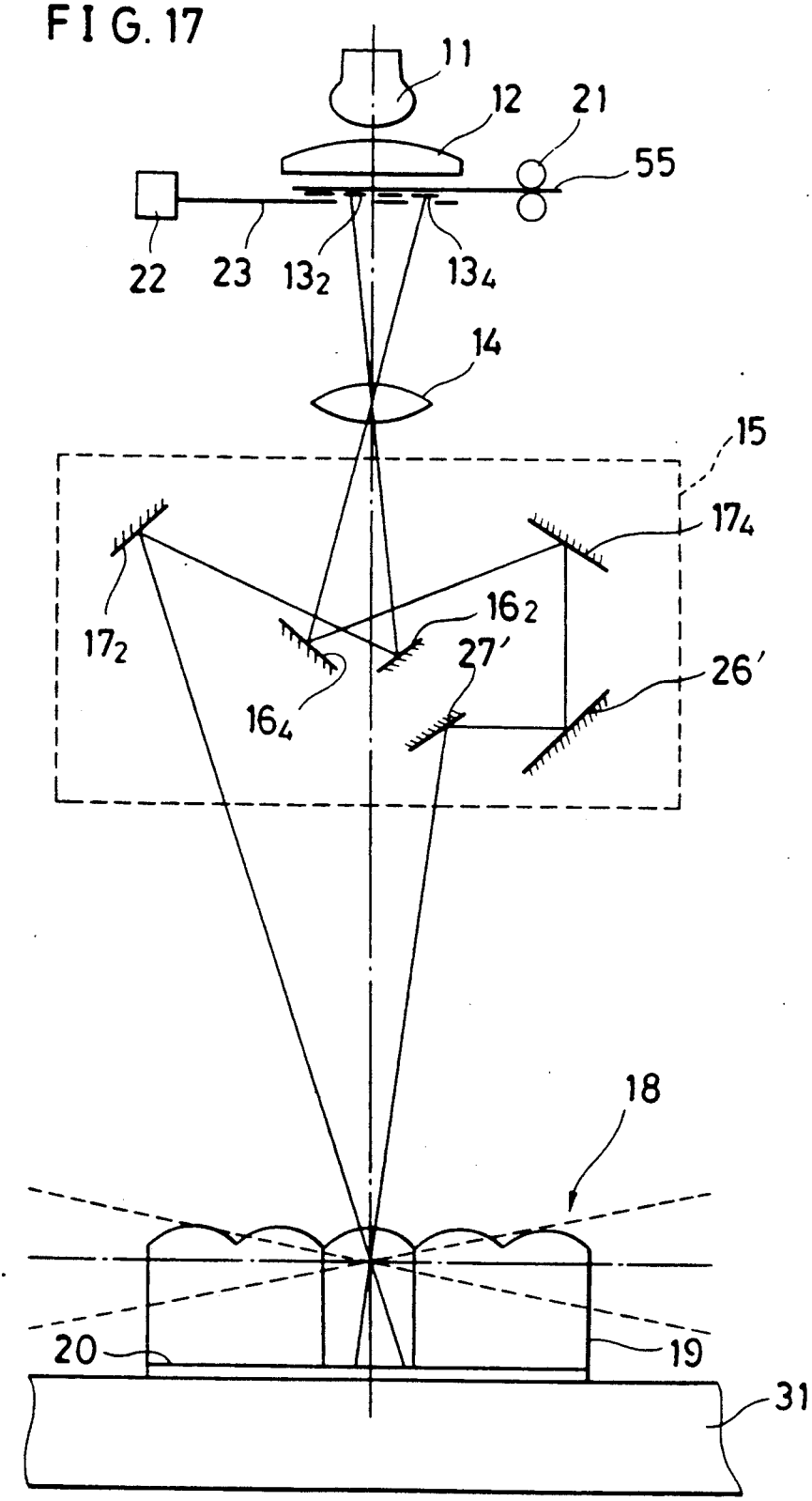
FIG. 17 is a diagram showing another arrangement of mirrors in the mirror optical assembly shown in FIG. 16.

As shown in FIG. 15, the set of mirrors for processing the light projected from even-numbered original images has mirrors $16_2$ and $16_4$ with which the projecting light from the even-numbered original images $13_2$ and $13_4$ is split into beams associated with the respective original images, as well as mirrors $17_2$ and $17_4$ that serve to adjust not only the optical paths of the split beams but also the angle at which they are incident on the lenticular light-sensitive material 18. Further, as shown in FIG. 17, mirrors $16_4$ and $17_4$ for processing the beam split from the projection light from the original image $13_4$ are combined with additional mirrors 26' and 27' that adjust not only the optical paths of that beam but also the angle at which it is incident on the lenticular light-sensitive material 18. In the case of exposing (or printing) the even numbered original images, the mask drive unit 22 is actuated to move the mask 23 having openings in such a way that it permits selective light transmission through every other frame for the original images $13_2$ and $13_4$.

The set of mirrors shown in FIG. 14 or 16 for dealing with odd-numbered original images and the set of mirrors shown in FIG. 15 or 17 for dealing with even-numbered original images are arranged in such a way that either one of those sets will coincide with the other if it is inverted (rotated 180°) about the optical axis of the projecting lens. Hence, the stereographic printing apparatus may be modified in such a way that the set of mirrors shown in FIG. 14 or 16 is used to process both the light from the odd-numbered images and the light from the even-numbered images. In this case, the mirror assembly is made separate from the other parts of the apparatus or it is adapted to be rotatable, whereby the mirror layout can be inverted about the optical axis of the projecting lens. Conversely, the mirror assembly is made integral with the other parts of the apparatus whereas the film transport unit 21 and the mask drive unit 22 supporting the mask 23 are made separate from the other parts of the apparatus or they are adapted to be rotatable, so that they can be inverted about the optical axis of the projecting lens. Whichever method is adopted, the angles at which the mirrors in the mirror assembly reflect light must be re-adjusted after inversion. In a preferred case, mirror specifications adapted to various conditions of enlargement such as enlarging ratio and screen size are preset and a mechanism is provided that is operatively associated with the step of inversion to achieve automatic adjustments on such factors as the angle of reflection by mirrors and the optical pathlengths of light beams.

Further, as already mentioned, the lenticular sheet may be allowed to rock, during exposure, by means of a drive unit (not shown) about the support axis through angles of $\pm\theta$ with respect to the horizontal plane, whereby the line width of linear picture elements on the light-sensitive layer under the respective lenticular lenses can be increased over the angular range of $2\theta$.

As will be understood from the detailed description above, in accordance with the second aspect of the present invention, light beams carrying selected combinations of original images as obtained by masking are passed through a single projecting lens to produce convergent light that will form an image at a predetermined focal length, and the convergent light is split into beams for the respective original images by means of a subsequent mirror optical assembly, with those beams being adjusted in such a way that all of them have a constant optical pathlength to a lenticular lens in a lenticular sheet. Thereafter, the beams are admitted into the lenticular lens at predetermined printing angles and are imaged as linear picture elements on the back side of the lenticular sheet. In this way, a plurality of continuous original images as they are retained in predetermined positions are recorded in a projection medium, such as a picture element recording medium, provided in a predetermined position on the back side of the lenticular sheet and, subsequently, they are observed indirectly as stereoscopic views through that recording medium. In this method, the printing operation is carried out through at least two stages by masking.

According to the fifth aspect of the present invention which relates to a stereographic printing apparatus, light beams carrying a plurality of original images are passed through a single projection lens to produce convergent light, which is then split into beams for the respective original images by means of a subsequent mirror optical assembly, with the respective beams being focused on the light-sensitive layer of the lenticular light-sensitive material. In this way, a plurality of continuous original images as they are retained in predetermined positions can be printed on the lenticular light-sensitive material through the projecting lens using a simple optical system and yet without causing any offset of the image plane.

Three or more original images can be printed by repeating the process of printing the combination of selected original images. Further, the number of mirrors in the mirror optical assembly used to split beams for the respective original images can be reduced and the overall size of the optical system can accordingly be reduced to provide ease in making efficient use of a limited space. As a further advantage, by using the masking means in such a way that suitable combinations of original images as selected from a total of at least three images are masked, all of the original images can be printed in two steps.

For example, a set of even-numbered original images and a set of odd-numbered original images are masked alternately, with mirror optical units being arranged in two groups, one for processing beams associated with the even-numbered original images and the other for processing beams associated with the odd-numbered original images. In this way, all of the original images can be printed on the lenticular light-sensitive material in two steps.

Instead of using the two groups of mirror units, a single mirror group may be operated being rotated 180° for the successive two printing steps. This simplifies the layout of mirrors in the overall mirror assembly, thus contributing to the use of a smaller space.

The present invention has another advantage in that it needs to use only the projecting lens whereas the conventional multi-frame printing system has to use a plurality of lenses. It also has the advantage that the projection lens can be fixed and hence requires a simpler mechanism than in the conventional system that moves the light-sensitive material relative to the projecting lens unit. Further, all of the original images are scanned as they are rocked during exposure and this permits the linear picture elements to be enlarged by a simple mechanism and with high efficiency. The absence of the need to move negative films or light-sensitive materials during exposure contributes to size reduction.

We now describe the stereographic projecting and recording method according to the third aspect of the present invention, as well as the stereographic printing apparatus according to the sixth aspect for implementing that method.

In accordance with the stereographic projecting method of the third aspect of the present invention, light beams carrying two or more original images are passed through a single projecting lens or a plurality of projecting lenses whose number is associated with that of the original images, thereby producing convergent light that will form an image at a predetermined focal length. The optical paths of the light beams for the respective original images are changed by means of a subsequent mirror optical assembly so as to effect not only the adjustment of the optical pathlengths of those beams to the lenticular sheet but also the key subject matter adjustment that is performed in such a way that the key subject matter in the projected views from the respective original images will coincide on a projection medium such as a picture element recording or display medium; thereafter, the beams are admitted into lenticular lenses at predetermined printing angles and are imaged as linear picture elements on the back side of the lenticular sheet.

In this way, a plurality of continuous original images as they are retained in predetermined positions are recorded, through one or more projecting lenses, in a picture element recording or display medium provided in a predetermined position on the back side of the lenticular sheet and, subsequently, they are observed as stereoscopic views either through that picture element recording medium (or display medium) or after being directly projected and displayed on a picture element recording medium (or display medium) provided in a predetermined position.

The stereographic printing apparatus according to the sixth embodiment of the present invention is an apparatus for printing original images on a lenticular light-sensitive material having both a lenticular sheet and a light-sensitive material. Light beams carrying a plurality of original images are passed through a single projecting lens or a plurality of projecting lenses whose number is associated with that of the original images, thereby producing convergent light that will form an image at a predetermined focal length, and the optical paths of the light beams for the respective original images are changed by means of a subsequent mirror optical assembly to adjust the optical pathlengths of those beams to the lenticular sheet; at the same time, the angles of mirrors in the first mirror unit and, if necessary, the angle of the lenticular light-sensitive material are adjusted by an angle adjusting means to effect the key subject matter adjustment in such a way that the key subject matter in the projected-views from the respective original images will coincide on a projection medium such as a picture element recording or display medium; thereafter, the beams are admitted into lenticular lenses at predetermined printing angles and are imaged as linear picture elements on the light-sensitive material provided on the back side of the lenticular sheet.

Thus, a plurality of continuous original images as they are retained in predetermined positions can be printed simultaneously on the lenticular light-sensitive material through one or more projecting lenses. At the same time, a sharp stereoscopic image can be obtained since the key subject matter adjustment is effected by the angular adjusting means mounted on the mirrors in the first mirror unit.

The key subject matter adjustment insures that the images of the key subject matter from the respective frames that the images of the key will be projected onto the light-sensitive layer of the lenticular light-sensitive material in such a way that those images will register at a common reference point on the plane of projection (the light-sensitive plane).

Stated more specifically, in order to insure that the projected images of the key subject matter from the respective frames will coincide on the light-sensitive layer or a display medium such as a screen, the angles of the mirrors in the first mirror unit of the mirror optical assembly are adjusted, whereby the particular key subject matter of original images is allowed to be present in the reference plane of the stereoscopic image to be obtained, thus producing a sharp stereoscopic image in relief. To achieve this result, the angular adjusting mechanism for effecting the key subject matter adjustment preferably comprises a plurality of actuators that are provided in predetermined positions on the back side of the respective mirrors in the first mirror unit and a control unit for controlling each of those actuators.

Examples of the actuator are displacement actuators including a piezoelectric device, an electrostrictive device and a magnetostrictive device. Displacement actuators may be controlled by either an open-loop system or a closed-loop system. For precise displacement of the mirrors in the first mirror unit, rigid displacement is preferably effected as they are driven by a servo or on/off control system. An exemplary electrostrictive device is a PMN and an exemplary piezoelectric device is a PZT.

The key subject matter is typically an object at which the camera is focused, but if desired, another object may be selected as the key subject matter. The term "key subject matter" as used herein means an object which, when the observer looks at the lenticular light-sensitive material carrying exposed original images, appears to lie just within the reference plane of the intended stereoscopic image.

The matching of the key subject matter in original images which is to be applied to the stereographic projecting method or the stereographic printing apparatus which employ a lenticular sheet in accordance with the third or sixth aspect of the present invention is effected in the following basic manner: the angles of mirrors for adjusting the optical paths of the light beams for the respective original images are adjusted either on the basis of the projected image as produced by providing a projection medium such as a screen in the neighborhood of the plane of projection or printing of a stereoscopic image or on a plane that is optically equivalent to those planes, or in accordance with the shooting distance for each original image or the shooting distance between original images.

Stated more specifically, the matching of the key subject matter is performed by the following procedure in a typical case: prior to projecting a stereoscopic image on a picture element recording or display medium or prior to projecting and printing a stereoscopic image on a lenticular light-sensitive material, a freely disposable screen is placed in the position where an original image is to be projected or in a position optically equivalent to that position, thereby producing a projected image which is to be directly viewed or reproduced on a display for indirect viewing. Alternatively a contrast sensor is provided in the position of the key subject matter on the projected image, thereby producing an output signal indicating the contrast of that image.

On the basis of that projected image or output signal, the angles of mirrors in the mirror unit for adjusting the optical paths of the light beams associated with the respective original images are accordingly adjusted to accomplish the matching of the key subject matter in the individual original images. To check to see if the key subject matter in each original image is in registry with a common reference point on the lenticular light-sensitive material, a light-shielding plate (screen) that can be freely opened and closed is provided on the lenticular light-sensitive material and a plurality of original images are projected, either simultaneously or sequentially, onto said shielding plate to check to see if the key subject matter has been correctly adjusted for registry by the mirrors in the first mirror unit of the mirror optical assembly. If it is found that complete registry has not been achieved, the projected image on the light-shielding plate is examined visually while the mirrors in the first mirror unit of the mirror optical assembly are continuously subjected to angular adjustment until the key subject matter in an original image is found to be in complete or substantial registry with the key subject matter in any other original image. As another device for insuring registry between the images of the key subject matter, a sensor unit for measuring image contrast may be provided in the position where the key subject matter is projected onto the light-shielding plate, with the mirrors in the first mirror unit being automatically adjusted by the angular adjusting means so that the projected image will attain a maximum contrast.

In another embodiment, the offset in the position of the key subject matter between original images is computed from the shooting distance for original images, as well as from the distance between taking lenses at the shooting of original images, and on the basis of the calculated amount of offset, the angles of mirrors in the first mirror unit are adjusted to effect the matching of the key subject matter between original images.

In accordance with the present invention described above, the angles of mirrors for adjusting the optical paths of beams associated with original images are adjusted on the basis of either the projection of original images on a screen or a contrast sensor or the shooting data of original images, whereby the images of the key subject matter in the respective frames are brought into registry on the plane of image projection so that an offset-free sharp image will be formed with respect to the key subject matter, thus accomplishing stereography of high quality.

In addition, the matching of the key subject matter can be accomplished by merely adjusting the angles of optical path adjusting mirrors in the first mirror unit either on the basis of actual projected images or in accordance with the shooting data of original images; hence, the intended matching of the key subject matter can be performed by simple procedures and using an apparatus of simple construction.

By way of example the following modifications can be made in the third and sixth aspects of the present invention: i) increasing the line width of linear picture elements by rocking the picture element recording medium, such as a lenticular light-sensitive material, during exposure in a manner that is relative to the exposing optical unit; and ii) adjusting the amount of exposure properly by means of an exposure adjusting unit.

Hence, the stereographic printing apparatus according to the sixth aspect of the present invention has the advantage that it yields a smaller number of missing pixels in the printed stereoscopic image than when the conventional two-frame printing method is adopted. In addition, this apparatus is capable of dealing with not only two but also three or even more frames or original images since the optical paths in the apparatus are such that in the exposing process, the projecting light is reflected by mirrors while utilizing the light along the optical axis of the projecting lens as well as the peripheral light. A further advantage of the apparatus is that by scanning over the lenticular light-sensitive material as it is rocked during exposure or printing, the line width of linear picture elements under the lenticular sheet can be increased to produce a stereoscopic image that has an appropriate lightness and that contains few flickers.

The present invention has another advantage in that it requires only one projecting lens whereas the conventional multi-frame printing system requires a plurality of lenses. It also has the advantage that it does not require a means of transporting the frame-carrying film or the lenticular light-sensitive material although such a means is necessary in the conventional system that moves the light-sensitive material relative to the projecting lens. Nor does it have the need to adjust the angle of the projecting lens unit. Hence, one of the outstanding features of the apparatus of the present invention is its simple mechanism. Further, a plurality of original images are exposed simultaneously, so in the case of processing N original images, the efficiency is increased by about N times. All of the original images are scanned as they are rocked during exposure and this permits the linear picture elements to be enlarged by a simple mechanism and with high efficiency. The absence of the need to move negative films or light-sensitive materials during exposure contributes to size reduction.

The stereographic projecting method according to the third aspect of the present invention, as well as the stereographic printing apparatus of the sixth aspect for implementing that method are described below in detail with reference to the preferred embodiments shown in accompanying drawings.

In accordance with the third aspect of the present invention (stereographic projecting method) and its sixth aspect (stereographic printing apparatus), beams of light from a plurality of original images as obtained from different viewpoints are adjusted for their optical paths by means of a mirror optical assembly and, thereafter, the beams are projected onto a lenticular sheet to form a plurality of linear picture elements that are projected and further recorded on a picture element recording medium or an image display medium. In this way, the image can be recorded (printed) on the light-sensitive material or it can be recorded on a solid state imaging device such as a CCD, thus producing a desired stereoscopic view. The most characterizing part of the present invention in its third and sixth aspects is that each of the mirrors in the first mirror unit of the mirror optical assembly has an angular adjusting means for effecting the key subject matter adjustment. An additional characteristic feature is that it also has a means of checking for or detecting the registry of the key subject matter as a result of the matching of the key subject matter by said angular adjusting means.

Typical examples of the stereographic printing according to the sixth aspect of the present invention include the model shown in FIGS. 2-5 which is capable of printing three original images by one-shot exposure (one exposure step), as well as the model shown in FIGS. 11-13 which is capable of printing three original images by multi-shot exposure (more than one exposure step). These apparatus have already been described in detail except for the angular adjusting means 41 which is mounted on each of the mirrors ($16_1$, $16_2$ and $16_3$) in the first mirror unit 16 of the mirror optical assembly 15, as well as for the performance of the matching of the key subject matter using that angular adjusting means. Hence, the following description is chiefly directed to the angular adjusting means 41 and the method of performing the matching of the key subject matter and the description of the other features will be omitted. To begin with, the mirror optical assembly 15 for effecting the matching of the key subject matter is described below with reference to the stereographic printing apparatus shown in FIG. 2.

The light issuing from the light source 11 is transmitted through the film 55 having three original images 13 formed thereon and the resulting illumination that carries information associated with the respective original images passes through the projection lens 14. The beams of the projecting light for the respective original images that has passed through the projection lens 14 are then admitted into the mirror optical assembly 15.

In the case shown, the mirror optical assembly 15 changes the optical paths of light for the respective original images (their associated beams of projection) in such a way that all the beams will have the same optical pathlength to the lenticular light-sensitive material 18. At the same time, the mirror assembly allows the beams to fall on the lenticular light-sensitive material 18 of the lenticular light-sensitive material 18 in such a way that the key subject matter in each original image will be in registry with a common reference point on the lenticular light-sensitive material 18. In addition, the mirror assembly adjusts the beams in such a way that they will be incident at predetermined angles on the lenticular light-sensitive material 18.

The mirror optical assembly 15 comprises the following components: a first mirror unit 16 (consisting of mirrors $16_1$, $16_2$ and $16_3$) with which the beams of projecting light that has been transmitted through the original images formed on a negative or positive film and that contains the associated image information are split into beamlets containing image information for the respective pixels; an angular adjusting means 41 furnished with a deformable device, such as a piezoelectric device, that is provided in a predetermined position on the back side of each of the mirrors in the first mirror unit 16 and that is capable of deformation when subjected to an electric field, the deformable device being deformed by a control unit (not shown) to effect a fine adjustment of the angle of the mirror supported by the deformable device; and a second mirror unit 17 (consisting of mirrors $17_1$, $17_2$ and $17_3$) for optical pathlength adjustment, with which the split beams in association with the respective original images are allowed to be incident on the lenticular light-sensitive material 18 at predetermined angles while, at the same, time the individual beams are adjusted to have the same optical pathlength to the light-sensitive layer 20 of the lenticular light-sensitive material 18.

In the printing apparatus shown, the beams for the respective original images that have passed through the projection lens 14 are reflected in predetermined directions by the corresponding mirrors in the first mirror unit 16, then by the mirrors in the second mirror unit 17 to be admitted into the lenticular light-sensitive material 18 at predetermined angles.

In the printing apparatus under discussion, the angles of mirrors in the first mirror unit 16 of the mirror optical assembly 15 are adjusted by the angular adjusting means 41 which is provided for each of those mirrors, whereby the matching of the key subject matter between the respective original images is accomplished. Stated more specifically, the angular adjusting means 41 is composed of an actuator (displacement device) such as a piezoelectric device, an electrostrictive device, a voice coil motor or an ultrasonic motor, which is provided on the back side of each of the mirrors $16_1$, $16_2$ and $16_3$ in the first mirror unit 16. Such angular adjusting means 41 are activated by a control unit (not shown) under appropriate voltage control to achieve fine adjustments of the mirrors in the first mirror unit 16 in such a way that the angle of mirror $16_2$ is first adjusted to determine the image composition, with the original image $13_2$ being used as a reference image Then, the angles of the other mirrors $16_1$ and $16_3$ are adjusted sequentially so that the projected views of the original images $13_1$ and $13_3$ are adjusted in compliance with the key subject matter in the original image $13_2$. Under the circumstances, the angular adjusting means 41 may be omitted from the mirror in the first mirror unit 16 that processes the light beam associated with the reference image.

Figure 18:
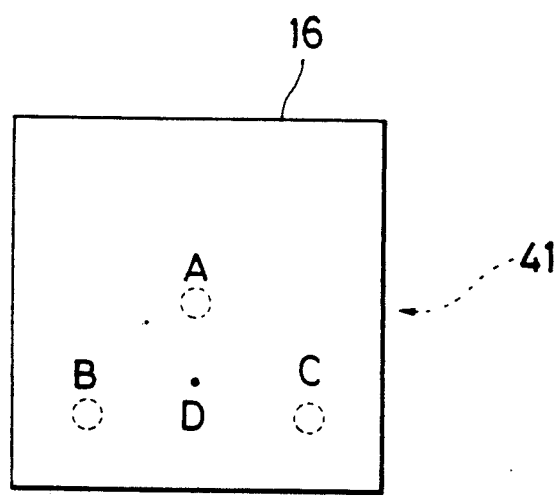
FIG. 18 is a sketch showing an exemplary angle adjusting means.
Figure 19:
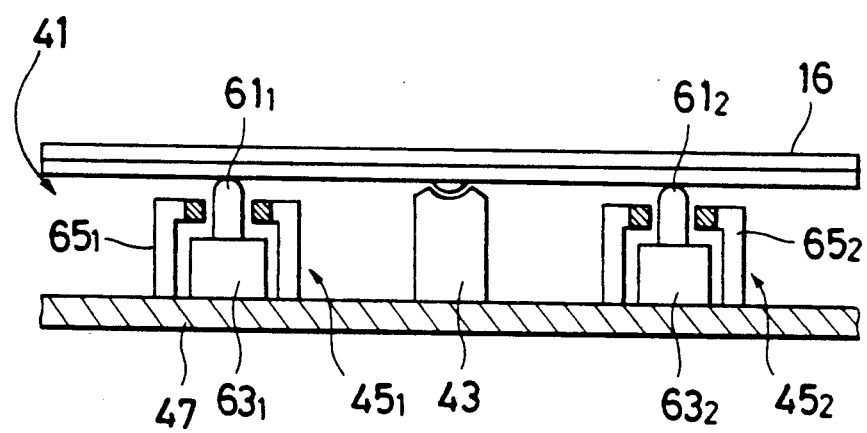
FIG. 19 is a side view, with part taken away, of the angle adjusting means shown in FIG. 18.

An example of the angular adjusting means 41 is shown in FIGS. 18 and 19. The angular adjusting means 41 shown in FIG. 18 is of a two-point driven type, which pivotally supports a mirror in the first mirror unit 16 at point A which is the single point of the mirror center, while the mirror is driven at two appropriate points (B and C) by actuator. Each of the mirrors in the first mirror unit 16 is composed of the mirror body and a support.

As shown in FIG. 19, point A at which the mirror center (the center of a light beam to be transmitted to a mirror in the second mirror unit) is reflected is pivotally supported by a pivotal support 43 which contacts the back side of the mirror. Actuators $45_1$ and $45_2$ (which are hereafter sometimes collectively designated by 45) are placed under the mirror in such a way that they contact the back side of the mirror at suitable points B and C. An urging member (not shown) such as a spring is loaded within the triangle formed by points A, B and C, so that the mirror is normally urged towards a support plate 47. This urging member may be loaded in a suitable position, say, at point D as shown in FIG. 18. Preferably, the urging member is provided at the center of gravity of the triangle formed by points A, B and C.

The actuator 45 to be provided at points B and C should be a member, such as a piezoelectric device or a voice coil type actuator, that is capable of linear displacements in small amounts. A typical example is shown in FIG. 19; it comprises rods 61 ($61_1$ and $61_2$) that contact the back side of a mirror in the first mirror unit 16, piezoelectric devices 63 ($63_1$ and $63_2$) that support the rods 61 and that will deform to displace the rods in their axial direction, and ring-shaped magnets 65 ($65_1$ and $65_2$) that surround the rods 61. The pivotal support 43 shown in FIG. 19 combines with the actuators 45 to make the mirror 16 rotate about the center of reflection of the surface of that mirror.

Figure 20:
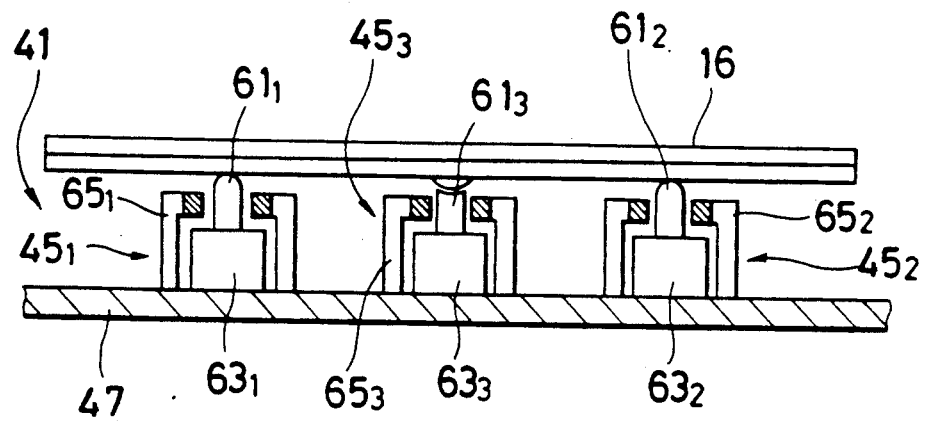
FIG. 20 is a side view, with part taken away, of another exemplary angle adjusting means.

The angular adjusting means 41 shown in FIG. 19 may be modified as shown in FIG. 20 to be driven at three points. In the model shown in FIG. 20, the pivotal support 43 provided at point A of the angular adjusting means 41 shown in FIG. 18 is adapted to work not only as a pivotal support but also as an actuator. This device has substantially the same mechanism as the actuator 45 shown in FIG. 19, except that the tip of rod $61_3$ is recessed to mate with the projection from the central part of the back side of the mirror.

This construction has the advantage that, as a mirror in the first mirror unit is driven to tilt by means of actuators $45_1$ and $45_2$, the actuator $45_3$ can be driven to correct the amount of displacement of the mirror surface at the center, thereby insuring that the mirror surface maintained in a desired position.

Figure 21:
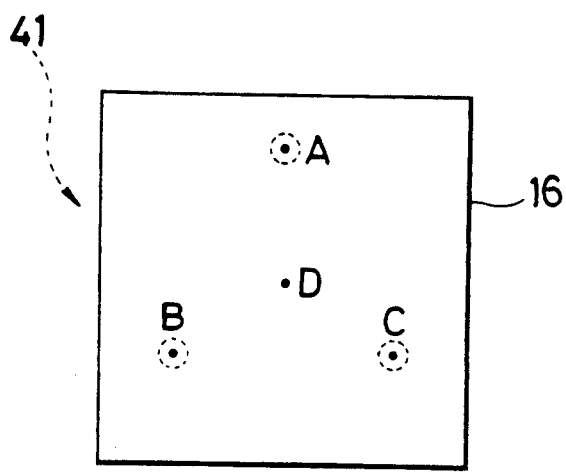
FIG. 21 is a sketch showing yet another example of the angle adjusting means.
Figure 22:
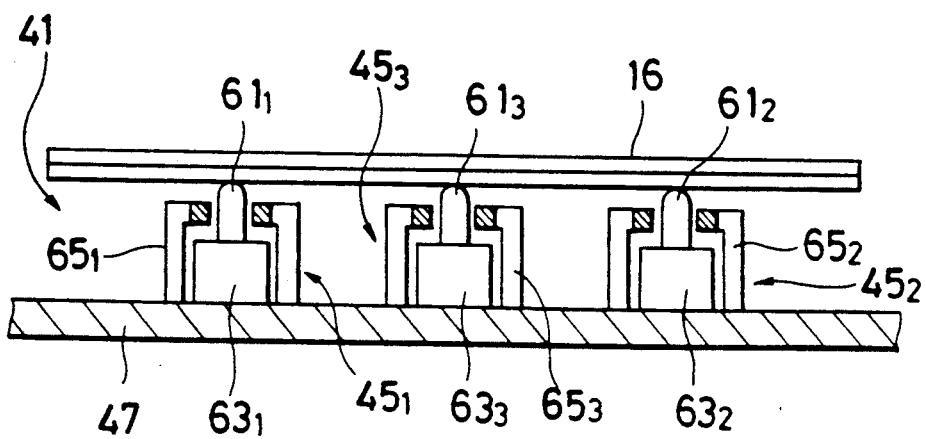
FIG. 22 is a side view, with part taken away, of the angle adjusting means shown in FIG. 21.

Another modification of the angular adjusting means 41 is described below with reference to FIGS. 21 and 22. The angular adjusting means 41 shown in FIGS. 21 and 22 has an urging member such as a spring that is loaded on the back side of a mirror 16 at the center of reflection D so as to urge it towards a support plate 47. At the same time, three actuators $45_1$, $45_2$ and $45_3$ are arranged on the back side of the mirror in the triangular area defined by three points around the center of reflection. In this case, the center of gravity of the triangle formed by connecting the three actuators coincides with point D.

The actuators $45_1$, $45_2$ and $45_3$ are preferably arranged to form a regular triangle. In this case, the actuators $45_1$, $45_2$ and $45_3$ will control the displacement of the mirror and adjust its angle in such a way that the amount of movement of the mirror at point D in a direction perpendicular to the mirror surface is always zero.

Figure 23:
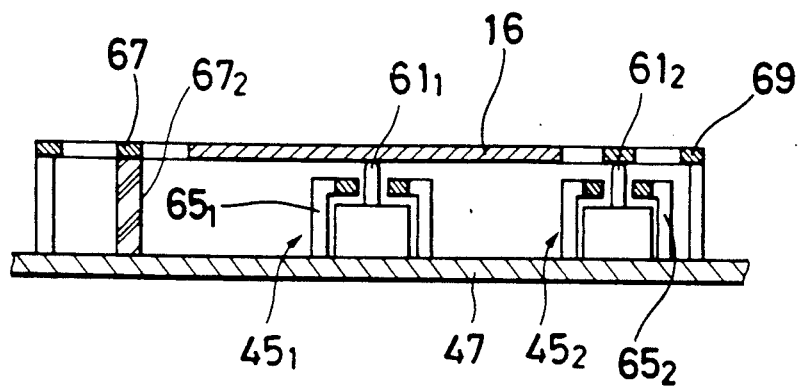
FIG. 23 is a side view, with part taken away, of another example of the angle adjusting means.
Figure 24:
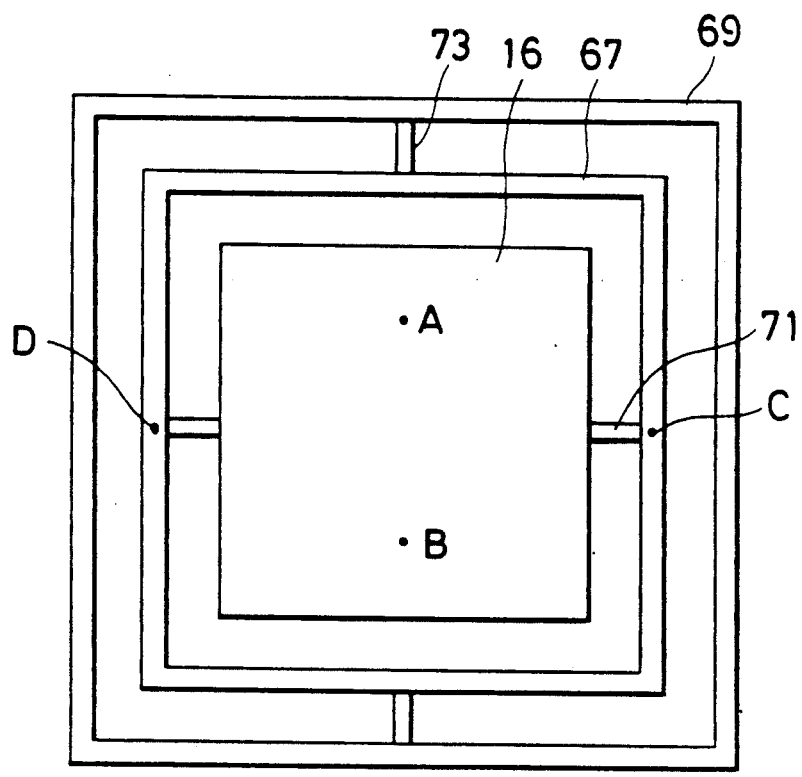
FIG. 24 is a plan view of the angle adjusting means shown in FIG. 23.

Still another modification of the angular adjusting means 41 is described below with reference to FIGS. 23 and 24. In the case shown in FIGS. 23 and 24, the mechanism of supporting a mirror works like gimbals which control the rotational angles of two shafts. It also supports the mirror in such a way that there will be no movement of the mirror surface at the center of reflection. A mirror in the first mirror unit 16 is connected by a first shaft 71 to a support frame 67 which supports the mirror rotatably about the first shaft. The support frame 67 is connected by a second shaft 73 to an outer support frame 79 which supports the frame 67 rotatably about the second shaft. The two support frames 67 and 69 are fixed to a support plate 47 The first shaft 71 and the second shaft 73 are parallel to the mirror surface and are crossed at right angles substantially at one point on the mirror surface.

A combination of a first actuator and a first urging member are provided on the back side of the mirror in a manner symmetrical with respect to the first shaft. The first actuator $45_1$ may be provided on the back side of the mirror at point B, and the first urging member (not shown) is provided on the back side of the mirror at point A so that the rod $61_1$ associated with the first actuator $45_1$ will contact the back side of the mirror. The pair of the first actuator and the first urging member are fixed on the support plate 47.

Similarly, a combination of a second actuator and a second urging member are provided as if they were on the back side of the mirror in a manner symmetrical with respect to the second shaft. The second actuator $45_2$ may be provided at point C of the support frame 67 as if it were on the back side of the mirror, and the second urging member $67_2$ is provided under point D in engagement with the frame 67 in such a way that the rod $61_2$ associated with the second actuator $45_2$ is kept in contact with the back side of the frame 67. The pair of the second actuator and the second urging member are also fixed on the support plate 47.

It should be noted here that a actuator and urging member combinations need not be disposed symmetrically with respect to the first shaft 71 or the second shaft 73. If desired, the actuator may be disposed to be in contact at its tip with the back side of the mirror or the support frame so that the mirror will rotate about the first shaft 71 or the second shaft 73.

Instead of providing the pair of actuator $45_2$ and urging member $67_2$ on the support frame 67, the second shaft 73 may be extended out of the support frame 69 so that it is combined with a gear, etc. and a meshing stepping motor to form a rotating mechanism that causes the support frame 67 to rotate.

In the examples described above, urging members are provided on the back side of a mirror in the first mirror unit 16 so that it is urged towards the support plate 47, thereby enabling the angle of that mirror to be adjusted. However, this is not the sole case of the actuator 45 to be used in the present invention. For example, the support of the mirror may be formed of a magnetic material so that the magnet 65 ($65_1$, $65_2$, or $65_3$) provided in the actuator 45 will urge the mirror towards the support plate 47. This modification has the advantage of eliminating the need of providing a separate urging member.

In the examples shown above, the actuator 45 is assumed to use a piezoelectric device as a displacement device. It should, however, be noted that other displacement devices may be used, such as an electrostrictive device, a magnetostrictive device, a voice coil motor, a pulse motor and or an ultrasonic motor.

In the printing apparatus described above, the beams of projecting light that are associated with the respective original images and that have been adjusted for optical paths by the mirror optical assembly are admitted into the lenticular light-sensitive material 18 so as to print the individual original images. The most characterizing part of the printing apparatus according to the sixth embodiment of the present invention is that prior to the printing of original images on the lenticular light-sensitive material 18, imaging is effected on a projection medium such as a screen or shooting data are taken on the original images, whereby the angles of mirrors in the first mirror unit 16 are adjusted using the above-described angular adjusting means 41 so as to effect the matching of the key subject matter between original images.

Figure 25:
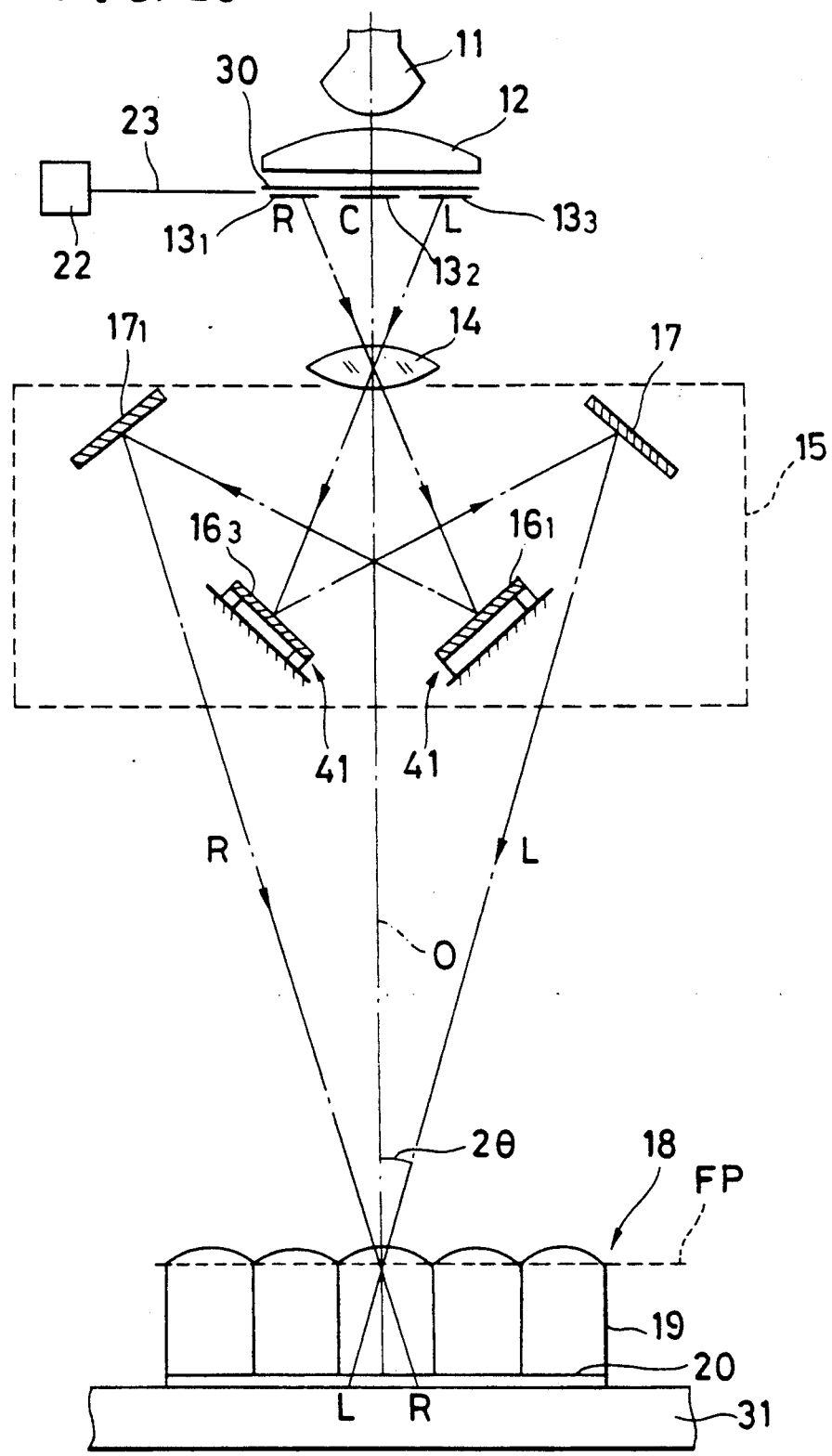
FIG. 25 shows conceptually the case where the stereographic printing apparatus of the present invention is applied to another embodiment where three original images are to be printed on a lenticular light-sensitive material.

If the original images are to be projected sequentially, a mask 23 for masking selected original images and a mask drive unit 22 for moving said mask may be provided as in the case of the stereographic printing apparatus shown in FIG. 25. The mask 23 is supported by the mask drive unit 22 in such a way that it can be moved as required to mask the original images which are not being projected.

According to one method, a light-shielding plate such as a white flat plate that works as a screen is placed in the neighborhood of the plane of projection of an original image 13 (i.e., the focal plane of the projecting lens as indicated by a dashed line FP in FIG. 2 or 25), such as on top of the lenticular light-sensitive material 18 or the focal position of each beam of projecting light (with the lenticular light-sensitive material 18 being removed) or in a position (plane) that is optically equivalent to said focal position; the original images are projected, either sequentially or simultaneously, onto the screen and the angles of the corresponding mirrors in the first mirror unit 16 are finely adjusted by the angular adjusting means 41 until the operator who is making a visual inspection is sure that all the images of the key subject matter are in complete registry.

An alternative to this method of directly viewing the images projected on the screen is to read them with an imaging device such as a CCD, reproduce the readout on a display such as a CRT, and repeat the procedure described in the preceding paragraph.

Another approach that can be taken is to use a contrast sensor. To implement this approach, a contrast sensor (hereafter referred to simply as a "sensor") is provided in an area of a projected image corresponding to the key subject matter and at least the image of the key subject matter is projected onto this sensor. The angle of a mirror in the first mirror unit 16 is adjusted in such a way that the sensor will provide a maximum signal for image contrast, and the other mirrors in the first mirror unit 16 are likewise adjusted until the intended matching of the key subject matter is achieved for all original images.

Figure 26:
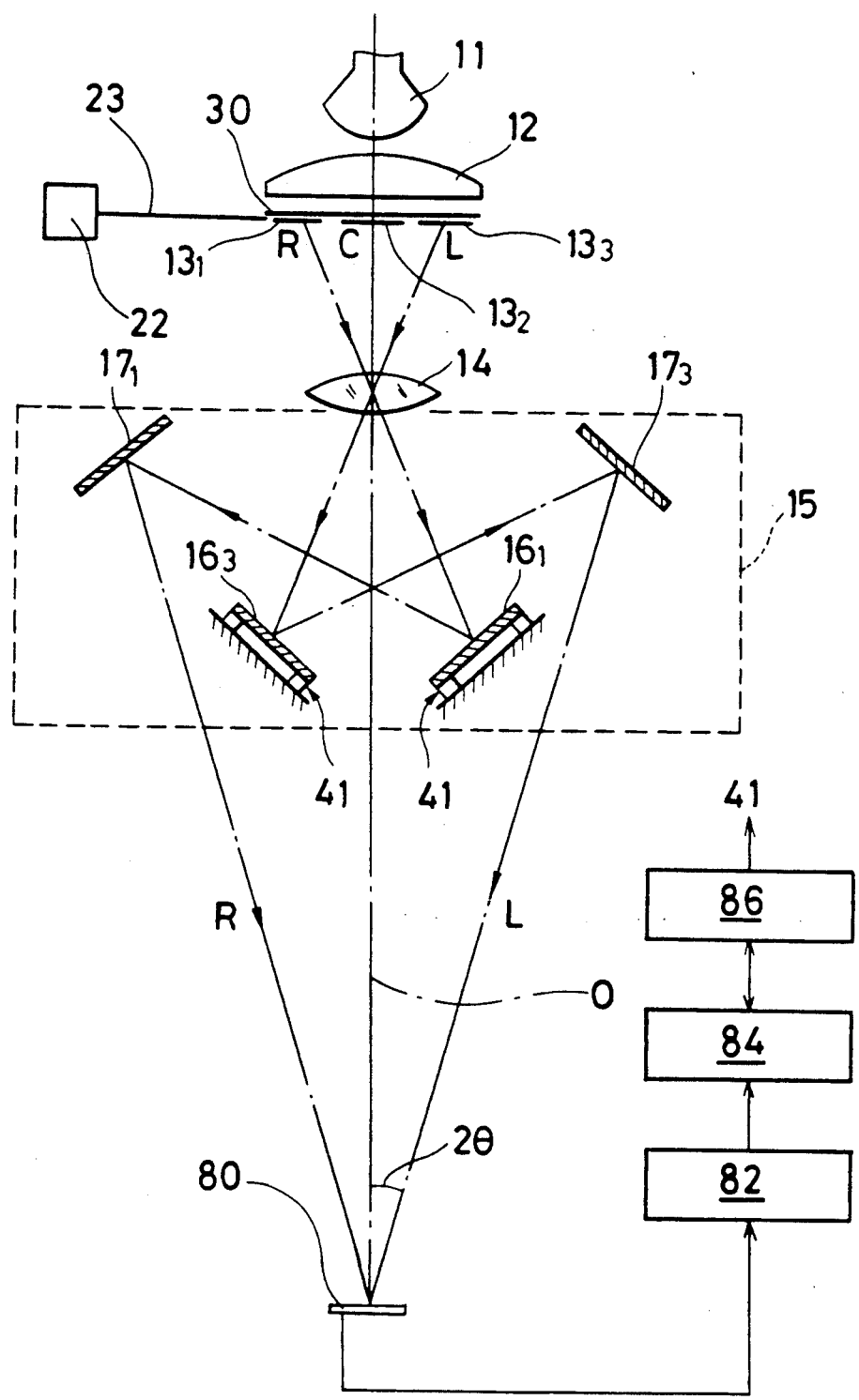
FIG. 26 shows conceptually an exemplary case of the matching of the key subject matter in an embodiment of the stereographic printing apparatus of the present invention.

An example of this method is shown conceptually in FIG. 26. The lenticular light-sensitive material 18 is removed or covered with a white board, etc. A contrast sensor 80 is placed in the position where the key subject matter is to be projected from an original image. An output signal from the contrast sensor 80 is transferred to a contrast computing circuit 82, where it is converted to an image contrast signal, which is then sent to a control circuit 84. At the same time, the angle of each mirror in the first mirror unit 16 is supplied to the control circuit 84 from a drive circuit 86 for the angular adjusting means 41. The two signals are stored in the control circuit 84.

The drive circuit 86 changes, either sequentially or simultaneously, the angles of the mirrors $16_1$, $16_2$ and $16_3$ in the first mirror unit 16 and, similarly, the image contrast signal and the angle of each mirror in the first mirror unit 16 are stored in the control circuit 84.

First, the angle of mirror $16_2$ is adjusted to determine the image composition with original image $13_2$ being used as a reference image and, thereafter, the above-described procedure of measuring the image contrast signal is repeated to adjust the angles of mirrors $16_1$ and $16_3$ successively. When the angle of each mirror in the first mirror unit 16 that provides a maximum image contrast signal is determined, the control circuit 84 informs the drive circuit 86 of this angle and the drive circuit 86 (the angular adjusting means 41) adjusts the angle of each mirror in the first mirror unit 16, and then each mirror is held at the angle so that the matching of the key subject matter is accomplished for all original images.

The method of moving the sensor is in no way limited and it may be moved manually as the operator looks at the image projected onto the screen, etc. Alternatively, the sensor may be moved by means of a known moving device such as an X-Y stage as the operator looks at the projected image.

According to another method, the projected image may be read with an imaging device such as a CCD camera and reproduced on a display such as a CRT, with the sensor being moved either manually or by means of an X-Y stage, etc. in accordance with the reproduced image.

Preferably, a sensor in operative association with the display is used and the system is designed in such a way that the sensor is moved automatically with the key subject matter being designated on the display. Stated more specifically, the projected view of each original image on the screen, etc. is recorded with an imaging device such as a CCD camera and reproduced on the display such as a CRT. Subsequently, the key subject matter is designated on the display by means of a suitable pointing device such as a mouse. Here, the display is operatively associated with the sensor, so that when the key subject matter is designated on the display, the sensor will be moved to the designated position of the key subject matter by means of a known moving device such as an X-Y stage.

When the sensor has moved to the position of the key subject matter, the angle of each mirror in the first mirror unit 16 is adjusted by the angular adjusting means (see the description already made in connection with FIG. 26) in such a way as to give a maximum image contrast signal, whereby the intended matching of the key subject matter is accomplished for all original images.

Figure 27A:
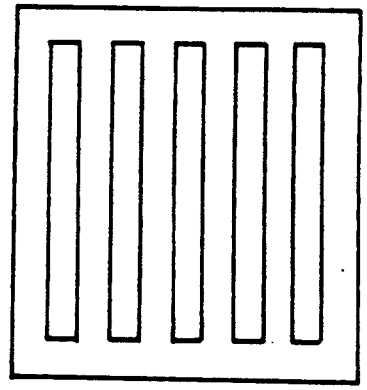
FIG. 27(a)-27(c) are diagrams showing three different patterns of contrast sensors.
Figure 27B:
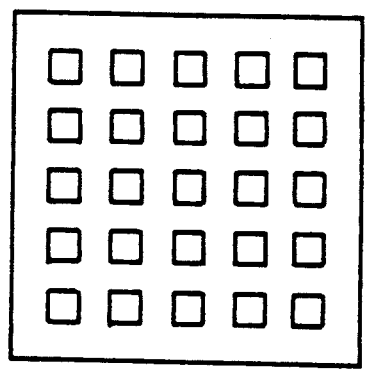
Figure 27C:
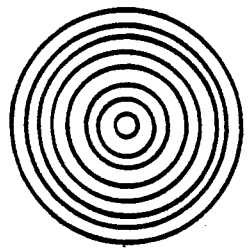

The applicable sensor is in no way limited and sensors of various patterns can be used. Applicable sensor patterns are shown in FIG. 27. FIG. 27(*a*) is a pattern consisting of linear strip. FIG. 27(*b*) is a two-dimensional dotted pattern and FIG. 27(*c*) is a pattern consisting of concentric rings.

If desired, a full-frame sensor assembly may be employed in such a way that a plurality of sensors are provided at many points to cover the entire surface of the lenticular light-sensitive material. Alternatively, a line sensor assembly and the like capable of detecting the projected original image may movably be provided on the projection medium such as the screen. Thus, all of the original image can be detected. In this case, the key subject matter is designated with a display, etc. and a pattern in this area designated as the key subject matter is recognized and then memorized in the memory.

Further, a series of original images are in turn projected to detect a pattern which corresponds to the previously memorized pattern of the key subject matter. The (positioning) shift between these patterns is then calculated. The preferred embodiment may be such that, on the basis of the amount of shift calculated on each of the original images, the angle of the first mirror corresponding to each of the original images is finely adjusted to automatically effect the matching of the key subject matter on the plane of projection.

Since the key subject matter is often located in the central part of a picture, the matching of the key subject matter may be accomplished with the sensor being fixed in the area corresponding to the center of the lenticular light-sensitive material 18.

When the adjustment of the key subject matter is completed for all original images in the manner described above, the contrast sensor, screen, etc. are removed and the lenticular sheet 19 or lenticular light-sensitive material 18 is replaced on the light-sensitive material holding plate 31 and the process of projecting and printing all original images is started.

In the above-described method of adjusting the key subject matter, the contrast sensor is placed on the plane of projection, namely, on a flat board on the holder plate 31. It should, however, be noted the contrast sensor need not be placed on the actual plane of projection and, instead, a plane equivalent to the actual plane of projection may be provided and the beams from the respective original images are guided by means of half-mirrors or auxiliary mirrors to that plane, where the adjustment of the key subject matter may be effected.

Alternatively, the amount of shift of the key subject matter in each original image can be estimated on the basis of shooting data such as the shooting distance of original images and the shooting distance between original images. Stated more specifically, several values are selectively assumed for the distance to the subject matter for shooting and, on the basis of those assumed values, the amount of shift of the image of the key subject matter on each frame is calculated and the corresponding angle of each mirror in the first mirror unit 16 is preset. The matching of the key subject matter can be accomplished by adjusting the angle of each of those mirrors in the first mirror unit 16 in accordance with the shooting data described above.

This method may be implemented in the following manner. If shooting is done with a zone focus camera, a distance setting may be recorded on the side of the associated frame as soon as the picture is taken and the angle of a mirror in the first mirror 16 can be readily selected on the basis of the recorded value. In the case of an AF camera, the result of autofocusing may be recorded simultaneously with the shooting and the recorded data are read to select a predetermined angle of each mirror in the first mirror unit; the mirror can be adjusted automatically to the selected angle by actuating the angular adjusting means 41.

Figure 28:
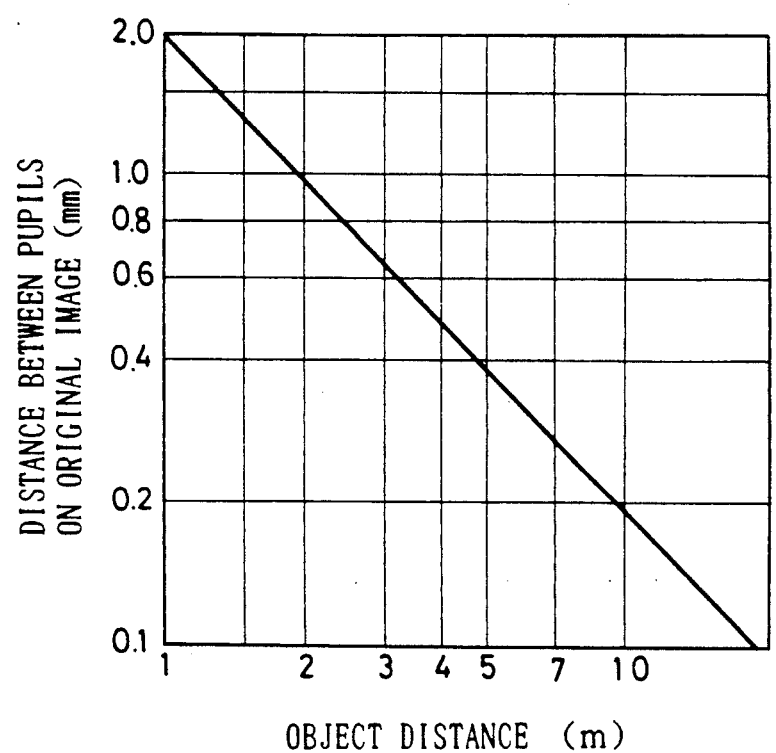
FIG. 28 is a graph showing the relationship between the inter-pupil distance on original images and the object distance.

If the operator is to manually estimate the object distance he may use a rangefinding device with a magnifier as an auxiliary tool. If a person is in original images, the distance between the pupils of the person on each original image is measured (human being have an average inter-pupil distance of ca. 65 mm) and the distance to the key subject matter is destimated on the basis of the measured distance. FIG. 28 is a graph showing the relationship between the distance between pupils on an original image and the object distance for the case of taking pictures with a camera having a focal length of 30 mm.

The stereographic printing apparatus shown in preceding FIGS. 11–13 which is intended to print three original images by two-step exposure may adopt the angular adjusting means shown in FIGS. 18–24 as a device for adjusting the angle of mirrors in the first mirror unit 16 of the mirror optical assembly 15. As in the case of the above-described stereographic printing apparatus, the matching of the key subject matter may be accomplished in the manner already described above using the mirrors 16₁, 16₂ and 16₃ in the first mirror unit 16 each having the angular adjusting means 41 on the back side.

In the embodiments described above, a stereoscopic view is obtained by printing three original images on a lenticular light-sensitive material through a single projecting lens. This, however, is not the sole case of the present invention and it may be applied to a stereographic printing apparatus that prints four or more original images using a single projection lens. In this type of apparatus, an angular adjusting means of the type shown in FIGS. 18–24 for adjustment of the key subject matter may also be provided on the back side of each of the mirrors in the first mirror unit 16, such as mirrors 16₁, 16₂, 16₃ and 16₄ in the mirror optical assembly 15 in the stereographic printing apparatus shown in FIG. 9 or FIGS. 14–17. Using such angular adjusting means, the matching of the key subject matter may be effected by the method already described above prior to the printing of images onto the lenticular light-sensitive material 18.

The foregoing description of stereographic printing apparatus assumes that two or more original images are focused on the lenticular light-sensitive material through a single projecting lens The present invention is also applicable to the case where two or more original images are focused using more than one projection lens.

Figure 29:
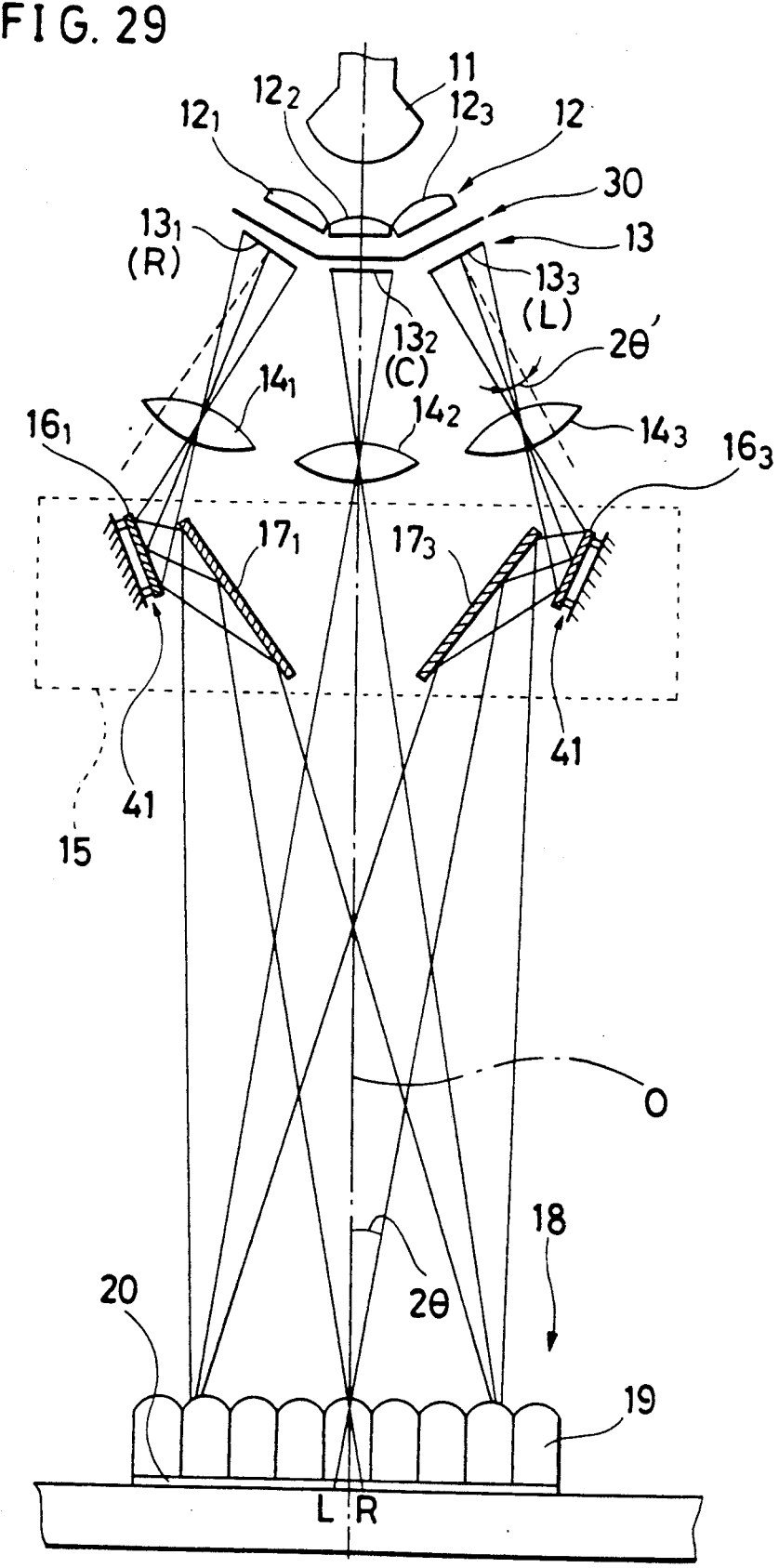
FIG. 29 is a diagram showing an optical arrangement in a perpendicular direction with respect to the image plane of a lenticular light-sensitive material with reference to the case where three original images are printed on a lenticular light-sensitive material with the stereographic printing apparatus of the present invention using independent projection lenses.
Figure 30:
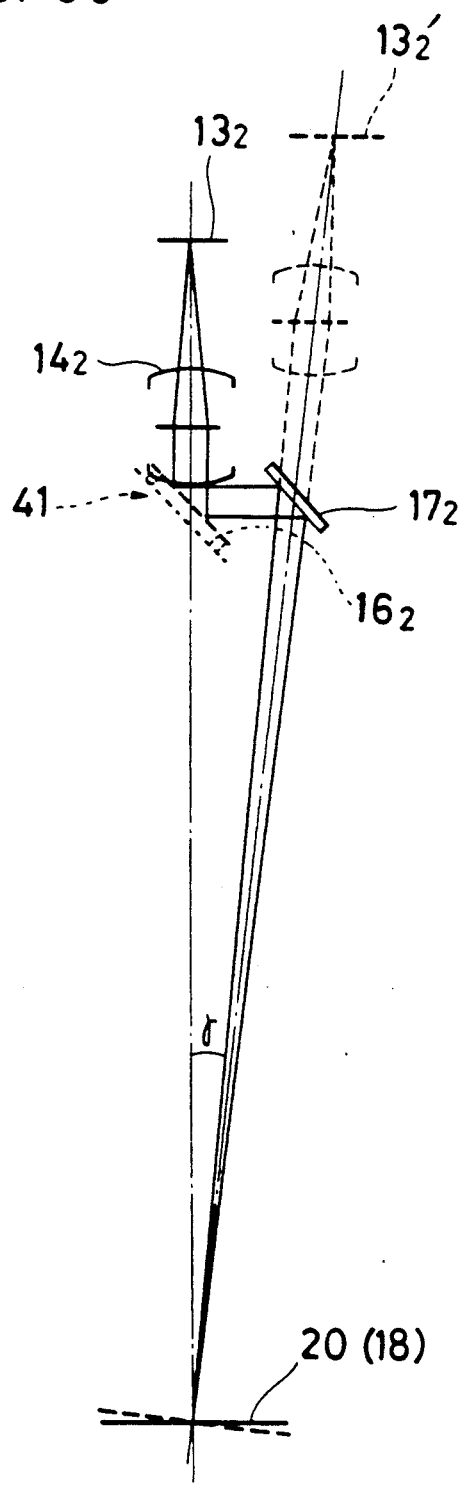
FIG. 30 is a diagram showing an optical arrangement in a longitudinal direction with respect to the image plane of the lenticular light-sensitive material in the stereographic printing apparatus shown in FIG. 29.
Figure 31:
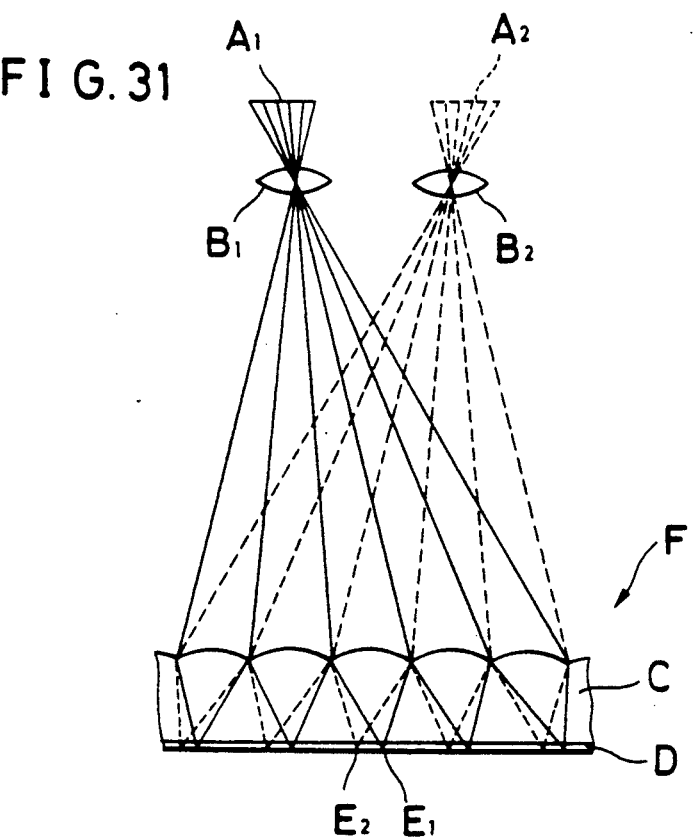
FIG. 31 is a sketch illustrating how original images are printed on a lenticular sheet by a customary stereographic process.
Figure 32:
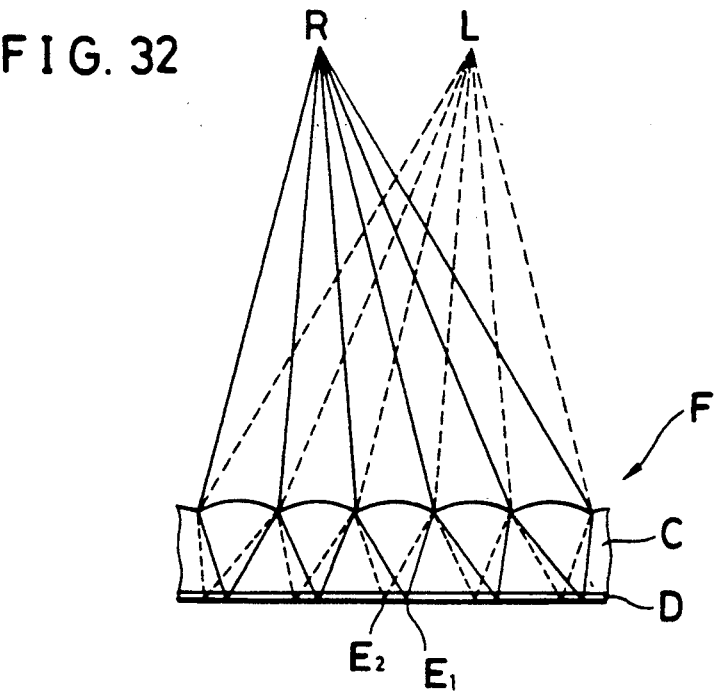
FIG. 32 is a sketch illustrating how the lenticular sheet subjected to the printing of original images as shown in FIG. 31 is viewed by an observer.
Figure 33:
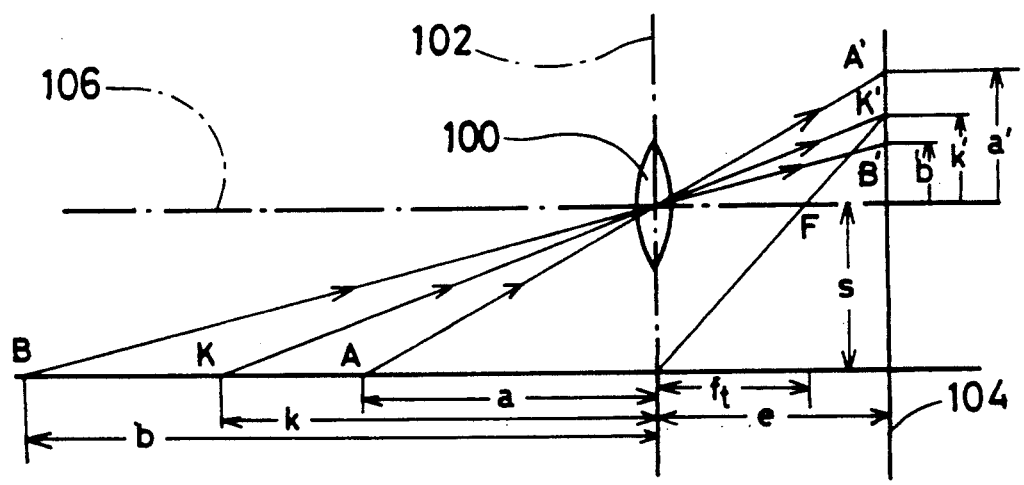
FIG. 33 is a diagram showing the relationship between the variations in the object distance and the resultant positions of images on a film.

The stereographic printing apparatus shown in FIGS. 29 and 30 permits the beams of light for three original images to be launched into their associated projecting lenses so that they form images on a lenticular light-sensitive material. The apparatus comprises: a plurality of condenser lenses 12, for example, three condenser lenses $12_1$, $12_2$ and $12_3$ that produce rays of light that are to be launched into associated original images; a guide 30 of a film that supports at predetermined angles a plurality of original images 13, say, three original images $13_1$, $13_2$ and $13_3$ that have been photographed with the camera 57 (see FIG. 1) from different viewpoints; and a plurality of projection lenses 14, say, three projection lenses $14_1$, $14_2$ and $14_3$ that correspond to the three original images.

In FIGS. 29 and 30, those parts or components which are the same as what have already been described above are identified by like numerals and will not be described in detail.

Light issuing from a light source 11 is collimated by condenser lenses 12 ($12_1$, $12_2$ and $12_3$) and the respective beams are admitted into the corresponding original images on the film. In the case shown, the original image $13_2$ corresponding to the center (C) of the film is positioned parallel to the surface of the lenticular light-sensitive material 18 which is located on a reference plane. On the other hand, the left original image $13_1$ and the right original image $13_3$ are positioned symmetrically with respect to the optical axis of the central original image $13_2$ as they are inclined at different angles with respect to the reference plane.

The angles of inclination of the original images $13_1$ and $13_3$ are determined in consideration of the space available for the projecting lenses 14 ($14_1$, $14_2$ and $14_3$) which are to be disposed between the original images 13 and the lenticular light-sensitive material 18. Hence, these angles of inclination of the original images will differ depending upon the size of the projecting lens unit and the manner in which the projecting lenses are arranged.

The beams of projecting light that have passed through the respective frames are then directed into the projecting lenses 14 ($14_1$, $14_2$ and $14_3$) positioned in respective correspondence to the original images, whereby the beams are adjusted for their focal positions.

In the apparatus shown, the projecting lenses $14_1$ and $14_3$ are disposed as they are offset from the associated original images $13_1$ and $13_3$ by predetermined angles towards the optical axis O. This arrangement is effective in correcting the tilting of the image plane on the light-sensitive layer 20, thereby producing a satisfactory stereoscopic image.

The beams of light that have passed through the projection lenses 14 ($14_1$, $14_2$ and $14_3$) are launched into the mirror optical assembly composed of a first mirror unit 16 (mirrors $16_1$, $16_2$ and $16_3$) and a second mirror unit 17 (mirrors $17_1$, $17_2$ and $17_3$), whereby the optical paths and optical pathlengths of those beams are adjusted so that they will fall on the lenticular light-sensitive material 18 at predetermined incident angles.

An angular adjusting means 41 is mounted on the back side of each of the mirrors $16_1$, $16_2$ and $16_3$ in the first mirror unit 16 and it is used to effect the matching of the key subject matter for all original images.

Mirror $16_2$ in the first mirror unit and mirror $17_2$ in the second mirror unit, both of which are intended to handle the central beam which corresponds to the projecting light from the central original image $13_2$, are disposed in a direction perpendicular to the paper but they are not shown in FIG. 29 for the sake of clarity and will be described hereinafter with reference to FIG. 30.

In the apparatus shown in FIG. 29, the beam of light from the original image $13_1$ which has passed through the projection lens $14_1$ is reflected in a predetermined direction by means of mirror $16_1$ in the first mirror unit 16 and mirror $17_1$ in the second mirror unit 17. On the other hand, the beam of light from the original image $13_3$ which has passed through the projection lens $14_3$ is reflected in a predetermined direction by means of mirror $16_3$ in the first mirror unit 16 and mirror $17_3$ in the second mirror unit 17. The two reflected beams fall on the lenticular light-sensitive material 18 at a predetermined incident angle ($2\theta$) and form images.

On the other hand, as shown in FIG. 30, the beam of light from the original image $13_2$ is first reflected by mirror $16_2$ in the first mirror unit 16 in a direction perpendicular to the plane defined by the centerlines of the beams from the original images $13_1$ and $13_3$ (i.e., in a direction normal to the paper of FIG. 29); thereafter, the beam is reflected downward by mirror $17_2$ in the second mirror unit 17 and falls on the lenticular light-sensitive material 18 at a predetermined incident angle ($\gamma$) to form an image.

Hence, in the case shown, the optical path of the central beam is extended by an amount that corresponds to the optical pathlength between mirrors $16_2$ and $17_2$.

The apparatus shown in FIGS. 29 and 30 has separate projection lenses for the individual beams of light in association with the respective original images, and those projection lenses may be designed to have the same focal length so that all beams of the projection light will have the same optical pathlength.

If the respective beams of projecting light have different optical pathlengths, projection lenses of different focal lengths may be used to insure that the respective projected images will be focused on the lenticular light-sensitive material at the same projection ratio. In this case, the beam of projecting light from the central original image $13_2$ may be allowed to travel in a straight optical path, so that mirror $16_2$ in the first mirror unit 16 and mirror $17_2$ in the second mirror unit 17 may be omitted or otherwise modified to simplify and reduce the size of the overall optical system.

In the stereographic printing apparatus described above, a projection lens is used for each of the original images that are disposed at predetermined angles. Hence, beam splitting is already achieved in the first step of processing with this apparatus, permitting the use of bright lenses that are advantageous for the purpose of producing good image quality Further, as mentioned in the preceding paragraph, the overall optical system can not only be made smaller in size but also simplified.

The examples described above refer to an apparatus of the type that prints three original images; needless to say, the use of more than one projection lens does not preclude the printing of four or even more original images.

As will be understood from the foregoing detailed description of the present invention, in accordance with the stereographic projecting method of the third aspect of the present invention, light beams carrying two or more original images are passed through a single projecting lens or a plurality of projecting lenses whose number is associated with that of the original images, thereby producing convergent light that will form an image at a predetermined focal length, and the optical paths of the light beams for the respective original images are changed by means of a subsequent mirror optical assembly so as to effect not only the adjustment of the optical pathlengths of those beams to the lenticular sheet but also the key subject matter adjustment that is performed in such a way that the key subject matter in the projected views from the respective original images will coincide on a projection medium such as a picture element recording or display medium; thereafter, the beams are admitted into lenticular lenses at predetermined printing angles and are imaged as linear picture elements on the back side of the lenticular sheet.

In this way, a plurality of continuous original images as they are retained in predetermined positions are recorded, through one or more projecting lenses, in a picture element recording or display medium provided in a predetermined position on the back side of the lenticular sheet and, subsequently, they are observed as stereoscopic views either through that picture element recording medium (or display medium) or after being directly projected and displayed on a picture element recording medium (or display medium) provided in a predetermined position.

In the stereographic printing apparatus according to the sixth embodiment of the present invention, light beams carrying a plurality of original images are passed through a single projecting lens or a plurality of projecting lenses whose number is associated with that of the original images, thereby producing convergent light that will form an image at a predetermined focal length, and the optical paths of the light beams for the respective original images are changed by means of a subsequent mirror optical assembly to adjust the optical pathlengths of those beams to the lenticular sheet; at the same time, the angles of mirrors in the first mirror unit are adjusted by an angle adjusting means to effect the key subject matter adjustment in such a way that the key subject matter in the projected views from the respective original images will coincide on a picture element recording medium such as a light-sensitive material. Thereafter, the beams are admitted into lenticular lenses at predetermined printing angles and are imaged as linear picture elements on the light-sensitive material provided on the back side of the lenticular sheet.

Thus, a plurality of continuous original images as they are retained in predetermined positions can be printed simultaneously on the lenticular light-sensitive material through one or more projecting lenses. At the same time, a sharp stereoscopic image can be obtained since the key subject matter adjustment is effected by the angular adjusting means mounted on the mirrors in the first mirror unit.

Further, in accordance with the embodiments described above, the angles of mirrors for adjusting the optical paths of beams associated with original images are adjusted either on the basis of the projection of original images on a projection medium such as a screen or a contrast sensor that are placed on the plane of projection or a plane that is optically equivalent to it, or on the basis of the shooting data of original images, whereby the images of the key subject matter in the respective frames are brought into registry on the plane of image projection so that an offset-free sharp image will be formed with respect to the key subject matter, thus accomplishing stereography of high quality.

In addition, the matching of the key subject matter can be accomplished by merely adjusting the angles of optical path adjusting mirrors in the first mirror unit either on the basis of actual projected images or in accordance with the shooting data of original images; hence, the intended matching of the key subject matter can be performed by simple procedures and using an apparatus of simple construction When N original image, photographed from different viewpoints, are to be printed on a lenticular sheet with the above-described stereographic printing apparatus according to the sixth aspect of the invention, the line width of each stereoscopic pixel image being recorded on the lenticular sheet can be easily increased to approximately one Nth of the pitch of one lenticule. This will provide great convenience in observation since correct stereoscopic views can be obtained even if the positions of the two eyes are shifted over a considerably broad range. This printing apparatus has no need to separate the original-image carrying film into individual frames and the number of projecting lenses to be used can optionally be reduced to one. In addition, a complicated mechanism for achieving synchronous scanning can be eliminated if a freely adjustable mirror optical assembly is simply provided. Therefore, the present invention can be easily implemented by an apparatus adapted from conventional photographic printers.

The present invention has another advantage in that it requires only one projecting lens whereas the conventional multi-frame printing system requires a plurality of lenses. It also has the advantage that it does not require a means of transporting the frame-carrying film or the lenticular light-sensitive material although such a means is necessary in the conventional system that moves the light-sensitive material relative to the projecting lens. Nor does it have the need to adjust the angle of the projecting lens unit. Hence, one of the outstanding features of the apparatus of the present invention is its simple mechanism. Further, a plurality of original images are exposed simultaneously, so in the case of processing N original images, the efficiency is increased by about N times. All of the original images are scanned as they are rocked during exposure and this permits the linear picture elements to be enlarged by a simple mechanism and with high efficiency. The absence of the need to move negative films or light-sensitive materials during exposure contributes to size reduction.

The lenticular light-sensitive material to be used in the stereographic projecting and recording methods and stereographic printing apparatus according to the first to the sixth aspects of the present invention may be selected from among any known light-sensitive materials including, for example, silver halide photographic materials, electrophotographic materials (photoreceptors), resin based light-sensitive materials, heat processable light-sensitive materials, and thermographic light-sensitive materials.

The embodiment of implementing the stereographic projecting methods of the present invention have been described above with reference to a typical case of using a stereographic printing apparatus that permits a plurality of original images to be printed on either one of the above-listed light-sensitive materials through a lenticular sheet. It should, however, be noted that this is not the sole case of the present invention and it may be implemented with any other models that permit stereoscopic views to be projected and further recorded as required, as exemplified by a stereographic projecting apparatus that performs only image projection through a lenticular sheet, as well as a stereographic projecting and recording apparatus that allows projected original images to be recorded as latent or visible images, or electrically recorded as image signals, or optionally displayed on display media.

Depending on the size of the lenticular sheet, the stereographic projecting and recording methods and stereographic printing apparatus of the present invention may be used in various applications including general photography, large-size photography, 3D postcards, displays, advertisement of merchandise, and displays in show windows. The present invention has been described hereinabove with particular reference to the case of printing original images on a light-sensitive material by one cycle of exposure; it should, however, be noted that the invention is also applicable to the case of printing by more than one cycle of exposure.

The foregoing embodiments refer to an "indirect" stereographic printing method, in which a three-dimensional view is first imaged as a two-dimensional view on the light-sensitive material on a film, which is then projected onto a lenticular light-sensitive material to compose a three-dimensional image. If desired, a CCD may be used as a light-sensitive material and the linear picture elements composed under the lenticular sheet are transmitted as image signals, which may be displayed on a CRT or an LCD equipped with a corresponding lenticular screen, thereby allowing the observer to view the resulting stereographic image.

The methods of the present invention are also applicable to a "direct" projection and display method which composes a three-dimensional image through a lenticular sheet. According to this method, a diffusing surface is provided on the back side of the lenticular sheet and original images are projected onto that surface to form a stereoscopic image which can be seen in relief by an observer who is on the side facing the projecting optical system. Alternatively, two lenticular sheets may be combined together in such a way that a transmissive diffusing plate is sandwiched between the flat surfaces of the sheets, and an image projected onto the assembly through an optical system from a projection lens on either one side of the assembly is viewed in relief by the observer.

While the present invention has been described on the foregoing pages with reference to particular embodiments, it should be understood that the invention is by no means limited to those embodiments only and that various alterations and modifications can be made without departing from the spirit and scope of the present invention.

What is claimed is:

1. A stereographic projecting method by which a plurality of original images from at least three different viewpoints are projected as a plurality of linear picture elements onto a projection medium through a plurality of lenticular lenses of a lenticular sheet, comprising the steps of:
launching beams of light from the respective original images into a single projection lens;
separating the beams of transmitted light for the respective original images in a mirror optical assembly consisting of mirror units each composed of at least two mirrors for each original image;
adjusting optical pathlengths of the respective beams to said projection medium by means of said mirror optical assembly; and
allowing said beams to be incident on lenticular lenses at predetermined angles of projection so that they are imaged as linear picture elements on said projection medium, whereby the original images from at least three viewpoints are projected simultaneously onto said projection medium.

2. A stereographic projecting and recording method according to claim 1, wherein said projection medium is a picture element recording medium, on which said plurality of projected original images are recorded.

3. A stereographic projecting and recording method according to claim 2, wherein said picture element recording medium is a light-sensitive material.

4. A stereographic projecting and recording method according to claim 3, wherein said lenticular sheet and said light-sensitive material combine to form a lenticular light-sensitive material in which the light-sensitive layer of said light-sensitive material is provided as an integral part of said lenticular sheet on a back side thereof.

5. A stereographic projecting and recording method according to claim 2, wherein said picture element recording medium is an electronic photoreceptor.

6. A stereographic projecting method according to claim 1, wherein said projection medium is an image display medium.

7. A stereographic projecting method by which a plurality of original images from at least three different viewpoints are projected as a plurality of linear picture elements onto a projection medium through a plurality of lenticular lenses of a lenticular sheet, comprising the steps of:
masking one or more of the original images;
allowing light issuing from a light source to be incident on one or more of the unmasked original images;
launching beams of transmitted light into a single projection lens;
changing the convergent beams of transmitted light of projection for the respective original images in optical path in a mirror optical assembly consisting of mirror units each composed of at least two mirrors for each original image;
adjusting optical pathlengths of the respective beams to said projection medium by means of said mirror optical assembly;
allowing said beams to be incident on lenticular lenses at predetermined angles of projection so that they are imaged as linear picture elements on said projection medium; and
repeating the process steps about until a stereoscopic image is composed in entirety.

8. A stereographic projecting and recording method according to claim 7, wherein said projection medium is a picture element recording medium, on which said plurality of projected original images are recorded.

9. A stereographic projecting and recording method according to claim 8, wherein said picture element recording medium is a light-sensitive material.

10. A stereographic projecting and recording method according to claim 9, wherein said lenticular sheet and said light-sensitive material combine to form a lenticular light-sensitive material in which the light-sensitive layer of said light-sensitive material is provided as an integral part of said lenticular sheet on a back side thereof.

11. A stereographic projecting and recording method according to claim 8 wherein said picture element recording medium is an electronic photoreceptor, by which said plurality of recorded original images are displayed.

12. A stereographic projecting method by which a plurality of original images from different viewpoints are processed through a lenticular sheet to produce a plurality of corresponding linear picture elements to be projected on a picture element recording or display medium, comprising the steps of:
launching light beams from the original images into one or more projection lenses;
changing the optical paths of the transmitted beams from said projection lens or lenses by a mirror optical assembly consisting of mirror units each composed of at least two mirrors for each original image, whereby optical pathlengths of those beams to said picture element recording or display medium are adjusted while the key subject matter in the original images is matched for the plurality of images being projected by means of said mirror optical assembly;
allowing the thus adjusted beams to be incident on said lenticular sheet at predetermined angles of projection so that they are imaged as linear picture elements on said picture element recording or display medium, whereby the plurality of original images from different viewpoints are projected onto said picture element recording or display medium.

13. A stereographic projecting method according to claim 12, wherein said plurality of original images are from three different viewpoints and are projected in two or more steps onto said picture element recording or display medium, with one or more of said original images being masked.

14. A stereographic projecting method according to claim 12 wherein the matching of the key subject matter is performed by adjusting the optical paths of the respective beams by means of said mirror optical assembly in accordance with the projected view as obtained on a projection medium provided on the plane of projection of said beams or a plane that is optically equivalent to said plane of projection.

15. A stereographic projecting method according to claim 12, wherein the matching of the key subject matter is performed by a process that comprises calculating the shift of the key subject matter in each original image on the basis of the shooting distance of said original images and the shooting distance between original images, and adjusting the optical paths of the respective beams in accordance with the calculated shift by means of said mirror optical assembly.

16. A stereographic projecting and recording apparatus with which a plurality of original images from at least three different viewpoints are projected through a plurality of lenticular lenses of a lenticular sheet and are printed respectively as a plurality of linear picture elements on the light-sensitive layer of a light-sensitive material that is provided on the back side of the lenticular sheet either separately from or as an integral part of said sheet, comprising:
a printing light source;
film holding means for holding a film that has a plurality of original images;
a single projection lens by means of which the light of projection that has passed through said film and that contains information on the plurality of original images is focused to form an image on the light-sensitive layer of a lenticular light-sensitive material composed of said lenticular sheet and said light sensitive material;
a mirror optical assembly having a first mirror unit composed of mirrors that are associated with the respective original images and with which the light of projection that has passed through said projection lens and that contains information on the plurality of original images is separated into beams for the respective original images, and a second mirror unit composed of mirrors that allow the beams of said light of projection having information on the individual original images to be incident at predetermined angles on said lenticular light-sensitive material and that reflect those beams to be imaged as corresponding linear picture elements on said lenticular light-sensitive material, said mirror optical assembly adjusting the angle of printing of the individual beams of light of projection on the light-sensitive layer, as well as optical pathlengths of those beams to said light-sensitive layer; and
a holding means for holding a lenticular light-sensitive material that has the light-sensitive layer on which said respective beams of light of projection are imaged and printed as a number of linear picture elements;
the components mentioned above being arranged in the order written along the path in which the light of projection issuing from said light source travels.

17. A stereographic projecting and recording apparatus according to claim 16, which further includes rocking means which, when said original images are being printed onto the light-sensitive layer, allows the light-sensitive material held by said holding means to rock about the longitudinal axis of the central lenticular lens in the lenticular light-sensitive material through a predetermined range of angles with respect to the horizontal plane, said central lenticular lens intersecting the optical axis of the projection lens.

18. A stereographic projecting and recording apparatus according to claim 16, wherein the projection lens is movable along its optical axis in such a way that the key subject matter in each original image will be brought into focus on the lenticular light-sensitive material.

19. A stereographic projecting and recording apparatus according to claim 16, which further includes an exposure adjusting unit that is capable of adjusting the amount of exposure for said original images, taken either individually or as a whole.

20. A stereographic printing apparatus with which a plurality of original images from at least three different viewpoints are projected through a projection lens onto a separated or integral lenticular light-sensitive material that includes a lenticular sheet comprising a plurality of lenticular lenses and a light-sensitive layer provided on the back side of said lenticular sheet, said original images being divided into linear picture elements by said lenticular sheet and printed on the light-sensitive layer, comprising:
a printing light source;
film holding means that holds a film having a plurality of original images printed thereon and that maintains a constant distance between the film and the lenticular light-sensitive material;

mask means for masking original images so that only the combinations of selected original images on the film will be exposed;

a single projection lens;

a mirror optical assembly having a first mirror unit composed of mirrors that are associated with the respective original images and with which the optical paths of the beams of projection light that has issued from the light source and that has passed through the masking means to contain information on the original images are changed for the respective original images, and a second mirror unit composed of mirrors that allow the beams of said projection light having information on the individual original images to be incident at predetermined angles on said lenticular light-sensitive material and that reflect those beams to be imaged as corresponding linear picture elements on said lenticular light-sensitive material, said mirror optical assembly adjusting the angle of printing of the individual beams of projection light on the light-sensitive layer, as well as the optical pathlengths of those beams to said light-sensitive layer; and holding means for holding the lenticular light-sensitive material that has the light-sensitive layer on which said respective beams of projection light are imaged and printed as a number of linear picture elements;

printing being done on the light-sensitive layer of the lenticular light-sensitive material for each of the selected combinations of original images on the film.

21. A stereographic printing apparatus according to claim 20, wherein said mask means selectively masks one of even-numbered original images and odd-numbered original images as selected from among the plurality of original images on the film, said mirror optical assembly having a mirror unit for processing the beams of projection light from the even-numbered original images in response to the masking of the odd-numbered original images by said mask means, and a mirror unit for processing the beams of projection light from the odd-numbered original images in response to the making of the even-numbered original images by said mask means.

22. A stereographic printing apparatus according to claim 21, wherein one of said mirror unit for processing the beams from the even-numbered original images and said mirror unit for processing the beams from the odd-numbered original images is a single mirror optical assembly that is formed as a physical separate entity from said film holding means and said mask means and which, when said mask means is moved, is inverted (rotated by 180°) to serve as a mirror unit for processing the beams from the other of the odd-numbered and even-numbered original images.

23. A stereographic printing apparatus according to claim 22, wherein said single mirror optical assembly is adapted to be capable of inversion as a whole in response to the movement of said mask means.

24. A stereographic printing apparatus according to claim 22, wherein said single mirror optical assembly is fixed whereas said film holding means is adapted to be capable of inversion in response to the movement of said mask means.

25. A stereographic printing apparatus according to claim 20, which further includes rocking means which, during exposure, allows said lenticular light-sensitive material to rock about the longitudinal axis of the central lenticular lens in the lenticular light-sensitive material through a predetermined range of angles with respect to the horizontal plane, said central lenticular lens intersecting the optical axis of the projecting lens.

26. A stereographic printing apparatus with which a plurality of original images from different viewpoints are processed through a lenticular sheet comprising a plurality of lenticular lenses to produce a plurality of linear picture elements which are printed respectively on the light-sensitive layer of a light-sensitive material that is provided on the back side of the lenticular sheet either separately from or as an integral part of said sheet, comprising:

a printing light source;

film holding means for holding a film that carries a plurality of original images;

a projection lens by means of which the light of projection that has passed through said film and that contains information on the plurality of original images is focused to form an image on the light-sensitive layer of said light-sensitive material;

a mirror optical assembly having a first mirror unit composed of mirrors that are associated with the respective original images and with which the optical paths of the beams of projection light that has passed through said projection lens and that contains information on the plurality of original images are changed for the respective original images, an angular adjusting mechanism that is provided for each of the mirrors in the first mirror unit for adjusting the key subject matter, and a second mirror unit composed of mirrors that allow the beams of said projection light having information on the individual original images to be incident at predetermined angles on said lenticular sheet and that reflect those beams to be imaged as corresponding linear picture elements on said light-sensitive material, said mirror optical assembly adjusting the angle of printing of the individual beams of projection light on the light-sensitive layer, as well as the optical pathlengths of those beams to said light-sensitive material; and for holding a lenticular light-sensitive material composed of said lenticular sheet and said light-sensitive material.

27. A stereographic printing apparatus according to claim 26, which further includes mask means for masking only selected combinations of original images on the film, with printing being done for each of the selected combinations of original images on the film.

28. A stereographic printing apparatus according to claim 26, which further includes rocking means which, when said original images are being printed onto the light-sensitive material, allows the lenticular sheet and the light-sensitive material held by said holding means to rock about the longitudinal axis of the central lenticular lens in the lenticular sheet through a predetermined range of angles with respect to a reference plane, said central lenticular lens intersecting the optical axis of the projection lens.

29. A stereographic printing apparatus according to claim 26, which further includes an exposure adjusting unit that is capable of adjusting the amount of exposure for said original images, taken one of individually and collectively.

30. A stereographic printing apparatus according to claim 26, wherein the angular adjusting mechanism which is provided for the mirrors in the first mirror unit for adjusting the key subject matter comprises a plurality of actuators disposed at said mirrors in predetermined positions and a control unit for controlling each of said actuators.

31. A stereographic printing apparatus according to claim 26, which further includes a projection medium which, for the purpose of adjusting the key subject matter, is freely disposable on a plane corresponding to said light-sensitive material at least in the position of the key subject matter in said original images, the beams of projection light from said original images being focused on said projection medium before they are printed on said light-sensitive material, the angles of said mirrors in the first mirror unit being adjusted by said angular adjusting mechanism in accordance with the thus projected images so as to achieve registry in the key subject matter between the original images, followed by printing on the light-sensitive material through said lenticular sheet.

32. A stereographic printing apparatus according to claim 31, wherein said projection medium is a screen and the projected images focused on this screen are checked visually to adjust the angles of the mirrors in the first mirror unit by means of said angular adjusting mechanism.

33. A stereographic printing apparatus according to claim 31, wherein said projection medium is a screen and the projected images focused on said screen are reproduced on a display, with the angles of the mirrors in the first mirror unit being adjusted by means of said angular adjusting mechanism on the basis of said reproduced images.

34. A stereographic printing apparatus according to claim 31, wherein said projection medium is a contrast sensor and the angles of the mirrors in the first mirror unit are adjusted by means of said angular adjusting mechanism in such a way that said contrast sensor will produce a maximum image contrast signal.

35. A stereographic printing apparatus according to claim 31, wherein said projection medium is a screen and has a display and a contrast sensor, said display reproducing the projected images focused on said screen and setting the key subject matter on the reproduced images, said contrast sensor being in operative association with the setting of the key subject matter to move to the position of the key subject matter as set on said display, with the angles of the mirrors in the first mirror unit being adjusted by means of said angular adjusting mechanism in such a way that said contrast sensor will produce a maximum image contrast signal.

36. A stereographic printing apparatus according to claim 26, which further includes means of calculating the shift for the key subject matter in each original image on the basis of the shooting distance of said plurality of original images and the shooting distance between original images, with the calculated shift being used as a basis for adjusting the angles of the mirrors in the first mirror unit by means of said angular adjusting mechanism in such a way that the key subject matter registers between individual original images, followed by printing on the light-sensitive material through said lenticular sheet.

37. A stereographic printing apparatus according to claim 31, wherein said apparatus further comprises an image sensor capable of detecting the projected original image and movably provided on said projection medium or constituting said projection medium and a display which reproduces a light-received projection image by the image sensor and designates the key subject matter of reference plane on the reproduced image, means for recognizing and memorizing a pattern of said key subject matter designated on the display, and means for calculating the shift of a key subject matter of other original image projected, and the angles of the mirrors in the first mirror unit are adjusted by means of said angular adjusting mechanism so that the key subject matter of each original image is matched depending on the calculated shift.

* * * * *

UNITED STATES PATENT AND TRADEMARK OFFICE
CERTIFICATE OF CORRECTION

PATENT NO. : 5,192,969

DATED : March 9, 1993

INVENTOR(S) : Shunkichi IGARASHI et al

It is certified that error appears in the above-identified patent and that said Letters Patent is hereby corrected as shown below:

Column 51, line 55, change "the other of" to --the other one of--.

Column 52, line 44, change "for holding a" to --holding means for holding a--.

Signed and Sealed this

Eleventh Day of January, 1994

Attest:

BRUCE LEHMAN

Attesting Officer

Commissioner of Patents and Trademarks